United States Patent
Fung et al.

(10) Patent No.: US 7,865,414 B2
(45) Date of Patent: Jan. 4, 2011

(54) METHOD, SYSTEM AND COMPUTER READABLE MEDIUM FOR WEB SITE ACCOUNT AND E-COMMERCE MANAGEMENT FROM A CENTRAL LOCATION

(75) Inventors: Daniel Y. Fung, New York, NY (US); Stephen C. Evans, New York, NY (US)

(73) Assignee: Passgate Corporation, New York, NY (US)

( * ) Notice: Subject to any disclaimer, the term of this patent is extended or adjusted under 35 U.S.C. 154(b) by 1098 days.

(21) Appl. No.: 10/786,596

(22) Filed: Feb. 26, 2004

(65) Prior Publication Data

US 2004/0230536 A1 Nov. 18, 2004

Related U.S. Application Data

(63) Continuation-in-part of application No. 09/879,964, filed on Jun. 14, 2001, now Pat. No. 6,879,965, which is a continuation of application No. 09/627,792, filed on Jul. 27, 2000, now abandoned.

(60) Provisional application No. 60/191,550, filed on Mar. 23, 2000, provisional application No. 60/186,303, filed on Mar. 1, 2000.

(51) Int. Cl.
*G06Q 40/00* (2006.01)
*G06Q 30/00* (2006.01)
(52) U.S. Cl. .......................... 705/35; 705/26
(58) Field of Classification Search ................. 705/26, 705/35
See application file for complete search history.

(56) References Cited

U.S. PATENT DOCUMENTS 4,920,567 A * 4/1990 Malek .................... 380/33

(Continued)

FOREIGN PATENT DOCUMENTS

CA 2364297 8/2000

(Continued)

OTHER PUBLICATIONS

Business Editors & Telecommunications Writers. "Orix Global Communications Launches New Web Site, www.yellowpages.com", Business Wire, New York: May 4, 1998. p. 1.*

(Continued)

*Primary Examiner*—James A. Kramer
*Assistant Examiner*—Eric T Wong
(74) *Attorney, Agent, or Firm*—Carlos R. Villamar; The Villamar Firm PLLC

(57) ABSTRACT

A method, system, and computer readable medium for managing a financial transaction of a user at a merchant, including authenticating the user via a device of the user while the user is at the merchant; transmitting activation information for activating a reusable, pre-existing, unaltered and permanent credit or debit card account number of the user from the user device to a financial institution for processing financial transactions, while the user is authenticated; submitting a payment request including the account number to the financial institution from the merchant, while the account number is activated; and de-activating the account number after the payment request is processed by the financial institution. The financial institution only accepts and processes payment requests received from merchants while the account number is activated, and the financial institution declines payment requests while the account number is de-activated.

51 Claims, 33 Drawing Sheets

U.S. PATENT DOCUMENTS

| | | | |
|---|---|---|---|
| 5,220,501 A * | 6/1993 | Lawlor et al. | 705/40 |
| 5,483,445 A * | 1/1996 | Pickering | 705/40 |
| 5,513,250 A * | 4/1996 | McAllister | 379/91.02 |
| 5,655,077 A | 8/1997 | Jones et al. | |
| 5,684,950 A | 11/1997 | Dare et al. | |
| 5,848,161 A * | 12/1998 | Luneau et al. | 705/78 |
| 5,905,862 A | 5/1999 | Hoekstra | |
| 6,000,832 A | 12/1999 | Franklin et al. | |
| 6,052,675 A * | 4/2000 | Checchio | 705/44 |
| 6,128,602 A * | 10/2000 | Northington et al. | 705/35 |
| 6,185,701 B1 * | 2/2001 | Marullo et al. | 714/38 |
| 6,324,526 B1 * | 11/2001 | D'Agostino | 705/44 |
| 6,422,462 B1 | 7/2002 | Cohen | |
| 6,629,092 B1 * | 9/2003 | Berke | 707/3 |
| 6,980,969 B1 | 12/2005 | Tuchler et al. | |
| 7,006,993 B1 | 2/2006 | Cheong et al. | |
| 2001/0044787 A1 | 11/2001 | Shwartz et al. | |
| 2001/0047330 A1 * | 11/2001 | Gephart et al. | 705/39 |
| 2002/0032657 A1 | 3/2002 | Singh | |
| 2002/0169720 A1 | 11/2002 | Wilson et al. | |
| 2003/0028481 A1 * | 2/2003 | Flitcroft et al. | 705/39 |
| 2004/0078325 A1 | 4/2004 | O'Connor | |
| 2004/0167821 A1 | 8/2004 | Baumgartner | |
| 2004/0230536 A1 | 11/2004 | Fung | |

FOREIGN PATENT DOCUMENTS

| | | |
|---|---|---|
| CA | 2410746 | 9/2001 |
| EP | 0717339 A | 6/1996 |
| EP | 0745961 | 12/1996 |
| EP | 1089516 A | 8/2002 |
| WO | 9910850 | 3/1999 |
| WO | 9914711 | 3/1999 |
| WO | 9949424 | 9/1999 |
| WO | 0052900 | 9/2000 |
| WO | 0165511 | 9/2001 |

OTHER PUBLICATIONS

International Search Report and Written Opinion of the International Searching Authority, or the Declaration for International Appln No. PCT/US05/03773, dated Jan. 30, 2007, 8 pages.

International Search Report for International Appl. No. PCT/US01/06498 dated Jan. 3, 2000.

European Search Report for Application No. 04022981.7 mailed Apr. 25, 2005.

U.S. Appl. No. 60/186,303, filed Jan. 3, 2000.

U.S. Appl. No. 60/191,550, filed Mar. 23, 2000.

U.S. Appl. No. 09/627,792, filed Jul. 27, 2000.

"Introducing Web Services" Understanding web services Jan. 1, 2009 pp. 1-46.

European Patent Search Report Jan. 28, 2009.

* cited by examiner

FIG. 17

- 1702 — Master Central Controller Credit Card Account Number
- 1704 — Subordinate Credit Card Account Number
- 1706 — Balance Modification Changes for Subordinate Card
- 1708 — Personal Data Changes for Subordinate Card
- 1710 — Central ControllerID
- 1712 — Modification Request Tracking Number

FIG. 18

- 1802 — Master User Credit Card Account Number
- 1804 — Subordinate User Credit Card Account Number
- 1806 — Desired/Confirmed Balance Data History for Subordinate Card
- 1808 — Personal Data History for Subordinate Card
- 1810 — Master Central Controller User Identifier Number
- 1812 — Subordinate Card Transaction Request/Confirmation Data History
- 1814 — Subordinate Central Controller User Identifier Number (Online User)
- 1816 — Master User Restrictions On Subordinate Card
- 1818 — Subordinate Card Control History

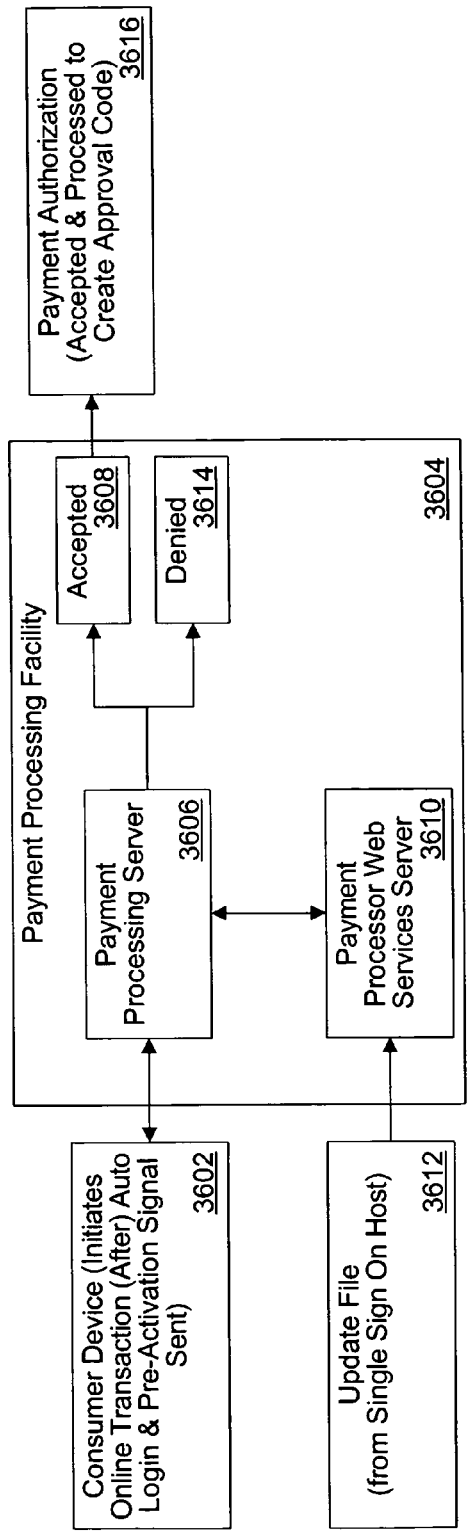
FIG. 36
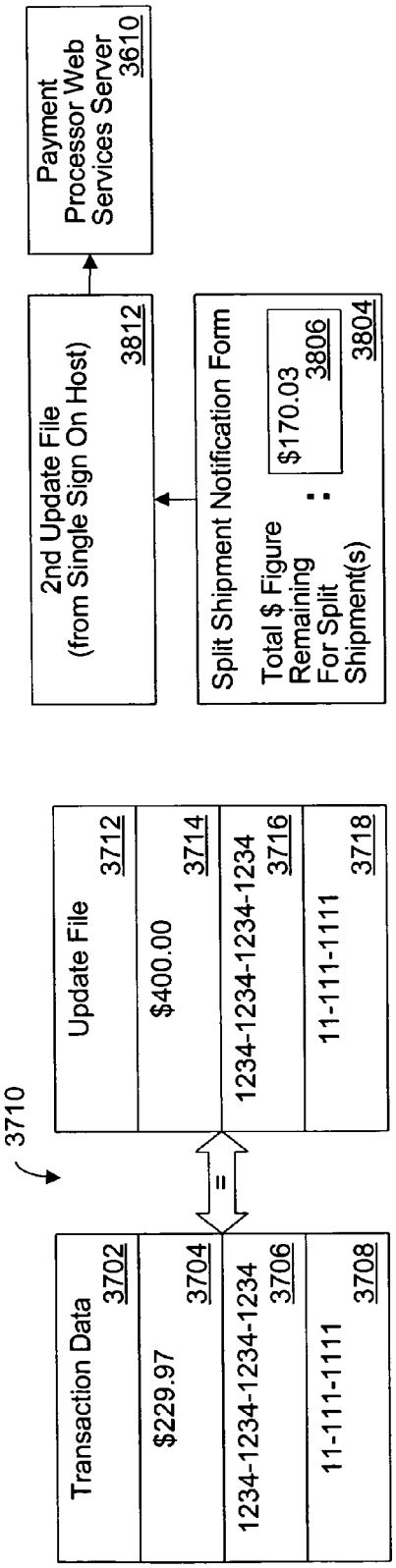
FIG. 38
FIG. 37

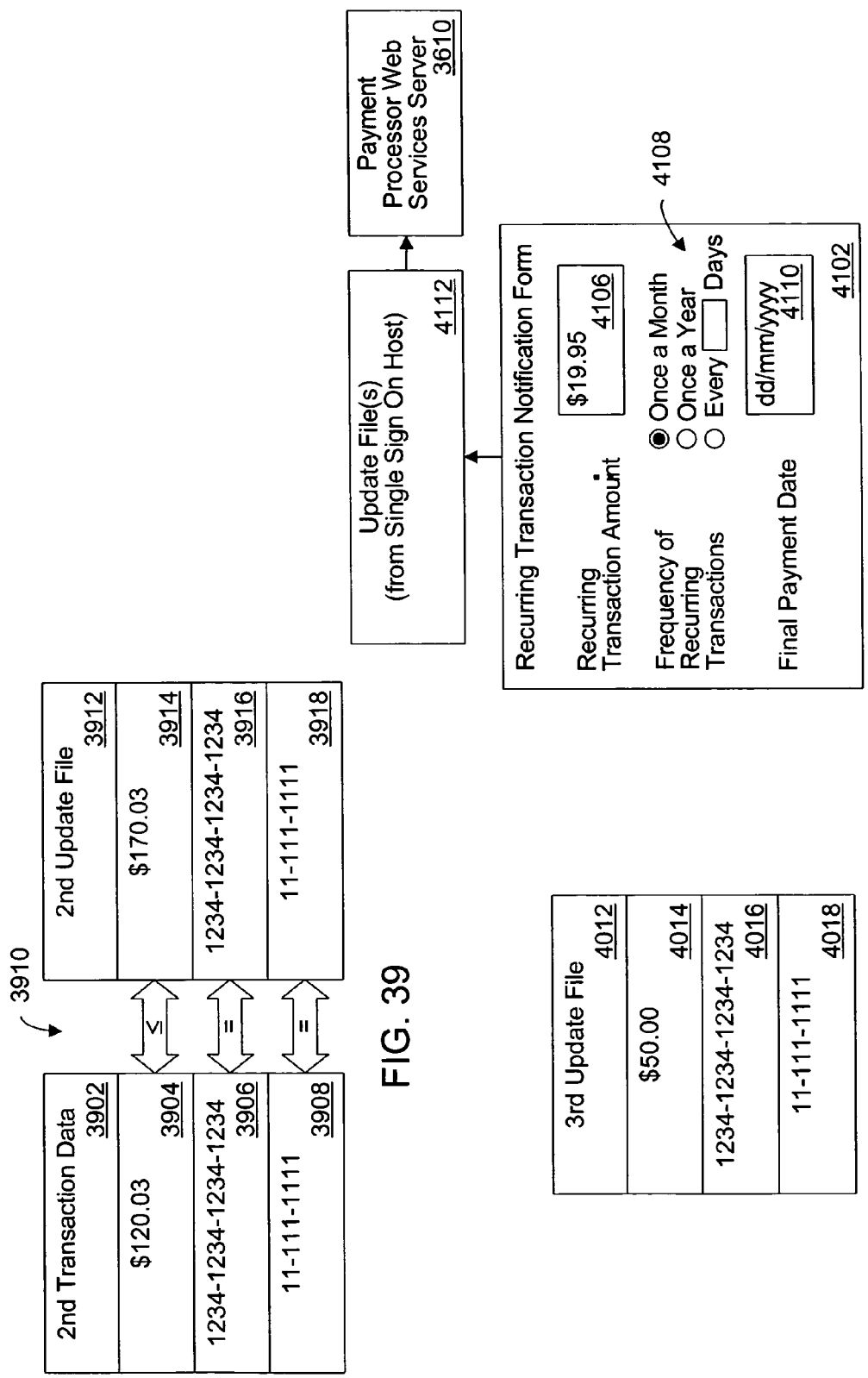

METHOD, SYSTEM AND COMPUTER READABLE MEDIUM FOR WEB SITE ACCOUNT AND E-COMMERCE MANAGEMENT FROM A CENTRAL LOCATION

CROSS REFERENCE TO RELATED DOCUMENTS

The present invention in a Continuation-in-Part (CIP) application of commonly-assigned, co-pending, U.S. patent application Ser. No. 09/879,964 filed Jun. 14, 2001, which is a Continuation application of U.S. patent application Ser. No. 09/627,792 filed Jul. 27, 2000, now abandoned, which claims priority under 35 U.S.C. §119(e) to U.S. provisional patent applications Ser. No. 60/191,550 filed on Mar. 23, 2000, and 60/186,303 filed on Mar. 1, 2000, the entire contents of all of which are incorporated herein by reference.

BACKGROUND OF THE INVENTION

1. Field of the Invention

The present invention generally relates to the field of web site account and e-commerce management and more particularly to a method, system and computer readable medium for managing a plurality of web site accounts and for providing a secure methodology for e-commerce transactions from a central web site location.

2. Discussion of the Background

In recent years, numerous Internet or World Wide Web ("WWW" or "web") sites (e.g., Alta Vista, Yahoo!, autobytel. com, msn Hotmail, iwon, headhunter.net, Travelocity.com, deja.com, Amazon.com, etc.) have been created and require users to create personal accounts therein. The personal accounts typically include a login name and password and are typically linked to optional demographic, credit/debit card and other information, which can be entered through web-based forms while the user is online.

However, due to the numerous personal online accounts and passwords, which a single user typically generates to access the user's preferred web sites, it is often difficult for the user to keep track of and manage the numerous accounts and passwords. Accordingly, typical inconveniences and/or issues attributed to such web sites include, for example: (i) a user having to re-enter the same personal information at every new web site that the user want to be registered, (ii) a user having to re-type the same recurring user names and passwords to get through the gateways of most web sites and online e-mail accounts, and (iii) a user being subjected to advertising systems, which track the user's online destinations in order to deliver targeted advertisements to the user.

In addition, many of the web sites allow for online purchasing of products and/or services via a credit/debit card. The ability to purchase such products and/or services online is based on existing credit/debit card information stored in a user's online account or based on credit/debit card information entered while online. However, typical concerns and inconveniences attributed to such web sites include the financial security of a user's credit/debit card information while online on such web sites and the privacy issues relating to online theft of such confidential information and other fraudulent acts. The wide-spread extent of such concerns is exemplified by an online survey conducted by Newsweek.M-SNBC.com by 5 P.M. EST, Feb. 25, 2000, which asked what cyber crime activity most users fear. The results of the survey included a nasty computer virus (26%), a business meddler (6%), an e-mail spy (9%), a stranger approaching children in a chat room (11%) and a hacker stealing credit-card numbers (48%).

SUMMARY OF THE INVENTION

Accordingly, there is a need for a method, system and computer readable medium for managing online user accounts including user names, passwords, demographic and/or credit/debit card information, via a central web site location. There also is a need for an automated method, system and computer readable medium for managing online and offline credit/debit card transactions from a central web site location. There also is a need for an automated method, system and computer readable medium for managing online and offline credit/debit card transactions from a central web site location while minimizing the activation time of the credit/debit card. There also is a need for an automated method, system and computer readable medium for managing online and offline credit/debit card transactions from a central web site location while minimizing the financial exposure of a user of the credit/debit card.

The above and other needs are addressed according to one aspect of the exemplary embodiments of the present invention by providing an automated method, system and computer readable medium for managing a financial transaction of a user at a merchant, including authenticating the user via a device of the user while the user is at the merchant. In an exemplary embodiment, a credit or debit card account number of a user is normally maintained in a deactivated or dormant status, thus being unable to be used for financial transactions, and can be activated during a financial transaction and then deactivated thereafter. Advantageously, the exemplary embodiments provide for secure online or offline financial transactions based on new or existing credit or debit card accounts, for example, without a need for proxy or disposable account number generation, and the like.

Accordingly, in one aspect of the exemplary embodiments of the present invention, there is provided a method, system and computer readable medium for managing a financial transaction of a user at a merchant, including authenticating the user via a device of the user while the user is at the merchant; transmitting activation information for activating a reusable, pre-existing, unaltered and permanent credit or debit card account number of the user from the user device to a financial institution for processing financial transactions, while the user is authenticated; submitting a payment request including the account number to the financial institution from the merchant, while the account number is activated; and de-activating the account number after the payment request is processed by the financial institution. The financial institution only accepts and processes payment requests received from merchants while the account number is activated, and the financial institution declines payment requests while the account number is de-activated.

Still other aspects, features, and advantages of the present invention are readily apparent from the following detailed description, simply by illustrating a number of particular embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which:

FIG. 17 is a signal diagram for illustrating a signal format used in the system of FIG. 10, according to the present invention;

FIG. 18 is a data structure diagram for illustrating a data structure format used in the system of FIG. 10, according to the present invention;

FIG. 36 illustrates an exemplary process for dormant payment card transaction authorization screening/activation, according to the present invention;

FIG. 37 illustrates exemplary dormant payment card transaction authorization logic, according to the present invention;

FIG. 38 illustrates an exemplary dormant payment card split shipment notification form, according to the present invention;

FIG. 39 illustrates exemplary dormant payment card secondary update file constraints processing, according to the present invention;

FIG. 40 illustrates exemplary dormant payment card third update file authorization screening processing, according to the present invention;

FIG. 41 illustrates an exemplary dormant payment card recurring transaction notification form, according to the present invention.

DETAILED DESCRIPTION OF THE PREFERRED EMBODIMENTS

Figure 1:
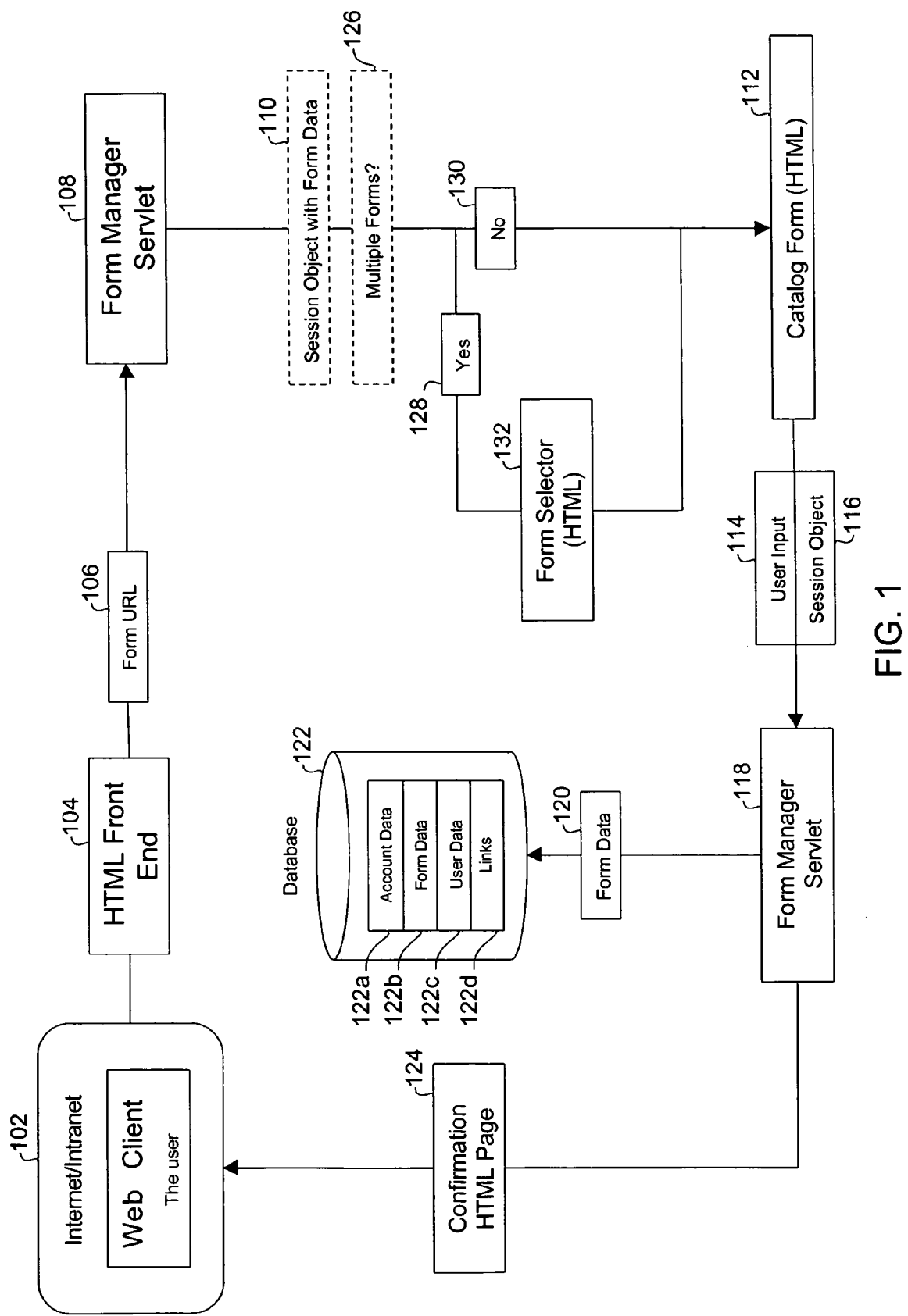
FIG. 1 is a system diagram for illustrating managing and collecting of form data received from a plurality of web sites through a central web site location, according to the present invention.

Referring now to the drawings, wherein like reference numerals designate identical or corresponding parts throughout the several views, and more particularly to FIGS. 1-42 thereof, there are illustrated various exemplary embodiments of the present invention. A GLOSSARY is provided at the end of this section listing specialized terms and their definitions in the context of the present invention.

Central User Account Management

The central user account management according to present invention is implemented via a central web site location, wherein a user first becomes a member of the central web site by, for example: (1) filling out a membership or registration form and (2) picking a user name and password for the central web site location. The central web site suggests available user names, should a requested user name prove to have been taken. The above steps may be performed at the central web site location via a web browser interface or via telephone, facsimile, e-mail, etc., as will be appreciated by those skilled in the relevant art(s). The registration form includes the fields for forms of popular and useful sites on the Internet, such as AltaVista, Yahoo!, autobytel.com, msn Hotmail, iwon, headhunter.net, Travelocity.com, deja.com, Amazon.com, etc. This registration form advantageously becomes a user's "template" when the user wants to join other web sites.

The registration information provided by a user is hosted at the central web site location so that the central web site can access the user's data and use the data to establish links to the user's preferred web sites. The links at the central web site location then become accessible to the user from any device, such as a computer, a cellular phone, a personal data assistant, etc., having an Internet connection. The central web site then uses the user's information to automatically register the user at the user's preferred web sites, saving the user the delay and inconvenience of repetitive typing and filling out of multiple forms for each preferred web site. The user name and password provided at the central web site location typically will be the last and only ones the user will ever have to remember to access the user's preferred web sites in the future. In addition, a user of the central web site can request additional sites to be added to the central web site location at any time.

Once registered, a user is provided with a personal web page by the central web site and the user is able to login to the user's personal web page, for example, to personalize the web page or to add new web sites. In one embodiment, a user can select, on the user's personal web page, one or more web sites that the user wishes to join and then click a button to have the central web site register the user at the selected web sites. In another embodiment, the user can click on a link to a web site the user wishes to join provided in the user's personal web page and the central web site registers the user at the respective web site.

The central web site transmits the data from the user's registration form to the web sites that the user chooses and dynamically generates links to those web sites in the user's personal web page. The central web site automatically sends the user's login information to the selected web sites and automatically connects the user to content held at the selected web sites. In this way, a user is able to go directly to a "start page" of the user's selected web site, without having to enter any login information. In addition, the central web site also allows a user to create links for sites at which the user is already registered. This is accomplished by allowing the user to input and store the existing user information for the registered web sites at the central web site location, by means of, for example, an online form including fields for storing the existing user information, via e-mail, via facsimile, via telephone, via wireless communications, etc. Encryption is used for all confidential user information, such as usernames, passwords, credit/debit card account numbers, demographic information, etc., stored at the central web site location. The operation of the above-noted invention will now be described, with reference to FIGS. 1-3.

FIG. 1 is a system diagram for illustrating a registration form management system for managing and collecting registration form data, for any of a plurality of web sites, according to the present invention. The form data that is collected can then be used for automated registration of a user at any of a plurality of web sites, for which the form data has been obtained, as will be later discussed. The system may reside and operate on standard computer hardware, as is known in the computer art(s). The hardware runs software (e.g., web server(s) software, etc.) that the system utilizes. The system is controlled with and designed through a web interface (e.g., web client 102). The server(s) that runs the form management system of FIG. 1 have access to the Internet, as the system uses networking code and communicates with web sites, in order to parse the respective forms of the web sites. Also, because the server has Internet access and is running as a web server, users of the form management system do not have to be at the central web site to use/manage the system. Secure logins (e.g., using strong 128-bit encryption, etc.) typically are required in order to access the system regardless of location of the user (i.e., on either an Intranet or on the Internet). Once the user of the form management system logs in at the web client 102, the user submits a URL 106 via HTML front end 104 to a Form Manager Servlet (hereinafter referred to as "FMS") 108. The FMS 108 analyzes the requested web page corresponding to the URL 106 and generates a session object including form data 110 and determines at 126 whether or not multiple forms are present from the session object 110. At 128, if it is determined that there are more than one form on the requested page, the FMS 108 presents to the user a form selector 132, for example, a web page that shows/lists the available forms and allows the user to view the forms. The user (or the central web site) then decides which one of the forms to catalog in catalog form 112, for example, implemented as a web page, and can go back and process other forms as well via the form selector 132. If it is determined that only one form is present from the session object 110, the form is cataloged in catalog form 112.

After the form(s) has been cataloged, the user is presented with an updated version of the catalog form 112, including a detailed breakdown and analysis of all of the form objects of the cataloged form(s). In catalog form 112 there is provided, for example, a drop-down menu next to each listed form object. The user uses the drop-down menu to associate respective form fields from the web page corresponding to the URL 106 with the central web sites' registration "template" fields (i.e., common field types are associated with personal information fields used by the central web site).

For example, not all web sites use the term "username" for the name of their login identification (e.g., Yahoo.com uses "yahooid" and some web sites call the username an "ID name" or "login name", or "login ID" etc.). The central web site's associations compensate for disparities in field names across different web sites by associating common field types. For example, sites with different field names for a common field type such as "login" are all associated with the same central web site's registration "template" form field name (e.g., "username"). After all of the fields have been given a central web site association when applicable, the user submits these associations to an FMS 118, which may be the same FMS as FMS 108, via catalog form 112. Because the catalog form 112, where the associations are made, is an HTML form as well, that association data 114 is submitted to the FMS 118 and a session object 116 is automatically passed to the FMS 118. The FMS 118 takes the association data 114 and the data from the session object 116 (i.e., form tags/fields) and creates Structured Query Language (SQL) statements/form data 120 for each form object and which contain the form object data and an association thereof. These statements/form data 120 are sent to the database 122 and stored therein as form data 122b. The user via web client 102 is then given a confirmation page 124 to indicate to the user that the cataloging was successful. The database 122 further stores user account data 122a, user data 122c and web site link data 122d, as will be later described.

Figure 2:
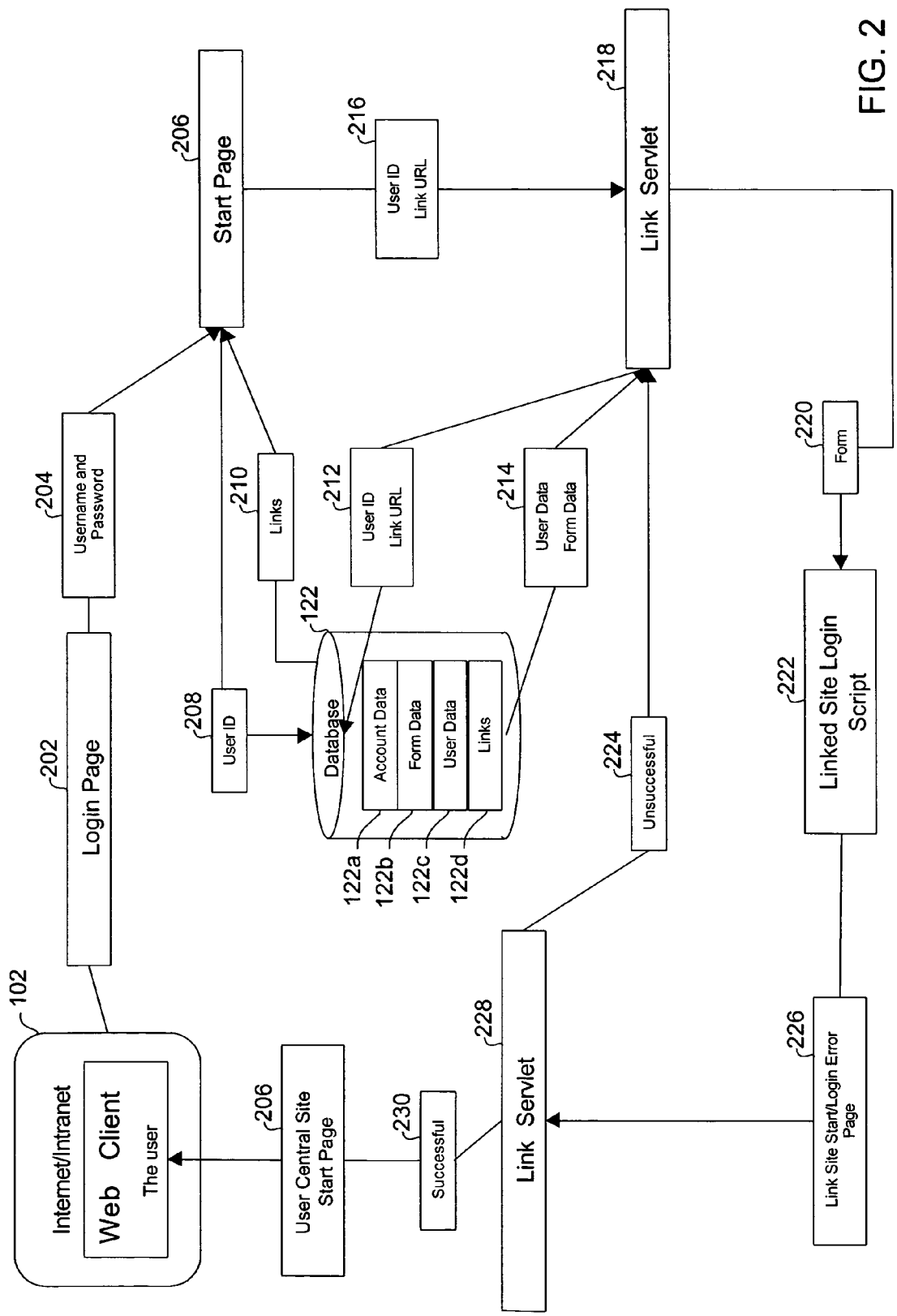
FIG. 2 is a system diagram for illustrating automated logging in of user information for a plurality of web sites, from a central web site location, according to the present invention.

FIG. 2 is a system diagram for illustrating the automated logging in of user information in forms used by plurality of web sites, from a central web site location, according to the present invention. After the form data has been captured, cataloged, and managed, as previously described with respect to FIG. 1, users are automatically logged into a chosen destination site, as will be described with respect to FIG. 2.

In FIG. 2, when a user of the central web site wants to login to one of the user's linked web sites, the user does so by entering the user's password and username 204 via login page 202 of web client 102. A personalized start page 206, including the user's preferred web site links is then generated. The start page 206 is generated from link data 210 corresponding to data 122d stored in the database 122 and associated with the user via user identification 208. The user identification 208 is derived from the user's password and username 204.

From the start page, the user can login to any of the web sites corresponding to link data 210 and listed on the user's start page. The web sites are added and removed from a user's start page by means of a separate process (i.e., via user registration servlet (URS) 306 as will be described with respect to FIG. 3). Once the user decides which destination web site the user wants to login to, the user clicks on a link, based on link data 210, represented as the destination web site's name on the user's start page 206. The user's ID number and web site choice 216 are then used, via link servlet 218 and data 212, to retrieve user data and form data 214 from the database 122. The user data and form data 214 corresponds to data 122a, 122b and 122c stored in the database 122 and associated with the user's ID number.

The servlet 218 then dynamically creates and "fills-out" a completed login form 220 based on the user data and form data 214, by merging the user's account data 122a (i.e., username and password for the destination web site) into the form 220. For example, if the web destination site's login page has a text field for the user's username and password, those fields are populated with the user's username and password data retrieved from the query. As previously described, when the form management system of FIG. 1 catalogs forms, form objects (e.g., text fields, password fields, etc.) are cataloged with corresponding field data from the central web site's template of associated field names. User data, such as a person's telephone number, is also cataloged with a corresponding central web site field data from the template.

In the above example, the servlet 218 to "fills-out" the form 220 by simply inserting the requisite user data (e.g., associated as "username") into the corresponding form tag (e.g., also associated as "username") as the servlet 218 "writes" out the form 220. Once this virtual form 220 is completed, the servlet 218 submits the form 220 as a login script 222 to the destination web site 218, just as if someone filled out the form 220 manually. The destination web site then sends either a confirmation page or an error page 226 back to a central web site servlet 228, which may be the same servlet as the servlet 218. The servlet 228 then parses the page 226 to determine whether or not the login operation was successful or unsuccessful. If the login operation is determined to be unsuccessful, as shown by element 224, the servlet 218 will attempt the login process a predetermined number of times (e.g., five times). If the login operation is determined to be successful, as shown by element 230, the servlet 228 presents the corresponding destination web site start page 206 in a new web browser window or the user's central web site start page 206. The user is now logged in to the user's own account at the destination web site. If the user visits an e-commerce web site as the user's destination web site, any online transactions will be protected, as will be described with respect to other embodiments of the present invention.

Figure 3:
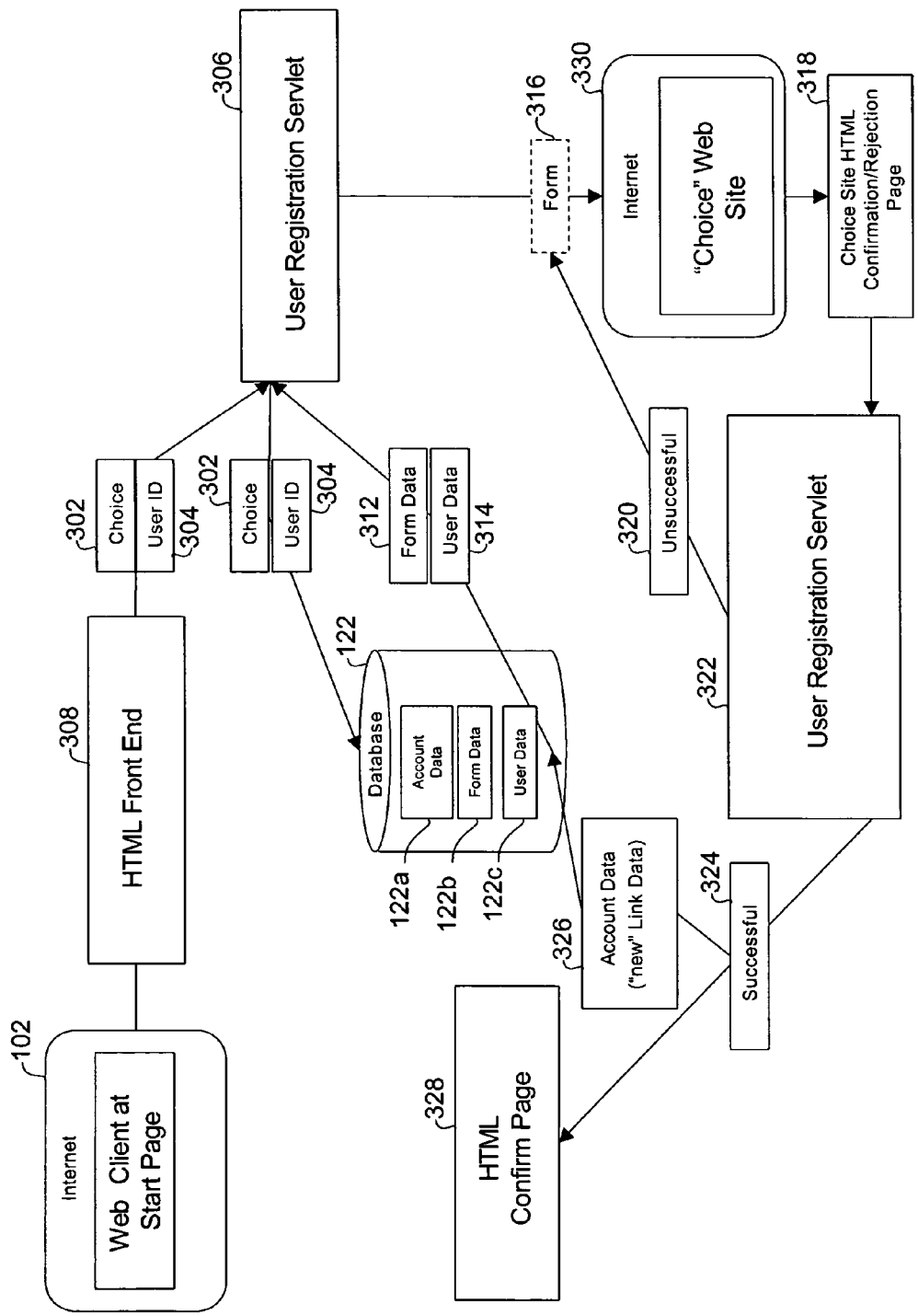
FIG. 3 is a system diagram for illustrating automated registering of user information at a plurality of web sites from a central web site location, according to the present invention.

FIG. 3 is a system diagram for illustrating automated registering of user information at a plurality of web sites, from a central web site location, according to the present invention. As previously described with respect to FIGS. 1 and 2, according to the present invention a user is able to visit the user's favorite web sites without having to manually enter respective user login information. FIG. 3 is used describe how a user is automatically registered at any given web site.

In FIG. 3, when a user of the central web site wants to register with anyone of many web sites for which automated registration is offered, the user simply goes, via web client 102, to a registration web page at the central web site. From the registration web page the user can search a list of sites that have already been cataloged by the form management system, as described with respect to FIG. 1.

Once the user has decided at which web site the user wants to be automatically registered, the user clicks on a link representing that site name. The user's ID number 304 and web site registration choice 302 are then submitted via HTML front end 308 to a user registration servlet (hereinafter referred to as "URS") 306 for further processing. The URS 306 queries (e.g., using a SQL query) the database 122, using the user's ID number 304 and the web site registration choice 302 as query criteria, to retrieve corresponding form data 312 and user data 314, stored as data 122b and 122c, from the database 122. As shown in FIG. 3, the database 122 includes account data 122a, web site form data 122b and user data 122c.

The URS 306 then dynamically creates (i.e., "fills out") a completed form 316 by merging the user data 314 with form data 312 for a destination web site 330 corresponding to the web site registration choice 302. For example, if the destination web site's 330 login page has a text field for a user's telephone number, that field is populated with the user's telephone number data retrieved from the user's account data 122a. When the central web site catalogs forms, form objects (i.e., text fields, password fields, etc.) are cataloged with corresponding field data used by the central web site from the central web site's template of associated field names. User data, such as a person's telephone number, etc., is also cataloged with corresponding field data used by the central web site from the central web site's template.

In the above example, this allows the URS 306 to "fill-out" the form 316 by simply inserting the requisite user data (e.g., associated as "telephone") into the related form tag (e.g., also associated as "telephone") as the URS 306 "writes" out the form 316. Once this virtual form 316 is completed, the form 316 is submitted by the URS 306 to a corresponding form URL at the destination web site 330, just as if someone filled out the form manually. The destination web site 330 then sends either a confirmation page or a rejection page 318 back to a URS 322, which may be the same as URS 306. The URS 322 then parses the page 318 to determine whether or not the registration operation was successful or unsuccessful. If the registration operation is unsuccessful, as shown by element 320, the URS 322 repeats the above described registration process a predetermined number of times (e.g., five times). If, however, the registration operation is successful, as shown by element 324, new account data 326 (i.e., the user's username and password at the destination web site 330) is entered into the database 122. The user is then redirected to a confirmation page 328, which indicates to the user that the user is successfully registered at the destination web site 330 and that the user's corresponding link at the central web site is active.

In the above-described invention, the user name and password for the central web site is different than each of those used to login and/or register the user into the destination web sites. Accordingly, in the preferred embodiment CWS DWS1 DWS2 . . . DWSn, where CWS is the central web site login name and password and DWS1, DWS2, . . . DWSn are those for the destination web sites. However, other embodiments are possible, for example, (i) CWS=DWS1=DWS2= . . . DWSn, and (ii) CWS DWS1=DWS2= . . . DWSn, etc., as will be appreciated by those skilled in the relevant art(s). In addition, to maintain a user's online anonymity, the user names an/or passwords corresponding to CWS, DWS1, DWS2, and/or DWSn may be formed as a series of pseudo-random numbers and/or characters, as will be appreciated by those skilled in the relevant art(s). If the user chooses to use his own personal user login name and password for the CWS, DWS1, DWS2, and/or DWSn, the central web site issues a security warning to the user informing the user that his anonymity and/or online security may be comprised by using previously used and/or easily determined login names and/or passwords.

Online Credit/Debit Card Transaction Management with Minimized Activation Time

With respect to managing online credit/debit card transactions from a central web site location, with minimized activation time, an online credit/debit card account is created, according to the present invention. The online credit/debit card account is made active only during online transaction processing, in order to mitigate the risks in preserving credit/debit card number security on the Internet.

The online credit/debit card account, according to one embodiment, works as follows. The central web site provides to users a co-branded credit/debit card account (e.g., the Central Web Site Visa Card), analogous to the ones provided by, for example, Citibank to American Airlines (i.e., the American Airlines Visa Card), Chase Manhattan Bank to the New York Knicks (i.e., the Knicks Card), etc. This online credit/debit card account functions exactly like a credit/debit card, only there is no actual "card" issued to the user (i.e., the online card is only available to a user while the user is online). This online credit/debit card account includes the above-describe "web active" or dormant payment card service feature and provides a user the power of having the same spending abilities and capabilities online that a credit/debit card provides, without having to sacrifice the security of the user's personal finances.

Accordingly, the central web site issues co-branded online credit/debit "cards" to its users (e.g., through Visa, MasterCard, etc.), except, advantageously, no "real" cards are manufactured for the central web site's users. The web active or dormant payment card feature enables the online credit/debit card account to be active (i.e., able to accept charges) only while the user is actually online using the central web site's services. Every time a user of the central web site clicks on a favorite link to a favorite e-commerce web site (e.g., e-commerce web sites, auction web sites, etc.), as previously described with respect to FIG. 2, software at the central web site location simultaneously transmits an "update file," via, for example, encrypted e-mail, secure facsimile, secure wireless communication, secure telephone communication, etc., to the central web site's co-branded bank(s)/financial institution(s), as the central web site logs the user into the corresponding favorite e-commerce web site. This "update file" is used to "activate" the user's dormant payment credit/debit card account, but only while the user is visiting one or more favorite web sites during e-commerce transactions.

The "update file" includes a text table listing the online credit/debit account numbers of the users who are currently at a site where they need their charge capabilities to be "active." The central web site typically provides parsing software code to the financial institution co-branding the central web site's online credit/debit card accounts, to parse the "update file" that the central web site, for example, e-mails to the financial institution. The financial institution's own programmers may customize the output of the central web site's parsing software to work with the financial institution's own architecture, to change the status of the central web site's own online credit/debit card accounts from "accept" to "decline" and vice versa, according to tables in the "update file."

The central web site's software also sends another "update file" to de-activate a central web site user's online credit/debit card account charging capabilities in whatever time the user set as the user's desired "time out" period (e.g., in the range of 15-30 minutes after the online debit/credit card is initially activated). This "time out" period represents the length of time the user has to shop, before the user's credit/debit card account becomes inactive. Should a user's time run out before the user is done checking out, all that the user has to do is simply re-click on the user's link for that respective site in the user's personal web page at the central web site. Then the user continues on with the user's check-out procedures. Payment to the visited e-commerce web sites, advantageously, are completed using existing procedures to charge a credit/debit "card" account (e.g., Visa's, MasterCard's, etc., existing procedures) known in the art. A user's central web site online credit/debit card account number is cross-referenced with the user's template profile, as described with respect to FIGS. 1 and 2, and the profile is used to register the user at new sites that require a credit/debit card. The above-describe system and method of managing of e-commerce transactions from a central web site location, with minimized online credit/debit card account activation time, will now be described in detail, with reference to FIG. 4.

Figure 4:
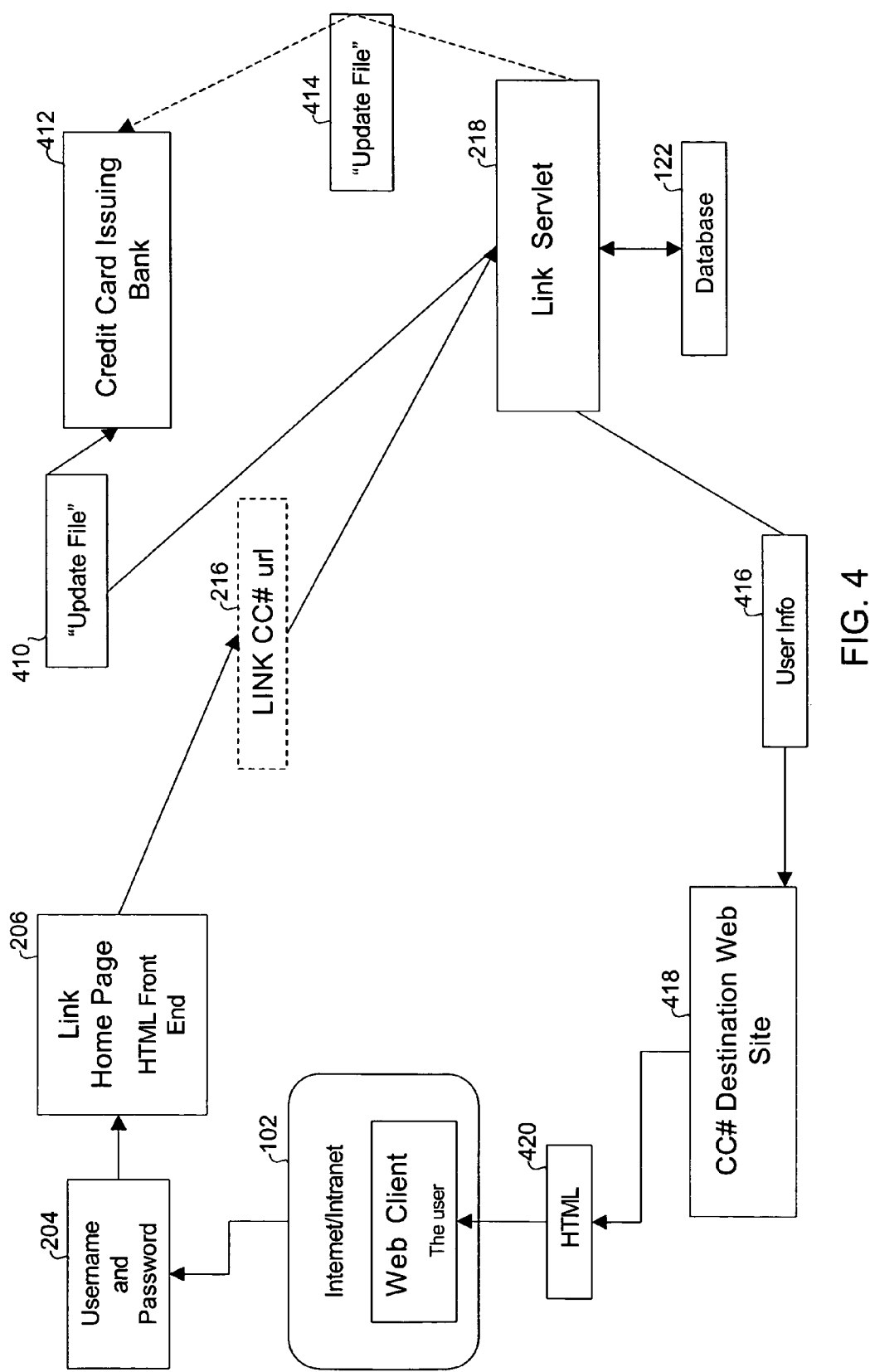
FIG. 4 is a general system diagram for illustrating managing of e-commerce transactions from a central web site location, with minimized online credit/debit card account activation time, according to the present invention.

In FIG. 4, a user logs into the central web site via web client 102 and provides a user name and password 204 to the central web site's HTML front end, which displays the user's corresponding personal web page 206. The user clicks on a link to a destination e-commerce web site 418 and the corresponding URL 216 is transmitted to a link servlet 218. The servlet 218 retrieves the corresponding form data for the URL 216 from database 122. The servlet 218 then submits the corresponding user information 416 to the chosen web site 418. The servlet 218 transmits the user information 416, populated in the login script form data for URL 216 that is stored in the database 122, to the destination web site 418. This, in effect, automatically enters, for the user, the user information 416 into the appropriate form(s) at the destination web site 418. The output HTML 420 web page from the destination web site 418 is then transmitted to the user, via web client 102.

The servlet 218 also transmits an update file 410 (e.g., via encrypted e-mail, secure facsimile, secure wireless communication, secure telephone communication, etc.) to a credit issuing financial institution 412 (e.g., a bank) to activate the user's online credit/debit card account. After a predetermined or user-specified time period (e.g., 15-30 minutes), another update file 414 is sent to the financial institution 412 (e.g., via encrypted e-mail, secure facsimile, secure wireless communication, secure telephone communication, etc.) to deactivate the user's online credit/debit card account. After the financial institution 412 receives the update files 410 or 414, the files are parsed to isolate data elements corresponding to account numbers, accept or decline instructions, etc. The financial institution 412 then cross references the parsed data with its own internal credit/debit card database of tables, completing the operation. The managing of e-commerce transactions from a central web site location, with minimized online credit/debit card account activation time, will now be described in detail, with reference to FIG. 5.

Figure 5:
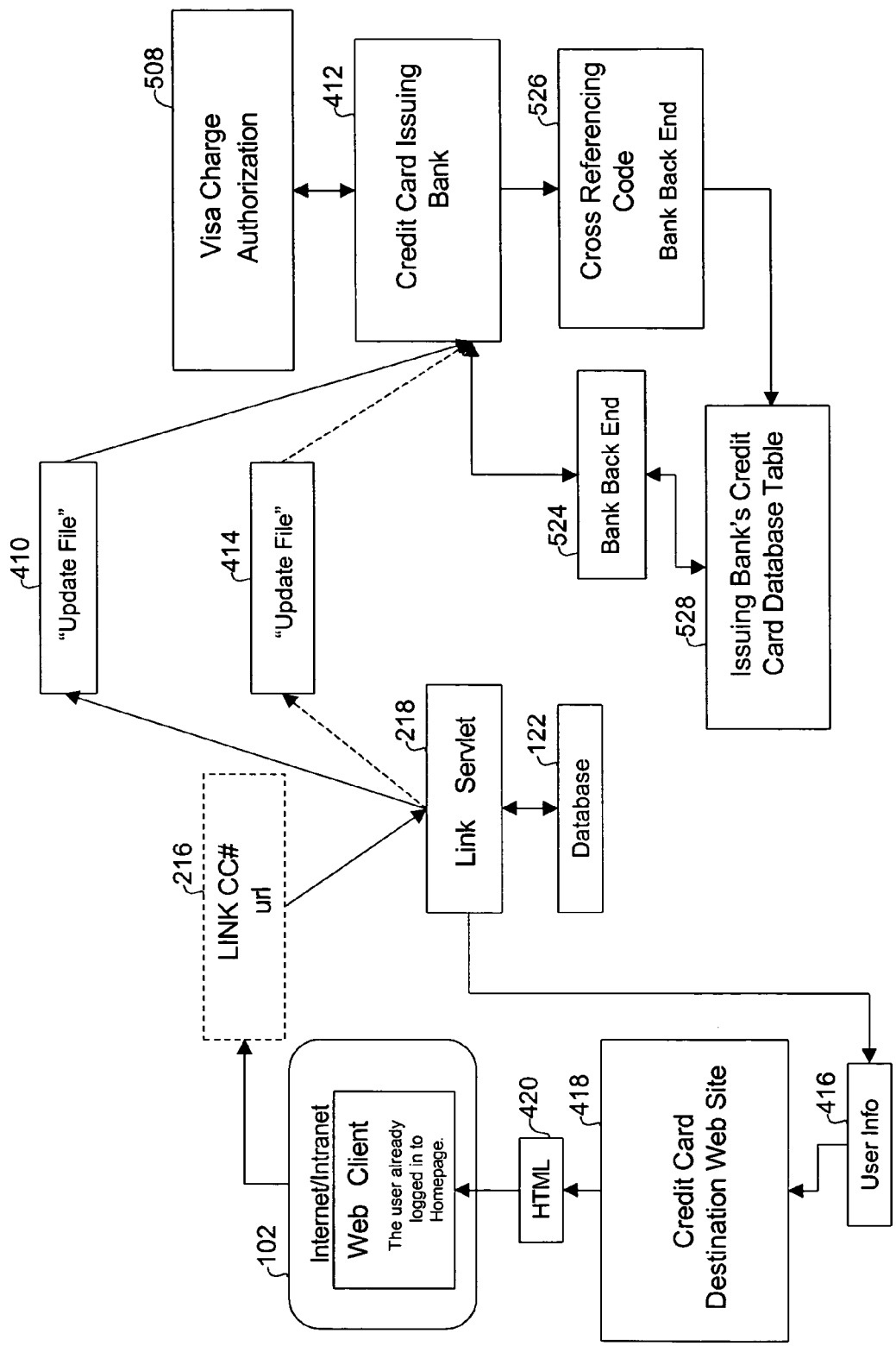
FIG. 5 is a detailed system diagram for illustrating managing of e-commerce transactions from a central web site location, with minimized online credit/debit card account activation time, according to the present invention.

In FIG. 5, after a user is logged into the central web site via web client 102 and submits a URL 216 for a chosen e-commerce web site 418 from the user's personal web page, a servlet 218 retrieves the corresponding form data for the URL 216 from the database 122. The servlet 218 transmits the user information 416, populated in the login script form data for the URL 216 that is stored in the database 122, to the destination web site 418. This, in effect, automatically enters, for the user, the user information 416 into the appropriate form(s) at the destination web site 418. The HTML web page 420 output from the destination web site 218, based on the entered user information 416, is then transmitted to the user via web client 102.

The servlet 218 also transmits an update file 410 (e.g., via encrypted e-mail, secure facsimile, secure wireless communication, secure telephone communication, etc.) to the credit issuing financial institution 412 (e.g., a bank) to activate the user's online credit/debit card account. After a predetermined or user-specified time period (e.g., 15-30 minutes), another update file 414 is sent to the financial institution 412 (e.g., via encrypted e-mail, secure facsimile, secure wireless communication, secure telephone communication, etc.) to deactivate the user's online credit/debit card account. After the financial institution 412 receives the update files 410 or 414, the files are parsed to isolate data elements corresponding to account numbers, accept or decline instructions, etc. A credit card network 508 (e.g., Visa, MasterCard, etc.) then requests authorization from, for example, the financial institution 412, which sends the credit card network 508 the transaction authorization confirmation, when the charge has been successfully processed. Depending on which accounts the central web site updates to active or de-active status, the authorization is processed according to known procedures. The update file 410 typically is always sent to the financial institution 412 before the charge authorization request is received by the credit card network 508 from an online retailer (i.e., the destination web site 418).

A financial institution 412 back end process 524 requests authorization for a dollar value of the user's purchase(s) and a financial institution 412 back end process 526 cross references critical data parsed from the update files 410 or 414 with the financial institution's database tables 528 containing the central web site's online credit/debit card accounts. The back end process 526 takes the critical data values and changes the necessary column and row values in the financial institution's database table 528 to toggle the active status of the central web site's online credit/debit card accounts from "active" to "inactive" and visa versa.

Figure 6:
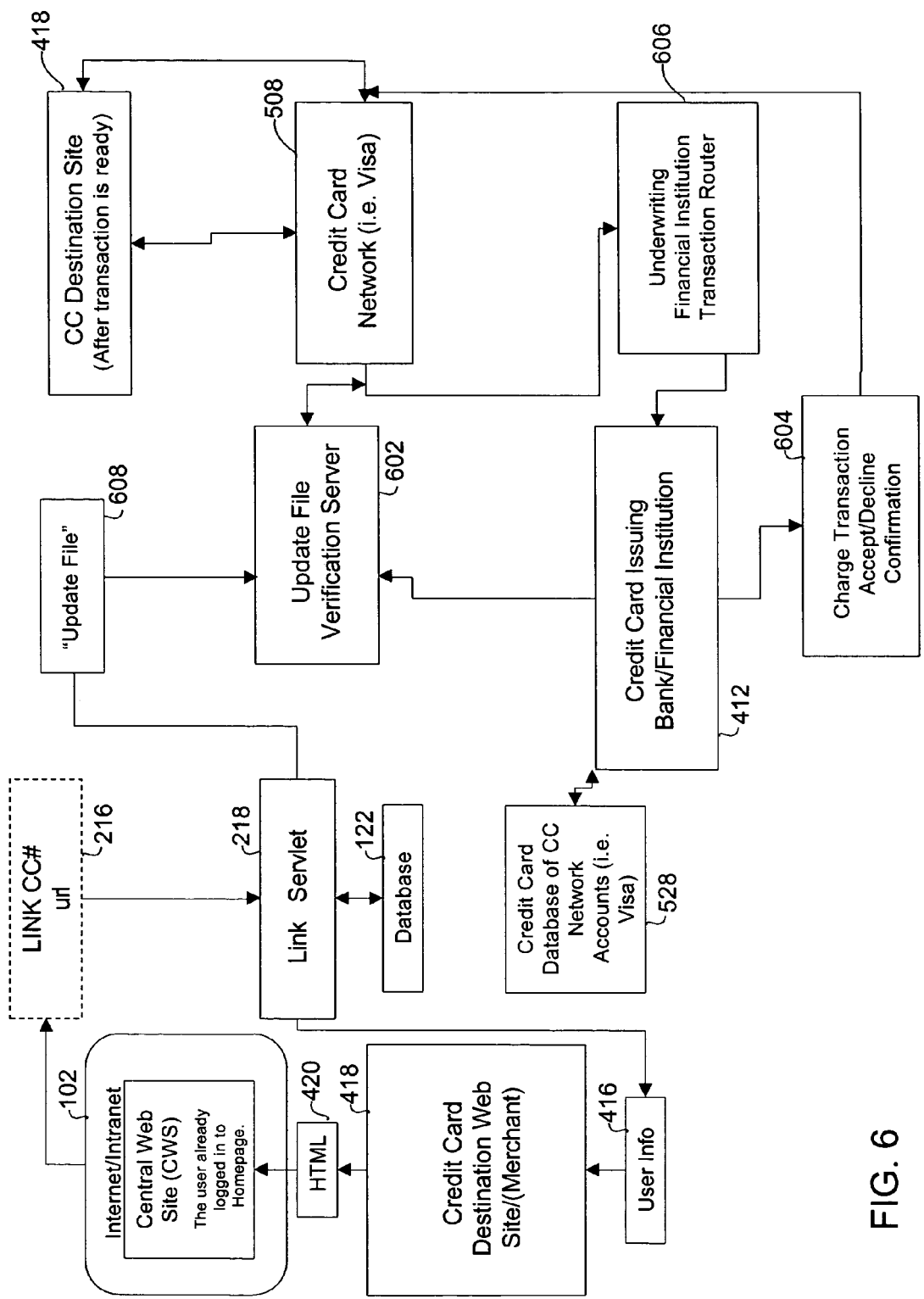
FIG. 6 is a detailed system diagram for illustrating managing of e-commerce transactions in a credit card network from a central web site location, with minimized online credit/debit card account activation time, according to another embodiment of the present invention.

FIG. 6 is a detailed system diagram for illustrating managing of e-commerce transactions in a credit card network from a central web site location, with minimized online credit/debit card account activation time, according to another embodiment of the present invention. In FIG. 6, after a user is logged into the central web site via web client 102 and submits a URL 216 for a chosen e-commerce web site 418 from the user's personal web page, a link servlet 218 retrieves the corresponding form data for the URL 216 from the database 122. The servlet 218 transmits the user information 416, populated in the login script form data for URL 216 that is stored in the database 122, to the destination web site 418. This, in effect, automatically enters, for the user, the user information 416 into the appropriate form(s) at the destination web site 418. The HTML web page 420 output from the destination web site 418, based on the entered user information 416, is then transmitted to the user via web client 102. When the user at the destination web site 418 makes an online credit card transaction, this request is sent to a credit card network 508 (e.g., Visa, MasterCard, etc.) and the servlet 218 transmits an update file 608 (e.g., via encrypted e-mail, secure facsimile, secure wireless communication, secure telephone communication, etc.) into a communications channel of the credit card network 508. An update file verification server (hereinafter referred to as "UFVS") 602 monitors the communication channel (e.g., using a Java script "sniffer/snooper" software) to filter out purchase requests made via the central web site from normal traffic of traditional credit card transactions in the communications channel of the credit card network 508. The UFVS 602 verifies the central web site's accounts against the update file 608 sent from the central web site via the servlet 218. If the UFVS 602 determines that the update file 608 is not present, then the transaction is automatically rejected and the user is notified accordingly, (e.g., via message sent to the user's personal page at the central web site, via e-mail, etc.).

If, however, the UFVS 602 determines that the update file 608 is present, the transaction is allowed to be processed. Accordingly, the credit card network 508 takes user information transmitted via the update file 608 and authenticates that the user is online via the central web site's UFVS 602. The credit card network 508 then transmits a charge request to an underwriting financial institution (e.g., a bank) using known processes in place for credit card transactions. Only after the user's transaction has been verified via the update file 608, the corresponding purchase request is sent back to an underwriting financial institution transaction router 606 to be merged into a same work flow as traditional credit card transactions are handled. Accordingly, a credit card issuing financial institution 412 (e.g., a bank) takes the credit card account number transmitted from the underwriting financial institution transaction router 606 and checks its database to determine if there is enough credit to honor the transaction request for the user. After the transaction is processed by the credit card issuing financial institution 412, an accept/decline confirmation 604 is sent to the UFVS 602 to initiate deletion of the update file 608, to the credit card network and to the destination web site 418 (e.g., online merchant, etc.), completing the operation.

Minimal development time is needed to launch the implementation of the online credit/debit card account, with minimized activation time, because the service can be set up by using existing architectures (e.g., Visa's, MasterCard's, financial institution's, etc., existing architectures). Since the central web site's online credit/debit card accounts are actual credit "card" accounts, e-commerce web sites will readily accept these accounts as an alternative form of payment during e-commerce transactions.

Accordingly, by limiting the activation time for the online credit/debit card account, a user will be able to minimize the user's financial exposure during online credit/debit card transactions.

Online Credit/Debit Card Transaction Management with Minimized Financial Exposure The online credit/debit card account, with minimized financial exposure, works as follows. The online credit/debit card system operates in a manner similar to a metro card for a mass transit authority (e.g., a MetroCard for the NYC Mass Transit Authority), but is "charged up" from a user's existing credit/debit card account with a bank or other financial institution. The online credit/debit card account system can be supported in the current marketplace, for example, by banking or financial institutions, which have advanced encryption and online banking services already in place, and by the financial institutions that issue credit/debit charge cards. The above-noted minimized financial exposure feature provides an additional measure of control over how much of a user's finances will be exposed during online financial transactions and can be used alone or in combination with other embodiments of the present invention.

The financial institutions that are supporting the current credit/debit card system will create an online credit/debit card account number which will allow their own customers to authorize a predetermined amount of money to be allocated to their "new" online credit/debit card account on the online credit/debit system of the central web site. The "charging up" of the online credit/debit card account is done with the existing encrypted online banking networks and sites of the financial institutions providing the support for the online credit/debit card account system. After the online credit/debit card account is created and charged, the financial institution issuing the account forwards the balance information and account number to the central web site along with customer information. The managing of e-commerce transactions from a central web site location, with minimized financial exposure for an online credit/debit card account, will now be described with reference to FIG. 7.

Figure 7:
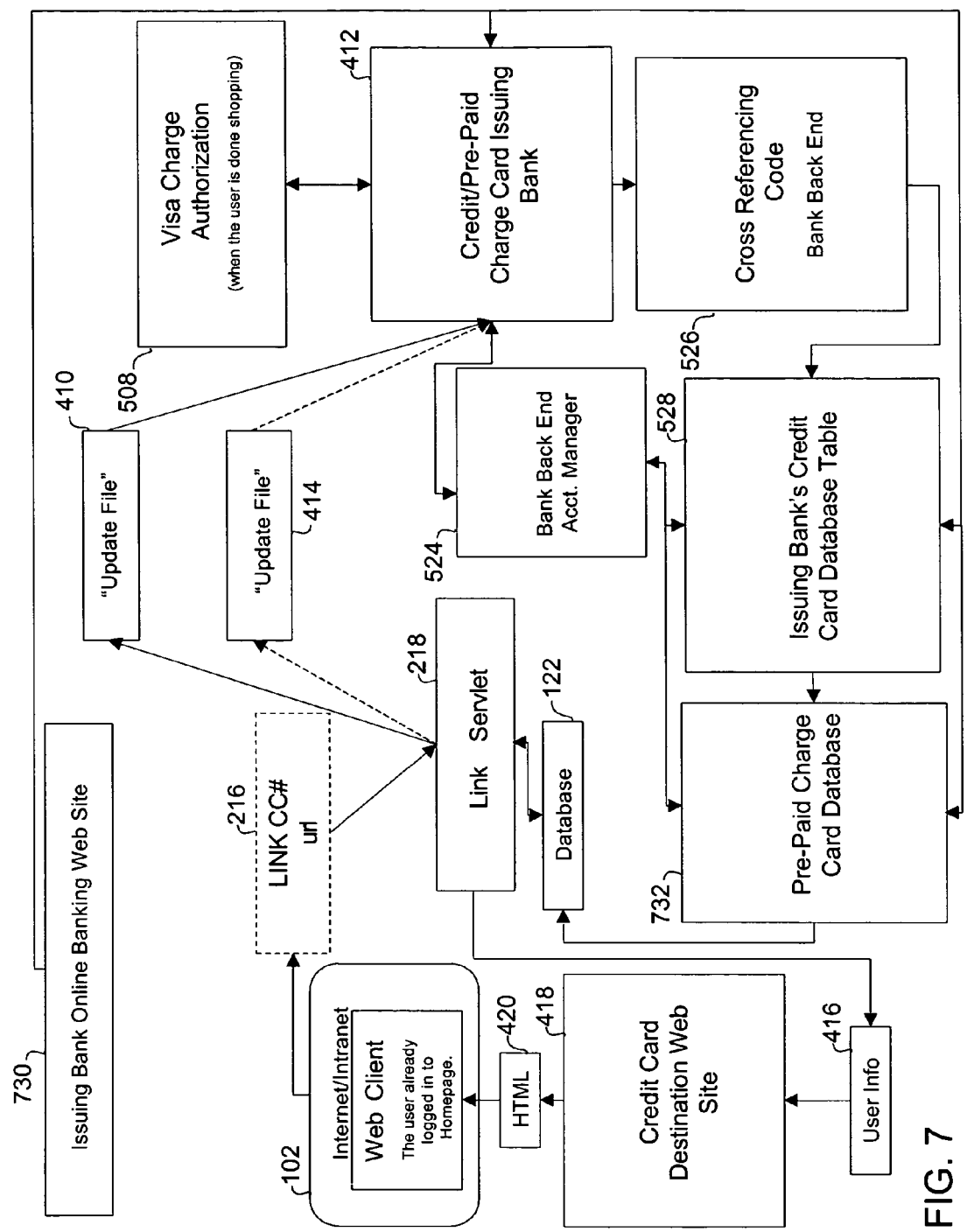
FIG. 7 is a detailed system diagram for illustrating managing of e-commerce transactions from a central web site location, with minimized financial exposure of an online credit/debit card account, according to the present invention.

In FIG. 7, after a user is logged into the central web site via web client 102 and submits a URL 216 for a chosen e-commerce web site 418 from the user's personal web page, a servlet 218 retrieves them from the database 122 the corresponding form data for the URL 216. The servlet 218 transmits the user information 416, populated in the login script form data for URL 216 that is stored by the form management system of FIG. 1, to the destination web site 418. This, in effect, automatically enters the user information 416 into the appropriate form(s) at the destination web site 418, for the user. The HTML web page 420 output from the destination web site 418, based on the entered user information 416, is then transmitted to the user via web client 102.

The servlet 218 also transmits an update file 410 (e.g., via encrypted e-mail, secure facsimile, secure wireless communication, secure telephone communication, etc.) to the credit issuing financial institution 412 (e.g., a bank) to activate the user's online credit/debit card account. After a predetermined or user-specified time period (e.g., 15-30 minutes), another update file 414 is sent to the financial institution 412 (e.g., via encrypted e-mail, secure facsimile, secure wireless communication, secure telephone communication, etc.) to deactivate the user's online credit/debit card account. After the financial institution 412 receives the update files 410 or 414, the files are parsed to isolate data elements corresponding to account numbers, accept or decline instructions, etc. A credit card network 508 (e.g., Visa, MasterCard, etc.) then requests authorization from, for example, the financial institution 412, which sends the credit card network 508 the transaction authorization confirmation when the charge has been successfully processed. Depending on which accounts the central web site updates to active or de-active status, the authorization is processed according to known procedures. The update file 410 typically is always sent to the financial institution 412 before the charge authorization request is received by the credit card network 508 from an online retailer (i.e., the destination web site 418).

A financial institution 412 back end process 524 requests authorization for a dollar value of the user's purchase(s) and a financial institution 412 back end process 526 cross references critical data parsed from the update files 410 or 414 with the financial institution's database tables 528 containing the central web site's online credit/debit card accounts. The back end process 526 takes the critical data values and changes the necessary column and row values in the financial institution's database table 528 to toggle the active status of the central web site's online credit/debit card accounts from "active" to "inactive" and visa versa.

To limit the financial exposure of the online credit/debit card account, the user via, for example, the financial institution's 412 web site 730 or other existing means, authorizes the "charging up" (i.e., pre-payment) of the online credit/debit card account. A pre-paid charge online credit/debit card account database 732 stores the user's pre-paid amount authorized from the user's existing credit/debit card account. The pre-paid charge online credit/debit card account database 732 is coupled to the central web site's database 122 so that the user's online credit/debit card account balance and other information can be stored in the central web site's database 122.

Minimal development time is needed to launch the implementation of the online credit/debit card account, with minimized balance, because the service can be set up by using existing architecture (e.g., Visa's, MasterCard's, financial institution's, etc., existing architectures) and with the addition of an online credit/debit card pre-paid charge database 732. The online credit/debit card account system can therefore be used with existing and developing web sites as an alternative to conventional credit card numbers in their existing registration forms.

Accordingly, by limiting the amount of funds available to the online credit/debit card account, a user will be able to minimize the user's financial exposure during online credit/debit card transactions.

Secure Offline Credit Card Transaction Management

Although the present invention is described in terms of providing an online credit/debit card in the form of a virtual credit card and typically will not entail issuing a real world physical card in order to address security concerns, the present invention may be practiced by issuing a real world physical credit card as will now be discussed.

Figure 8:
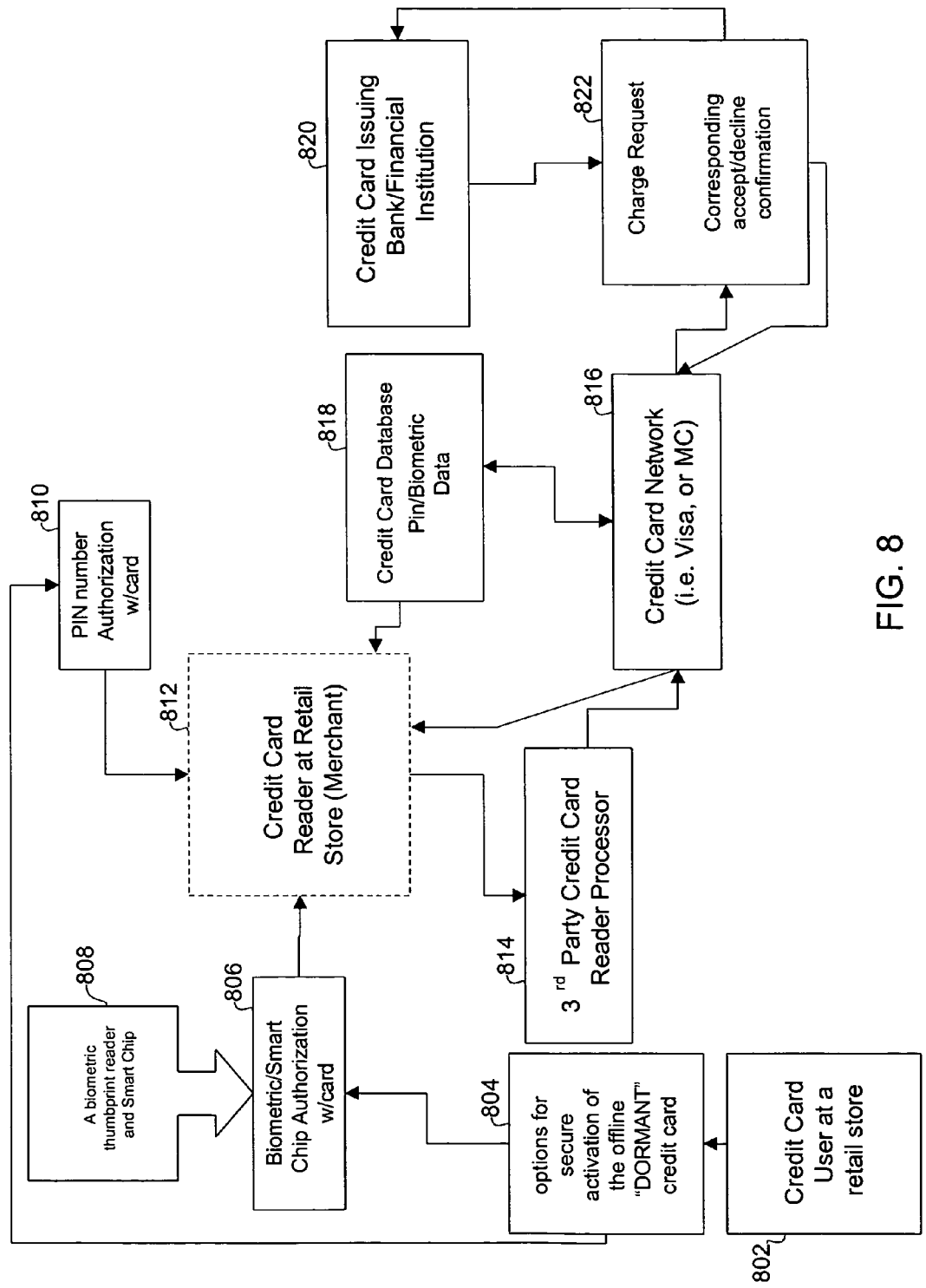
FIG. 8 is a detailed system diagram for illustrating managing of offline credit/debit card transactions, with minimized financial exposure of a credit/debit card account, according to the present invention.

FIG. 8 is a detailed system diagram for illustrating managing of offline credit card transactions, with minimized financial exposure of a credit card account, according to the present invention. In FIG. 8, a credit card user 802 at a point-of-sale (POS) terminal of retail store attempts to make an offline credit card purchase. The credit card is configured to be dormant (i.e., not usable) until the user's identity is confirmed during a credit card transaction in various possible ways, as shown by element 804. The user's identity may be confirmed via a biometric/smart chip extraction device 806 (e.g., a biometric thumb print/voice print, etc., extraction device 808) embedded within the credit card, via PIN number extraction 810, via voice/retinal feature extraction, etc.

In any case, the user's identity information is extracted, this information is sent to a credit card processor 814 (e.g., located in the retail store), which takes the user identification information and the credit card transaction information and determines which credit card network should receive the credit card charge request. The credit card processor 814 then submits the charge request to an appropriate credit card network 816 (e.g., Visa, MasterCard, etc.). The credit card network 816 then takes the information transmitted via the credit card reader 812 and authenticates the identification data of the user gathered by whichever method was used (i.e., using the biometric, PIN number data, etc., of the user).

The credit card network 816 uses a credit card database 818 to authenticate the user's identity information. If authentication of the user can not be made via the database 818, then the credit card remains in a dormant (i.e., unusable) state, a charge request is not forwarded to a credit card issuing financial institution 820 (e.g., a bank) and a credit card charge rejection is sent to the credit card reader 812. If, however, authentication of the user can be made via the database 818, then the credit card network 816 submits the charge request 822 to the credit card issuing financial institution 820 using the same processes that have been established by the credit card network 816 for normal credit card transaction processing.

Accordingly, the credit card issuing financial institution 820 takes the credit card account number from the charge request 822 and verifies via its database 818 if there is enough credit to honor the transaction request for the user. After the transaction is processed by the credit card issuing financial institution 820, an accept/decline confirmation 822 is sent to the credit card network 816 and to the retailer, via the card reader 812, completing the credit card transaction.

Figure 9:
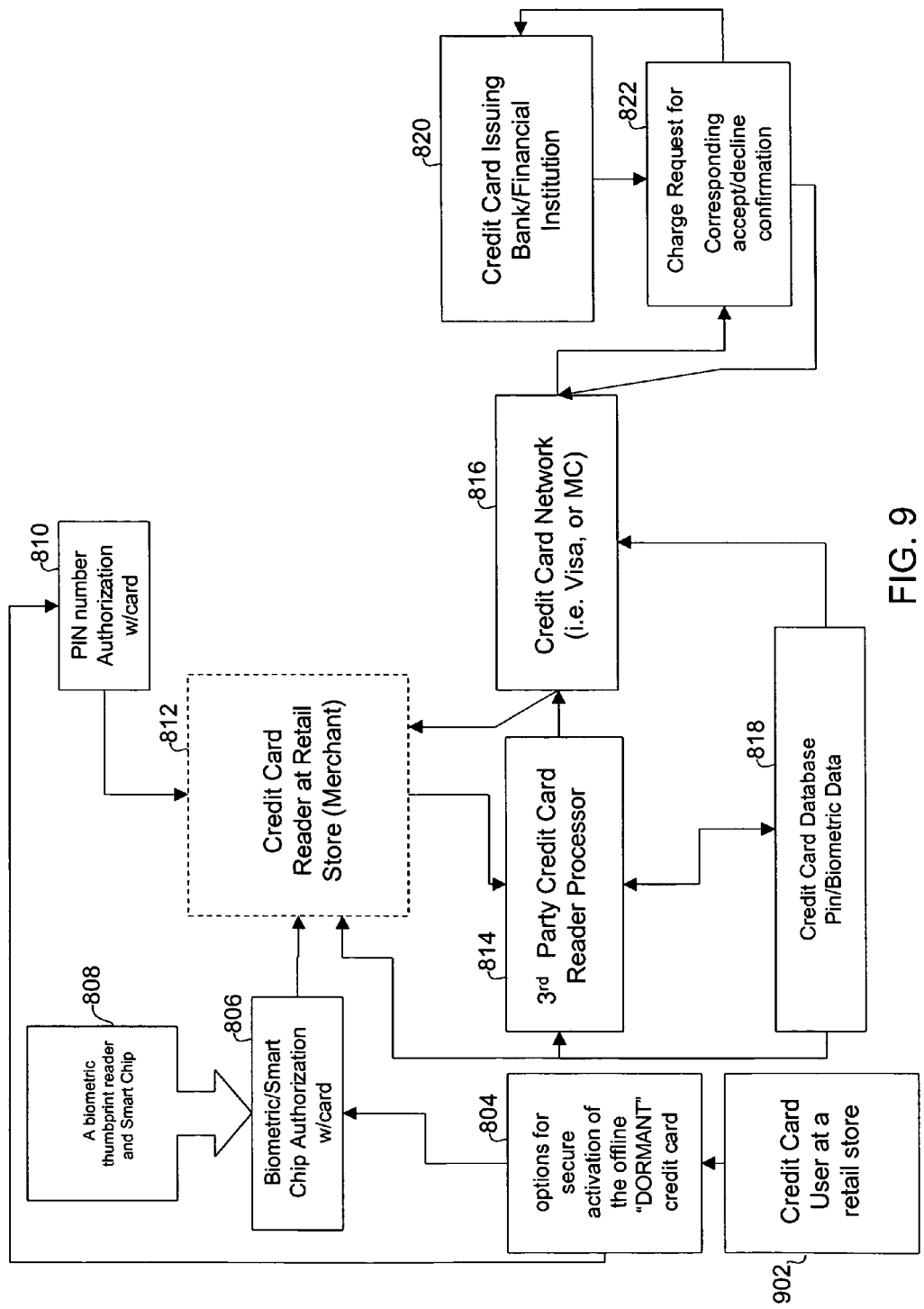
FIG. 9 is a detailed system diagram for illustrating managing of offline credit/debit card transactions, with minimized financial exposure of a credit card account, according to another embodiment of the present invention.

FIG. 9 is a detailed system diagram for illustrating managing of offline credit card transactions with minimized financial exposure of a credit/debit card account, according to another embodiment of the present invention. The system of FIG. 9 is similar to the system of FIG. 8, except that the credit card database 818 for authenticating the user's identity information is not directly controlled by the credit card network 816. Otherwise, the system of FIG. 9 operates in a similar manner as the system of FIG. 8 and will not be further described for the sake of brevity.

Accordingly, by controlling the offline credit card account, a user will be able to minimize the user's financial exposure during offline credit card transactions.

Subordinate Credit/Debit Card Control System

The present invention further includes what is referred to as a "Subordinate Card Control System," as later will be described in detail with reference to FIGS. 10-24. This so-called Subordinate Card Control System (SCCS) operates to facilitate both offline and online credit/debit card transaction and may be used in conjunction with any of the previously describes embodiments of the present invention.

The SCCS inter-operates with existing architectures of banks/financial institutions. The administration/control function is performed via the central web site for both offline and online transactions. Both the online and offline systems allow a primary credit/debit card holder, such as a parent, to issue a "subordinate" credit/debit card for a user, such as the holder's child, dependent, etc., and which will have a predetermined credit limit that can be changed at any time so long as the primary or "master" credit/debit card has an available balance. The pre-determined credit limit for the subordinate credit/debit card is set by the holder and is tied to the master card. Such a system can be used as a tool for parents to teach their children how to manage and spend money, while still being tethered to the parent's card for the parent's own comfort level of control. That is, the system provides a sort of transitory spending product for a child, until the child is ready to have their own credit/debit card. For example, the system allows a parent to issue his/her child a subordinate card when the child goes away to college, giving the child the responsibility related to the credit/debit card experience, as compared to conventional credit/debit card models.

In the simplest level of operation, the system will not only allow a parent to set a credit limit for the subordinate credit/debit card (i.e., dependent's card), the system will provide levels of control over the subordinate credit/debit card for the parent. For example, (i) a calendar control feature is provided, which allows the parent the ability to only allow purchases using the subordinate credit/debit card during certain times of the month, (ii) a transaction limit feature is provided, which allows the parent the ability to limit a number of transactions with the subordinate credit/debit card within a pre-determined time period (e.g., during a week, during a month, during a day, etc.); and (iii) a merchant identification (ID) feature is provided, wherein subordinate credit/debit card transaction data packets contain a merchant ID number to reference the merchant selling goods/services purchased during the transaction. The central web site maintains a table of merchant ID number and associated transaction data. The merchant ID numbers are further used to identify, for example, the merchant's industry, location, etc., allowing a parent to monitor a child's purchases using the subordinate credit/debit card with respect industries, such a food services, supermarkets, transportation, etc., and with respect to location. Such ID numbers maintained in the central web site's tables can be used by the parent to control and restrict transactions to only specific merchants (e.g., food services, transportation, etc.), and/or to restrict transactions for a whole genre of merchants (e.g., pornography, video games, music, etc.), via a control feature interface provided by the central web site.

The central web site provides the above-noted interface for the primary user (e.g., a parent) to set the above-noted controls. Then, when a subordinate credit/debit card transaction occurs, the central web site only processes the transaction (i.e., forward the subordinate credit/debit card transaction data packet to the central web site's issuing bank/financial institution), if the transaction meets the control criteria, such as during a pre-determined time, or at a predetermined location, set by the parent.

The above-described SCCS works seamlessly for both online and offline subordinate debit/credit card transactions, because the central web site sees the transaction data packets for all transactions, both online and offline, before forwarding the packets on to the issuing bank/financial institution. Accordingly, the central web site decides whether or not to forward the transaction data packet, based upon the controls setup by the parent via the central web site interface. The SCCS will now be described, with reference to FIGS. 10-24.

Figure 10:
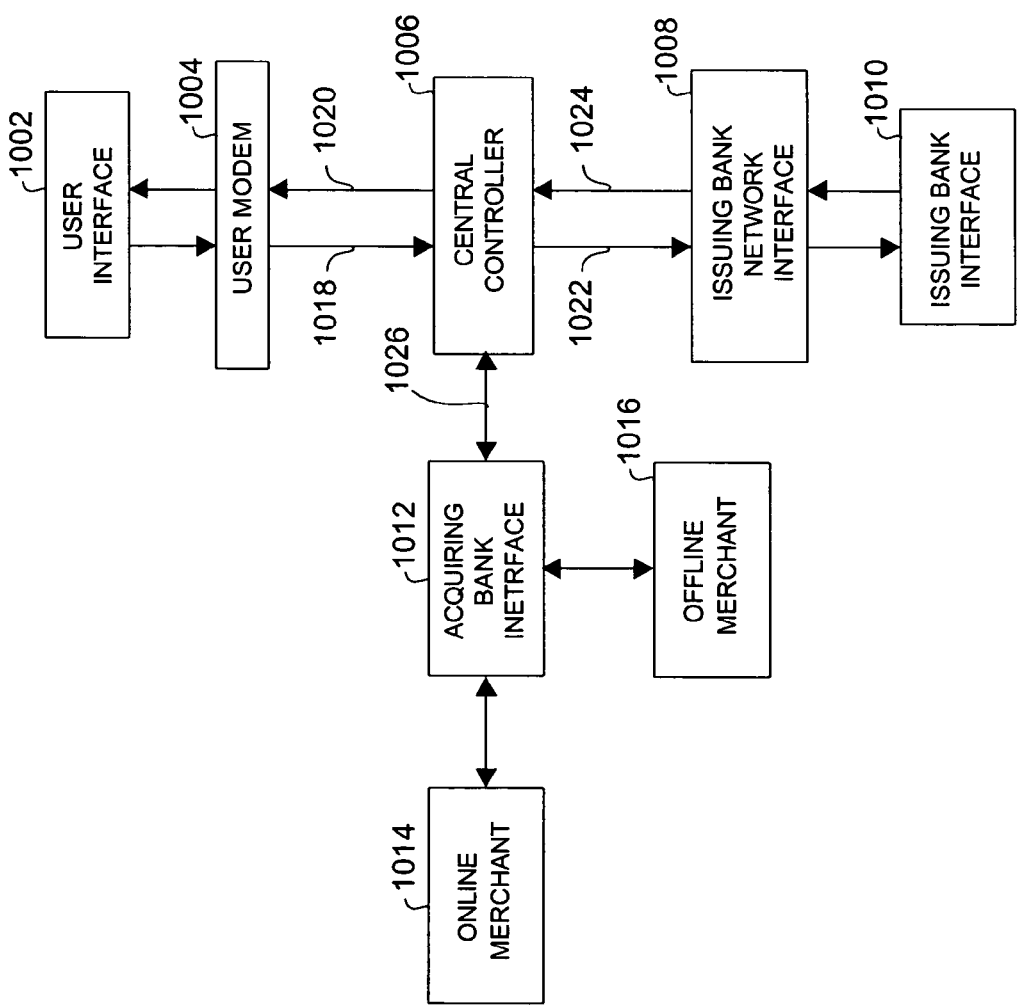
FIG. 10 is a general system diagram for illustrating a subordinate credit/debit card system, according to the present invention.

In FIG. 10, the SCCS includes a user interface 1002, a user modem 1004, a central controller 1006, an issuing bank interface 1010 including associated databases, an issuing bank network interface 1008, an acquiring bank interface 1012, an offline merchant 1016 and an online merchant 1014. The present invention receives a conditional modification data request (CMDR) 1018 from a user, attempts to validate the request, and if the request is valid, updates a local subordinate credit/debit card data and sends an update signal 1022 to the card's issuing bank 1010. Thus a user is able to remotely set subordinate card controls, such as balance and transactions limits, etc., via the CMDR 1018.

As shown in FIG. 10, the SCCS includes the user interface 1002, the central controller 1006, the issuing bank interface 1010 and the acquiring bank interface 1012. The above-noted components of the SCCS are referred to as "nodes". Each node is connected, for example, via an Internet connection using a public switch telephone network, such as those provided by a local or regional telephone company. The connection also may be provided by dedicated data lines, cellular, Personal Communication Systems ("PCS"), microwave or satellite networks, etc., as will be appreciated by those skilled in the relevant art(s). The user interface 1002 and issuing bank interface 1010 are the input and output gateways for communications with the central controller 1006.

Figure 11:
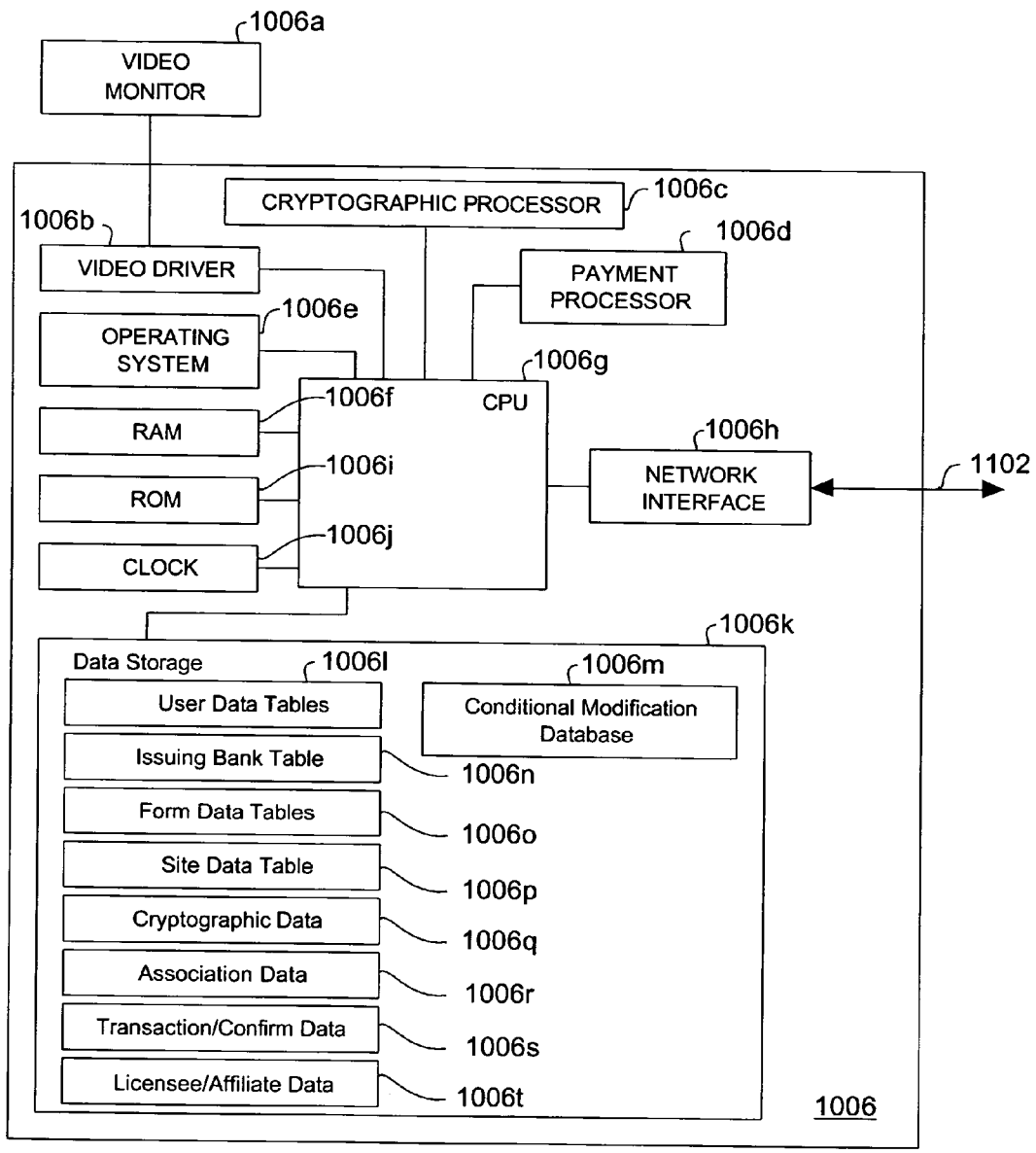
FIG. 11 is a block diagram for illustrating a central controller of the system of FIG. 10, according to the present invention.

Using the above components, the present invention provides a method and system to allow cardholders to update "subordinate card controls," such as those previously described. As shown in FIG. 11, the central controller 1006 includes a central processing unit (CPU) 1006g, cryptographic processor 1006c, RAM 1006f, ROM 1006i, payment processor 1006d, clock 1006j, operating system 1006e, network interface 1006h and data storage device 1006k.

A conventional personal computer or workstation with sufficient memory and processing ability may be used as the central controller 1006. In one embodiment, the central controller 1006 operates as a web server, both receiving and transmitting data generated by users and/or the central web site. Central controller 1006 typically must be capable of high volume transaction and network processing, performing a significant number of mathematical calculations and network operations in processing communications and database queries.

A cryptographic processor 1006c supports the authentication of communications between the nodes of the SCCS, as well as anonymous/secure transmissions therebetween. The cryptographic processor 1006c also may be configured as part of the CPU 1006g or may be implemented via software (e.g., using Pretty Good Privacy (PGP) software, etc.). The functions of the cryptographic processor 1006c will be further described in conjunction with cryptographic authentication flow charts of FIGS. 21-24.

A payment processor 1006d includes one or more conventional microprocessors (such as the Intel Pentium III) supporting the transfer and exchange of payments, charges, or debits, attendant to the method of the system. The payment processor 1006d also may be configured as part of the CPU 1006g. Processing of credit/debit card transactions by payment processor 1006d may be supported by commercially available software.

A data storage device 1006k may include hard disk, magnetic or optical storage units, as well as CD-ROM Drives, flash memories, etc. The data storage device 1006k includes databases used in the processing of transactions and authentication and includes, for example, user data 1006l, issuing bank data 1006n, form data 1006o, site data 1006p, cryptographic key data 1006q, association data 1006r, transaction/confirmations data 1006s, licensee/affiliate database 1006t, and conditional modification data 1006m. In a preferred embodiment, database software manufactured by the Oracle Corporation is used to create and manage the database 1006k.

The user data 1006l includes data, such as a user's name, address, personal information, login and registration information for all of the user's linked sites, etc., as previously described with respect to FIGS. 1-3. The issuing bank data 1006n includes data, such as routing information with respect to communications, transactions, etc. The form data 1006o includes data, such as HTML form data for registered web sites, etc., as previously described with respect to FIGS. 1-3. The site data 1006p includes data, such as web site names and associated URLs, etc., as previously described with respect to FIGS. 1-3. The cryptographic key data 1006q includes data for facilitating cryptographic functions, storing both symmetric and asymmetric keys, etc. The keys stored as the cryptographic key data 1006q are used by the cryptographic processor 1006c for encrypting and decrypting transmissions between nodes of the SCCS. Association data 1006r includes data, such as a user's name, address etc., that are associated/referenced to the central controller "user template" form(s), as previously described with respect to FIGS. 1-3. The association data 1006r also includes data, such as a merchant ID number and data for associations, such as vendor type, etc. Multiple types of association data typically are used for the execution of the various embodiments described herein. Transaction/confirmation data 1006s includes data, such as data for tracking all central controller credit/debit card, user and subordinate, transaction/confirmation activity, etc. Licensee/affiliate data 1006t includes data, such as data for logging licensee/affiliate names, identification numbers, etc., and data for tracking licensee/affiliate transactions garnered through a contract relationship with the central web site. Conditional modification data 1006m includes data, such as data for logging licensee/affiliate names, id numbers, etc., and data for tracking licensee/affiliate transactions garnered through a contract relationship with the central web site.

A network Interface 1006h is provided as a gateway to communicate with the nodes of the SCCS via signals 1102, which include, for example, signals 1018, 1020, 1022, 1024 and 1026 of FIG. 10. Conventional internal or external modems may serve as the network interface 1006h. The network interface 1006h may include modems at a range of baud rates from 1200 upward, may combine such inputs into a T1 or T3 line if more bandwidth is required. In a preferred embodiment, network interface 1006h is connected to the Internet and/or any of the commercial online services such as America Online, or the Microsoft Network, etc., allowing users and issuing banks access from a wide-range of online communications. Alternately, network interface 1006h may be configured as a voice mail interface, web site, BBS, electronic mail address, etc.

While the above embodiment describes a single computer acting as a central controller 1006, those skilled in the art will realize that the functionality can be distributed over a series of computers. In one embodiment, the central controller 1006 is configured in a distributed architecture, wherein the database 1006k and the processors 1006g, 1006c and 1006d are housed in separate units or locations. In such a case, some controllers perform the primary processing functions and contain at a minimum RAM, ROM, and a general processor. Each of these controllers is attached to a WAN hub which serves as the primary communications link with the other controllers and interface devices. The WAN hub may have minimal processing capability itself, serving primarily as a communications router. Those skilled in the art will appreciate that an almost unlimited amount of controllers may be supported. This arrangement yields a more flexible and dynamic system less prone to catastrophic hardware failures affecting the entire system. The hardware for these servers would be configured similarly to that described for the central controller 1006.

Figure 12:
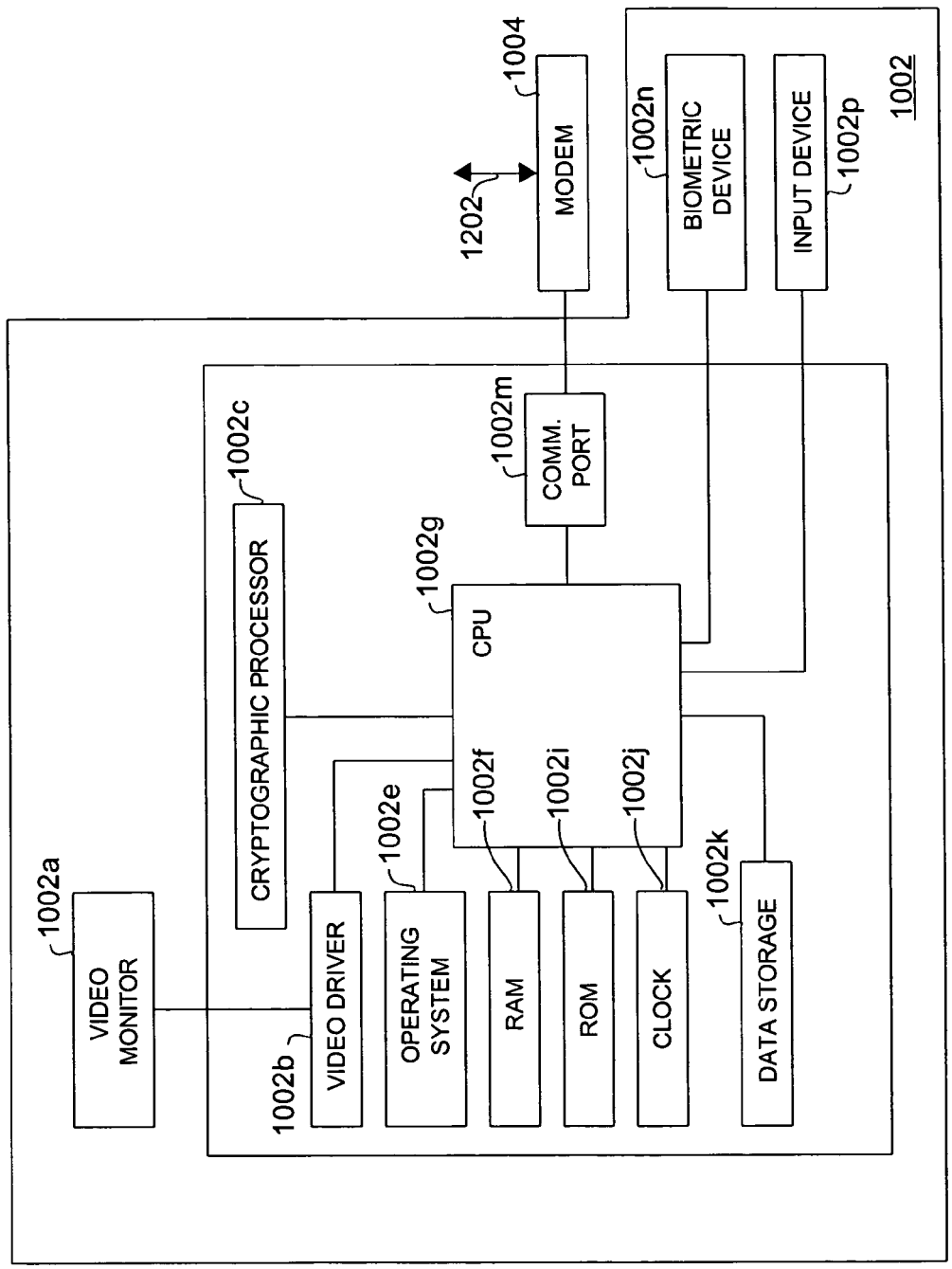
FIG. 12 is a block diagram for illustrating a user interface of the system of FIG. 10, according to the present invention.

FIG. 12 is a block diagram for illustrating the user interface 1002 of the system of FIG. 10. In an exemplary embodiment, the user interface 1002 is a conventional personal computer having an input device 1002p, such as a keyboard, mouse, or conventional voice recognition software package, a display device, such as a video monitor 1002a, and a processing device, such as a CPU 1002g. The user interface 1002 is coupled to a network interface, such as a modem 1004. The device 1004 interacts with the central controller 1006 via signals 1202, for example, including signals 1018 and 1020 of the system of FIG. 10. Alternatively, the user interface 1002 may be a voice mail system, an electronic or voice communications system, etc. As will be described in later embodiments, devices, such as a facsimile machine, a cellular phone, a PDA, a pager, etc., are also suitable as an interface device 1004.

As shown in FIG. 12, the user interface 1002, for example, includes a central processing unit (CPU) 1002g, RAM 1002f, ROM 1002i, clock 1002j, video driver 1002b, video monitor 1002a, communications port 1002m, input device 1002p, operating system 1002e, biometric device 1002n, cryptographic processor 1002c and data storage device 1002k. The cryptographic processor 1002c and biometric device 1002n are included for performing authentication and cryptographic functions as will be later described. An Intel Corporation Pentium microprocessor may be used for CPU 1002g and/or cryptographic processor 1002c. A clock 1002j, such as a standard chip-based clock etc., is provided, and which serves to timestamp messages and other communications.

The modem 1004 typically may not require high-speed data transfers since most conditional modifications and confirmations are short text-based data. Alternatively, the user interface 1002 may include a network interface, such as the network interface 1006h described in FIG. 11. The data storage device 1002k is a conventional magnetic-based hard disk storage unit such as those manufactured by Western Digital. The cryptographic processor 1002c may be similar to the processor 1006c described in FIG. 11. The biometric device 1002n may be implemented via specialized hardware, firmware and/or software and perform biometric functions, such as a voice recognition, retinal scanning, fingerprint recognition, etc.

Figure 13:
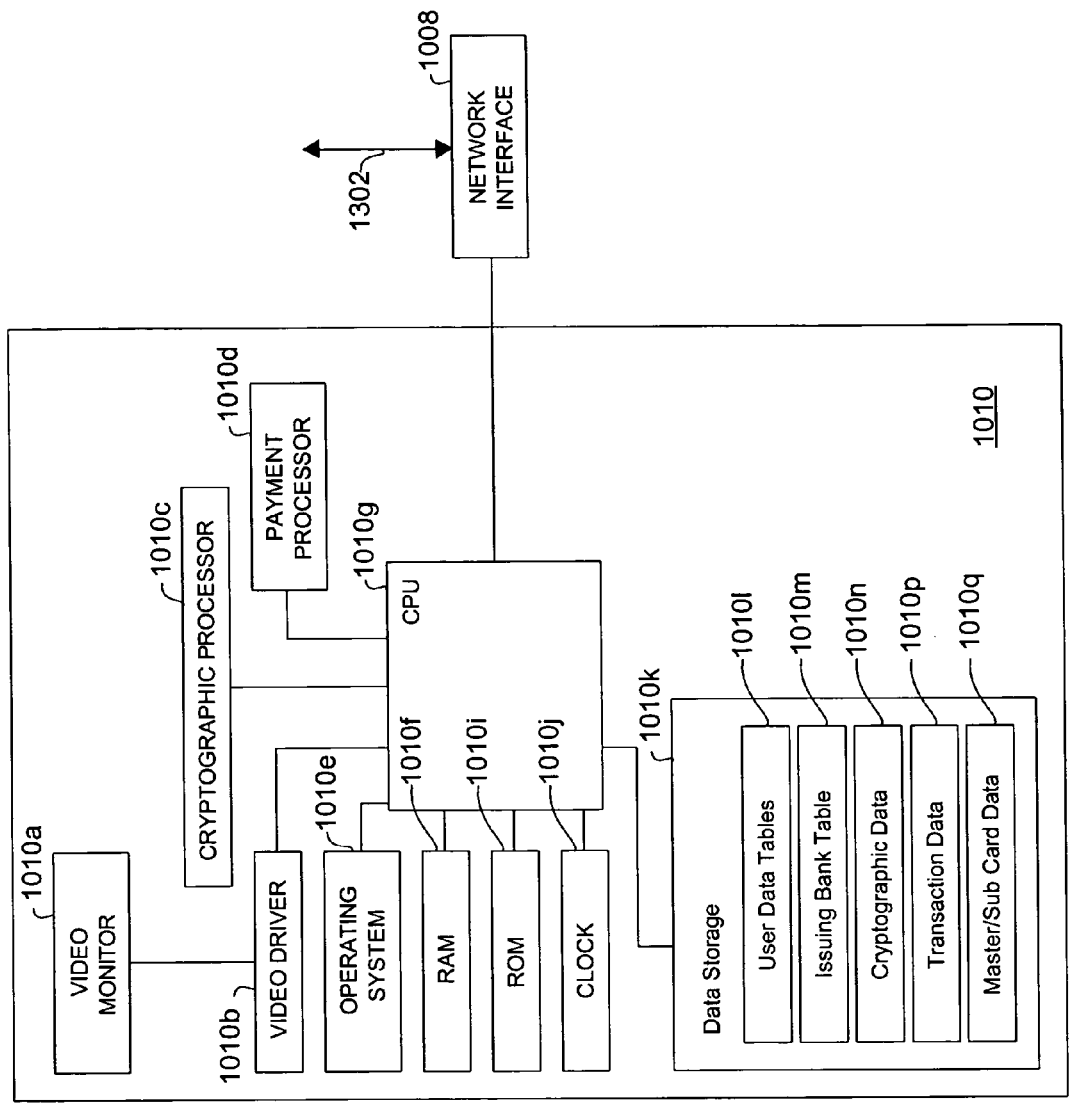
FIG. 13 is a block diagram for illustrating an issuing bank interface of the system of FIG. 10, according to the present invention.

FIG. 13 is a block diagram for illustrating the issuing bank interface 1010 of the system of FIG. 10. In an exemplary embodiment, the issuing bank interface 1010 is a conventional personal computer or workstation with sufficient memory and processing ability and including a processing device, such as a CPU 1010g, and coupled to the network interface 1008. The issuing bank interface 1010 interacts with the central controller 1006 via the network interface 1008 and signal lines 1302, which include, for example, signals 1022 and 1024 of FIG. 10. Alternatively, the issuing bank interface 1010 also may be implemented via a voice mail system and electronic or voice communications system, etc. As will be described in later embodiments, devices, such as a facsimile machine, a cellular phone, a PDA, a pager, etc., are also suitable as an interface device 1008.

As shown in FIG. 13, the issuing bank interface 1010 includes a central processing unit (CPU) 1010g, a cryptographic processor 1010g, RAM 1010f, ROM 1010i, a payment processor 1010d, a clock 1010j, an operating system 1010e and data storage device 1010k. The issuing bank interface 1010 couples to the network interface 1008. The above-noted devices may be similar to the respective devices described with respect to FIGS. 11 and 12.

A conventional personal computer or workstation with sufficient memory and processing ability may be used as the issuing bank interface 1010. The issuing bank interface 1010, typically, must be capable of high volume transaction and network processing, performing a significant number of mathematical calculations and network operations in processing communications and database queries. The data storage device 1010k may include hard disk magnetic or optical storage units, as well as CD-ROM Drives, flash memories, etc. The data storage device 1010k stores data used in the processing and authentication of transactions and includes, for example, user data 10101, issuing bank data 1010m, cryptographic key data 1010n, transaction data 1010p, and master/subordinate credit/debit card data 1010q.

Figure 14:
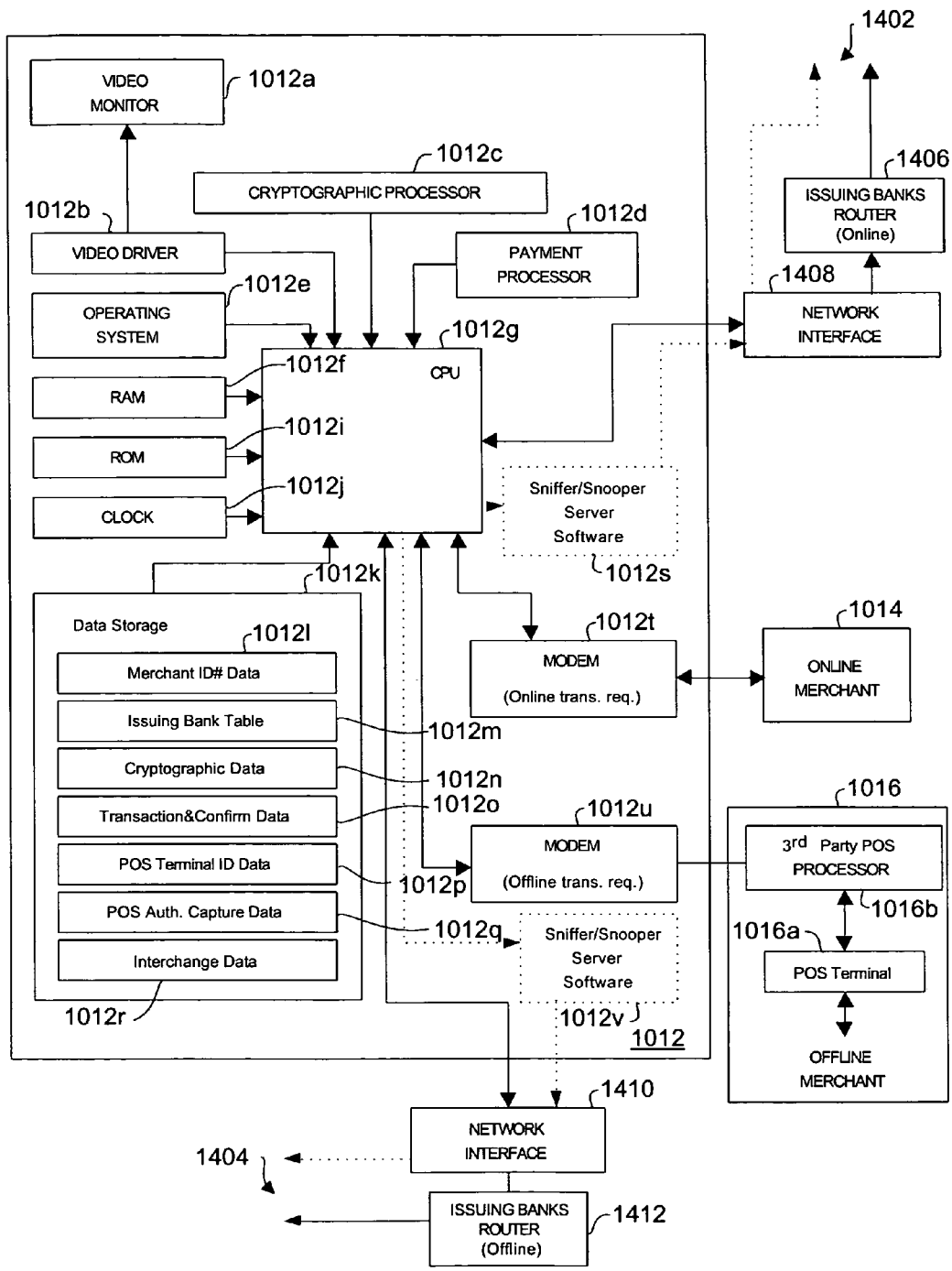
FIG. 14 is a block diagram for illustrating an acquiring bank interface of the system of FIG. 10, according to the present invention.

As shown in FIG. 14, the acquiring bank interface 1012 includes a central processing unit (CPU) 1012g, a cryptographic processor 1012c, RAM 1012f, ROM 1012i, a clock 1012j, a payment processor 1012d, an operating system 1012e, a video driver 1012b, a video monitor 1012a, online issuing bank router 1406, offline issuing bank router 1412, sniffer/snooper server software 1012s and 1012v, network interfaces 1408 and 1410, modem 1012t and 1012u, and a data storage device 1012k. The above-noted devices may be similar to the respective devices described with respect to FIGS. 11-13.

A conventional personal computer or workstation with sufficient memory and processing ability may be used as the acquiring bank interface 1012. The acquiring bank interface 1012, typically, must be capable of high volume transaction and network processing, performing a significant number of mathematical calculations and network operations in processing communications and database queries.

The payment processor 1012d includes one or more conventional microprocessors (such as the Intel Pentium III) supporting the transfer and exchange of payments, charges, or debits, attendant to the method of the system. The payment processor 1012d also may be configured as part of the CPU 1012g. Processing of credit card transactions by payment processor 1012d may be supported by commercially available software.

The data storage device 1012k may include hard disk magnetic or optical storage units, as well as CD-ROM Drives, flash memories, etc. The data storage device 1012k stores data used in the processing/confirmation of transactions and authentication and includes merchant data 10121, issuing bank data 1012m, cryptographic key data 1012n, transaction/confirmation data 1012o, point-of-sale (POS) terminal identification data 1012p, POS authorization capture data 1012q, and interchange data 1012r.

The merchant data 10121 includes data, such as a merchant identification number, used to identify which merchant is requesting a purchase request, etc. The interchange data 1012r includes data, such as confirmation of a final payment of a purchase request, after it has been reconciled and all parties are paid, etc. This data 1012r includes data related to interchange fees paid to issuing bank(s) for payment processing of each credit card transaction. The POS terminal ID data 1012p includes data used to identify a POS terminal, which requested an initial transaction, etc. The POS terminal ID number is used to send back a transaction confirmation/rejection to a corresponding POS terminal. The POS authorization capture database 1012*q* includes data, such as electronic data capture data from a POS unit, which represents an electronic signature version of a traditional "signed" sales draft, etc.

The issuing bank routers 1406 and 1412 are used by the acquiring bank interface to forward credit/debit card purchase requests to the central controller 1006 and/or a corresponding issuing bank for payment processing via signal lines 1402 and 1404, which include, for example, signals 1026 of FIG. 10. The sniffer/snooper server software 1012*s* and 1012*v* may be provided in the acquiring bank interface 1012 as an alternative method of forwarding the central controller's 1006 credit/debit card purchase requests for the central controller 1006 to process.

The operation of the above-described system will now be described with reference to FIGS. 15-24. The present invention effectuates communications between a user and the central controller 1006, via electronic networks, with the central controller 1006 acting as a web server. The user logs onto the central controller 1006, creates CMDR 1018 and then transmits the CMDR 1018 to the central controller 1006. The CMDR 1018 is received and processed by the central controller 1006. If CMDR 1018 is valid, the central controller 1006 updates the subordinate card information and transmits all non-local changes to the issuing bank interface 1010.

Figure 15:
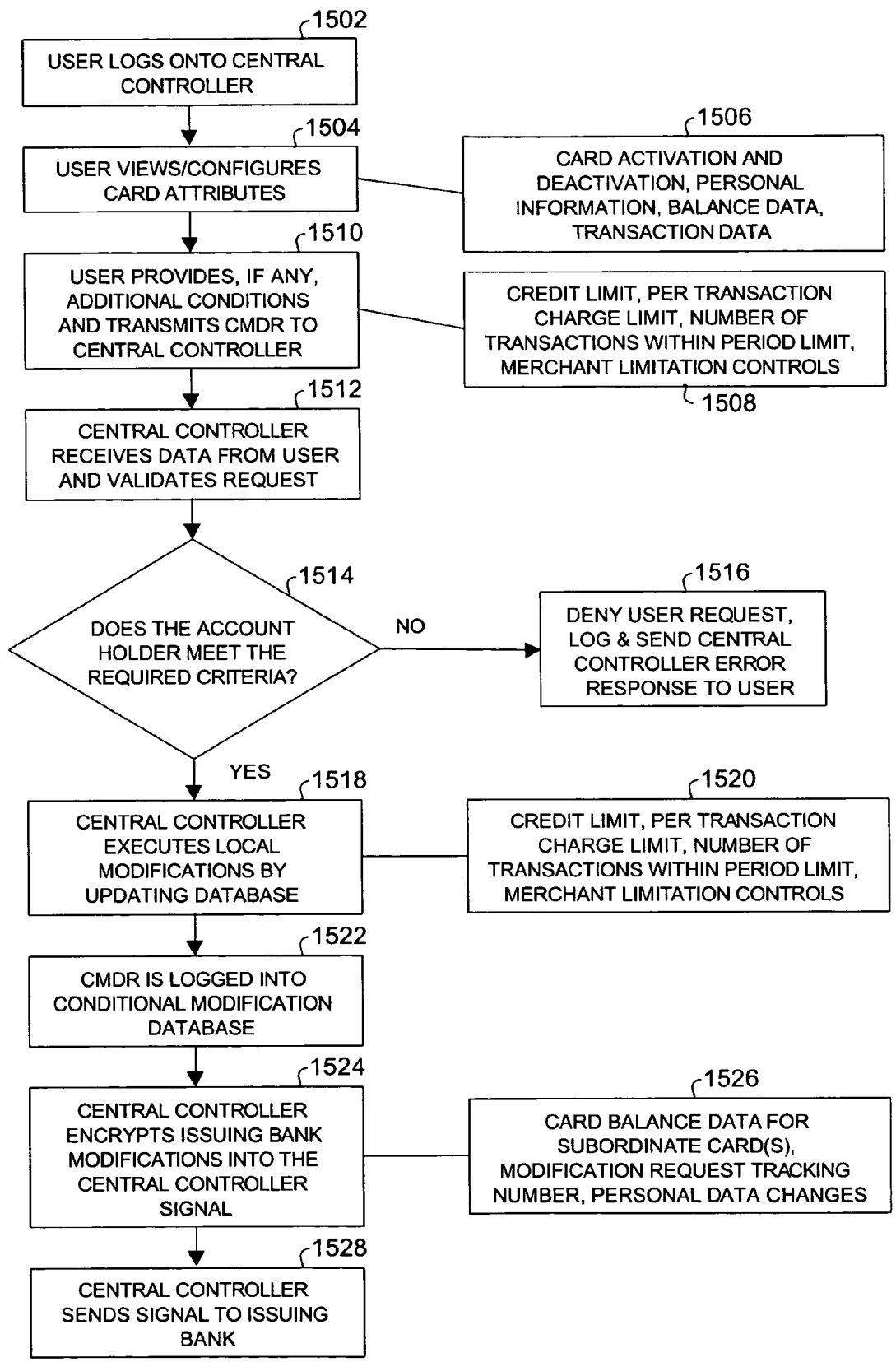
FIG. 15 is a flow chart for illustrating the operation of the central controller of FIG. 10, according to the present invention.

With reference to FIG. 15, there is a described process by which a user formulates and transmits a CMDR 1018. At step 1502, the user logs onto the central controller 1006 via user modem 1004 and user interface 1002, establishing a communications link. It should be noted that the user might be an individual, a corporation, a partnership, a government, or any other entity. There are many commercial software applications that can enable the communications required by the issuing bank interface 1010 or the user interface 1002. When the central web site controller 1006 is configured as a web server, conventional communications software, such as Microsoft Corporation's Internet Explorer web browser, etc., may be used. The user and issuing bank may use the Internet Explorer browser to transmit CMDR 1018. Thus, no proprietary software typically is required.

At step 1504, a web page with form(s) is displayed on the video monitor 1002*a* of user interface 1002 where the user views and/or configures user and/or subordinate card controls. Form(s) might include a combination of fields, lists, and checkboxes, other web page form elements, etc., each representing a condition of the CMDR 1018. As shown by element 1506, card controls include, for example, activation or deactivation of subordinate card(s), user personal information, balance data, transaction data, etc.

At step 1510, the user configures additional user and/or subordinate card conditions. As shown by element 1508, additional conditions include, for example, subordinate card credit limits, per transaction charge limits, number of transactions allowed during a given period of time limits, merchant/vendor control limitation(s), etc. Once the user is satisfied with the CMDR 1018, the user transmits the CMDR 1018 to the central controller 1006. The user does this, for example, by clicking on a "submit" button located on the web page on which they created the CMDR 1018.

Instead of a web-based interface, a user may transmit the CMDR 1018 via electronic mail, voice mail, facsimile, postal mail transmissions, wireless transmissions, PDAs, cellular transmission, etc. With a voice mail transmission, the user calls the central controller 1006, and leaves the CMDR 1018 in audio form. These requests may be transcribed into digital text at the central controller 1006, or kept in their original format. In a postal mail embodiment, requests may be transcribed into digital text at the central controller 1006, or kept in their original format. The CMDR 1018 also may be posted to bulletin boards or web pages operated by the central controller 1006. The central controller 1006 supports a plurality of transmission methods allowing for a wide variety of transmission formats for the CMDR 1018. Some formats may be changed, however, before further processing by the central controller 1006. The CMDR 1018 transmitted by mail in paper form, for example, may be scanned-in and digitized, using optical character recognition software to create digital text.

At step 1512, the central controller 1006 receives the CMDR 1018 from the user, and attempts to validate the user's CMDR 1018 at step 1514. If it is determined that the user does not meet all of the required criteria for their CMDR 1018, or if any attribute or condition of the CMDR 1018 is either unclear or includes spelling and/or grammatical errors, the CMDR 1018 is denied and returned for clarification and/or correction and the error is logged in conditional modification database 1006*m* at step 1516.

If, however, the CMDR 1018 is determined to be valid, central controller 1006 executes local changes, such as credit limitations, per transaction charge limitations, number of transactions within a period limit etc., shown by element 1520, at step 1518.

At step 1522, the CMDR 1018 is logged in conditional modification database 1006*m*.

At step 1524, central controller 1006 encrypts issuing bank modifications into the central controller signal 1022. At step 1528, the central controller signal 1022 is transmitted to issuing bank.

Figure 16:
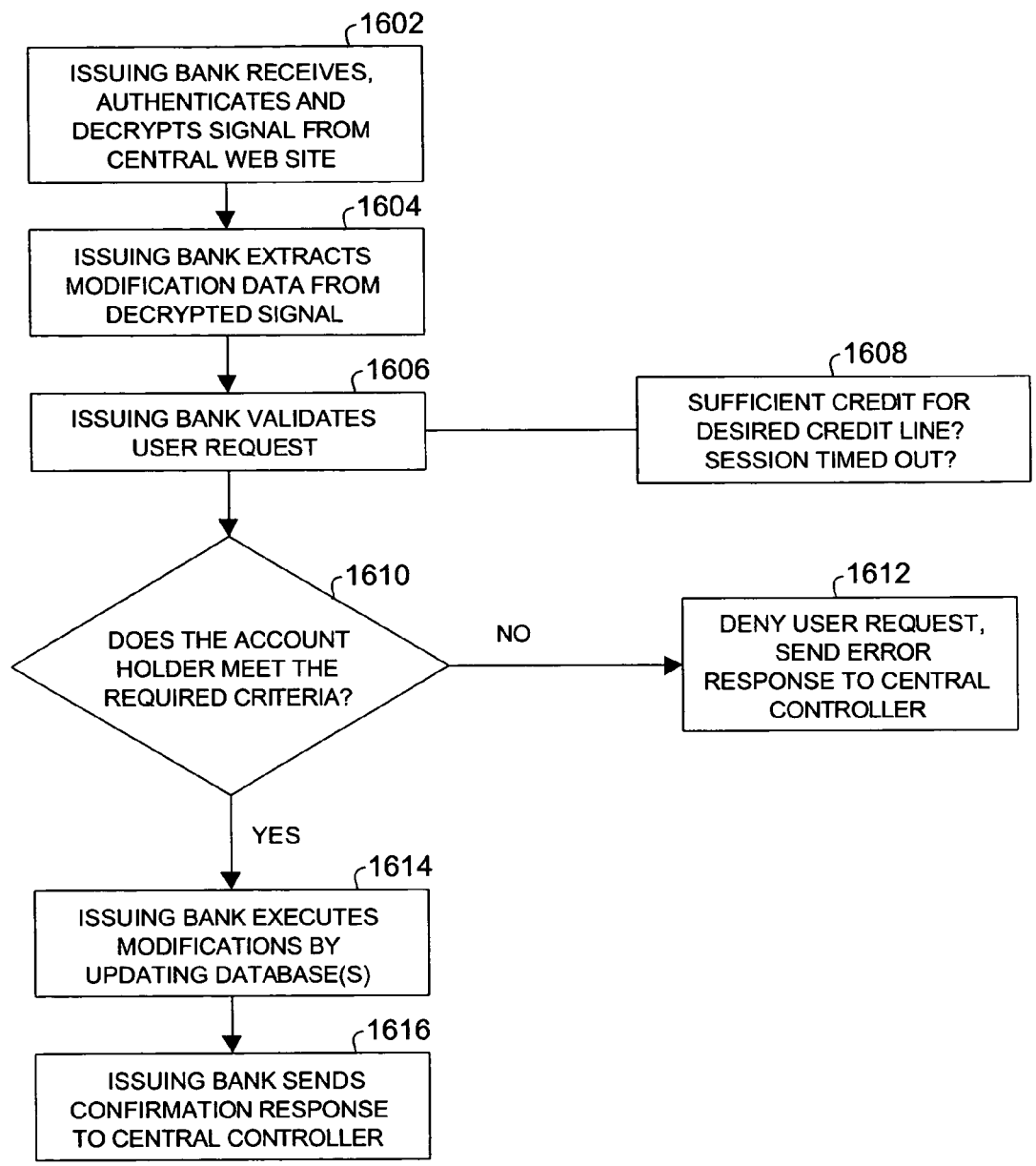
FIG. 16 is a flow chart for illustrating the operation of the issuing bank interface of FIG. 10, according to the present invention.

With reference to FIG. 16, there is a described process by which the issuing bank interface 1010 receives and processes the signal 1022 sent from the central controller 1006. At step 1602, the issuing bank network interface 1008 receives the signal 1022 that includes the encrypted modification data from the central controller 1006 and the issuing bank interface 1010 decrypts the same. At step 1604, the issuing bank interface 1010 extracts the conditional modification data from the decrypted central controller 1006 signal 1022.

At step 1606, the issuing bank interface 1010 attempts to validate the changes from central controller 1006 signal 1022. Exemplary criteria for changes are shown by element 1608, such as the user having a sufficient credit line in order to modify a subordinate card, whether a session timeout has occurred, etc. At step 1610, it is determined whether or not the user meets all of the required criteria for modifications. If any attribute or condition of the modifications is either unclear or includes spelling and/or grammatical errors, modifications are denied and an error issuing bank response 1024 is returned to the central controller 1006 and the central controller 1006 sends an appropriate response 1020 to the user at step 1612.

If, however, the modifications are valid, the issuing bank interface 1010 executes the changes, such as card balance data levels for subordinate card(s), modification request tracking number, personal data changes etc., at step 1614. At step 1616, a confirmation issuing bank response 1024 is transmitted to the central controller 1006 and the central controller 1006 sends an appropriate response 1020 to the user.

FIG. 17 is a signal diagram for illustrating the signal 1020 format. In FIG. 17, the signal 1020 includes, for example, a field 1702 for transmitting a primary or master credit/debit card account number, a field 1704 for transmitting a subordinate credit/debit card account number, a field 1706 for transmitting balance modification changes for the subordinate credit/debit card, a field 1708 for transmitting personal data changes for the subordinate credit/debit card, a field 1710 for transmitting the central controller 1006 identification number, and a field 1712 for transmitting a modification request tracking number. Although a signal format is shown for only signal 1022, similar signal formats may be used for signals 1018, 1020, 1024, etc., as will be appreciated by those skilled in the relevant art(s).

FIG. 18 is a data structure diagram for illustrating a data structure format used by the database 1006k of the central controller 1006. In FIG. 18, the data structure includes, for example, a field 1802 for storing a primary or master credit/debit card account number, a field 1804 for storing a subordinate credit/debit card account number, a field 1806 for storing desired/confirmed balance data history for the subordinate credit/debit card, a field 1808 for storing personal data history for the subordinate credit/debit card, a field 1810 for storing a master central controller user identification number, a field 1812 for storing the subordinate credit/debit card transaction request/confirmation data history, a field 1814 for storing a subordinate central controller user identification number, a field 1816 for storing master user restrictions on the subordinate credit/debit card, and a field 1818 for storing the subordinate credit/debit card control history. Although a data structure format is shown for only database 1006k, similar signal formats may be used for databases 1002k, 1010k, 1012k, etc., as will be appreciated by those skilled in the relevant art(s).

Figure 19:
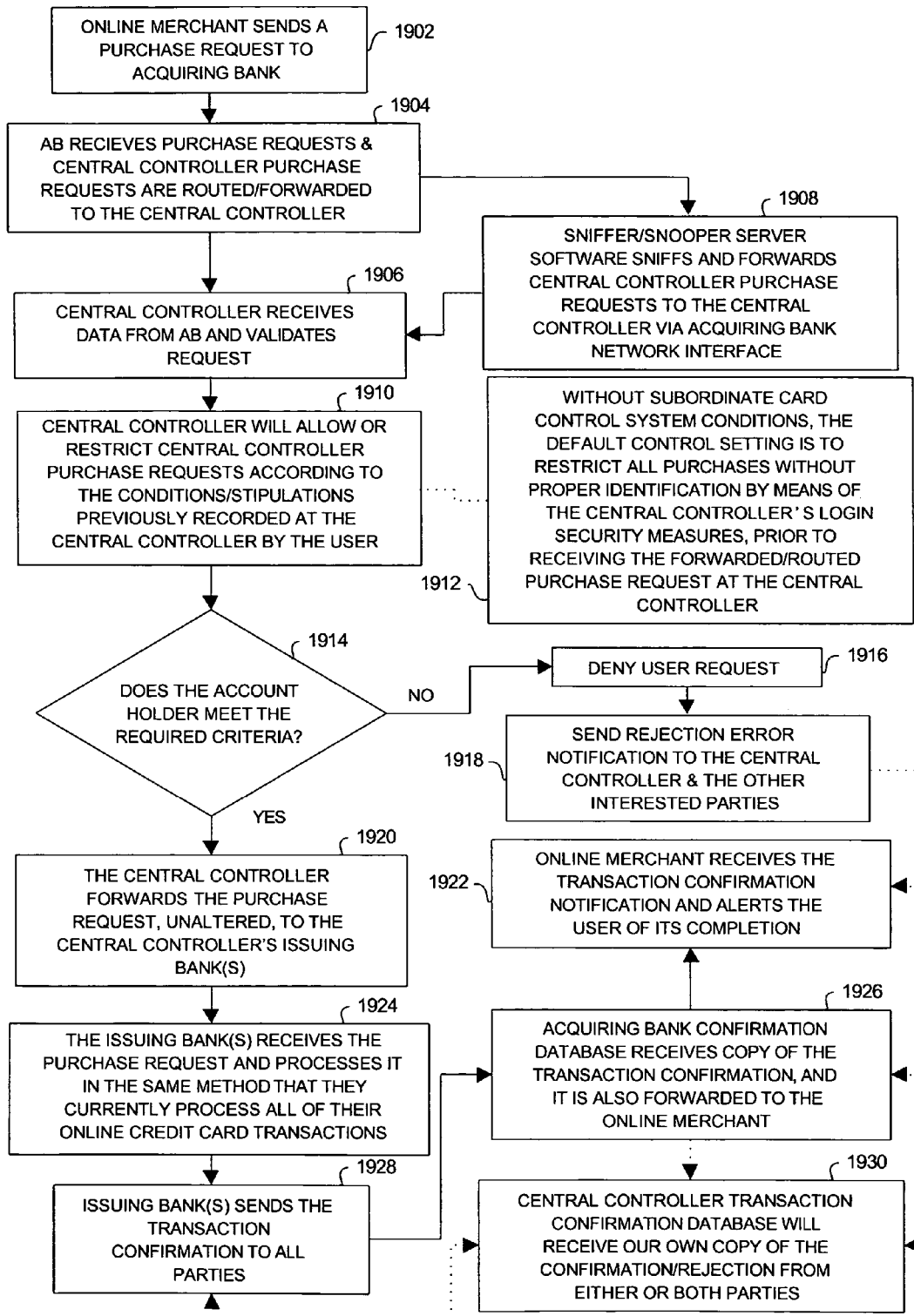
FIG. 19 is a flow chart for illustrating processing of an online transaction in the system of FIG. 10, according to the present invention.

With reference to FIG. 19, there is described a process by which a credit/debit card purchase request is sent from the online merchant 1014 to the SCCS user's credit card network (represented by the acquiring bank interface 1012) for online transaction payment processing. In FIG. 19, at step 1902, the online merchant 1014 sends a purchase request associated with a central controller 1006 transaction to the acquiring bank interface 1012. At step 1904, the acquiring bank interface 1012 receives the purchase request and either forwards the purchase request to the central controller 1006 at step 1906 or routes the purchase request to the central controller 1006 at step 1908.

In either case, at step 1906, the central controller 1006 receives the routed or forwarded request and then attempts to validate the purchase request. At step 1910, the central controller 1006 allows or restricts purchases according to the conditions/stipulations shown by element 1912 input by the "master" user in the embodiment detailed in FIG. 15. If the purchase request satisfies the conditions set forth in the CMDR 1018 at step 1914, then the request is forwarded on to the issuing bank interface 1010 for the requested SCCS card account at step 1920. However, if the request does not satisfy the conditions set forth in the CMDR 1018 at step 1914, then the purchase request is denied at step 1916, and a rejection error notification is sent to all interested parties at step 1918 (see step 1930, step 1926, and step 1922 respectively).

At step 1924, the issuing bank interface 1010 receives and processes the payment of the purchase request using known methods for processing credit card transactions. After the purchase request is processed and given a confirmation number, the issuing bank network interface 1008 sends a transaction confirmation to all interested parties at step 1928 (see step 1930, step 1926, and step 1922 respectively).

Figure 20:
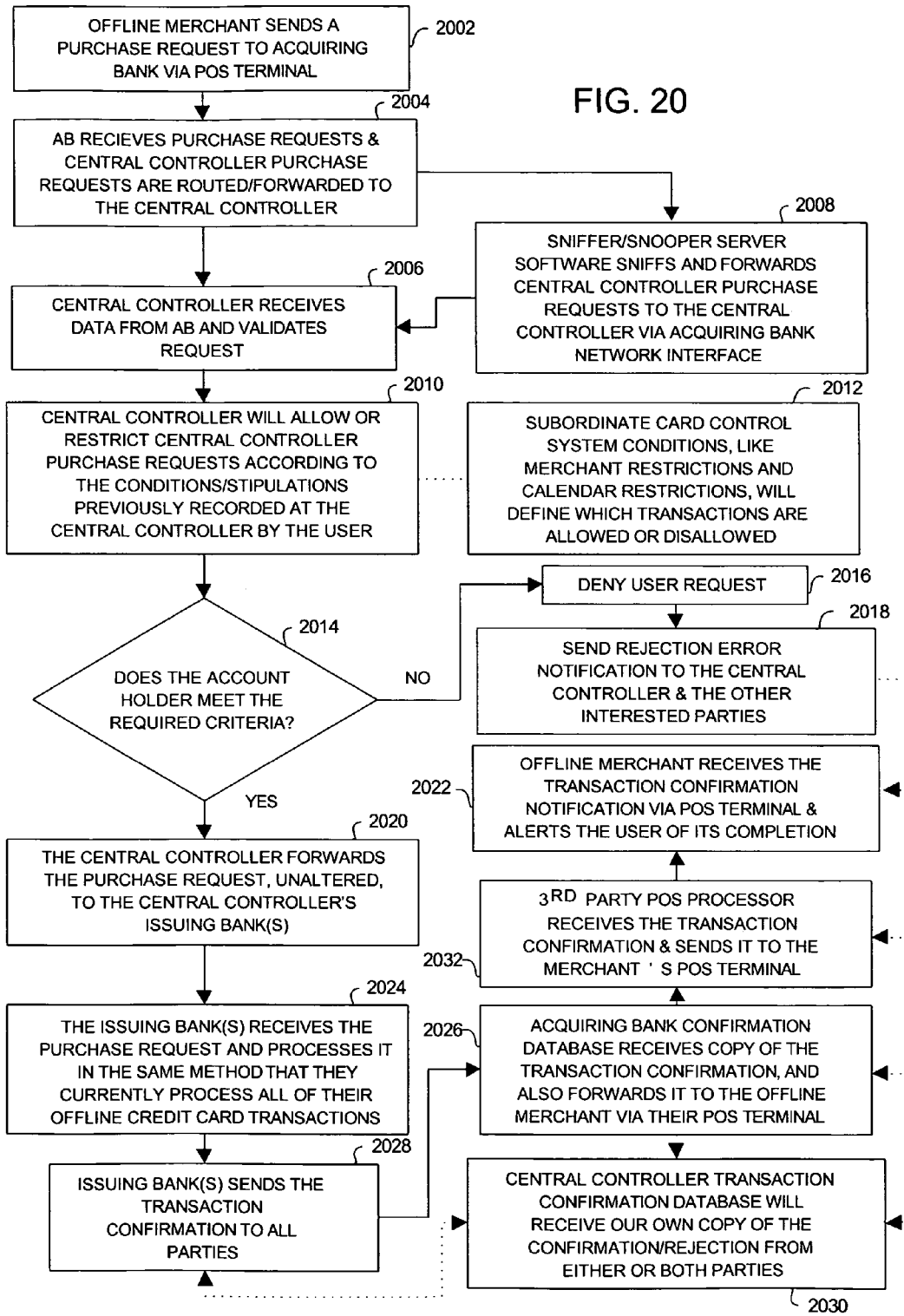
FIG. 20 is a flow chart for illustrating processing of an offline transaction in the system of FIG. 10, according to the present invention.

With reference to FIG. 20, there is described a process by which a credit card purchase request is sent from an offline merchant to the SCCS user's credit card network (represented by acquiring bank interface 1012) for offline transaction payment processing. In FIG. 20, the SCCS offline transaction payment method is similar to the method described in FIG. 19, with one additional step, step 2032. In addition, in the offline transaction payment method, steps 2002, 2022, 2032, and 2026 show the additional role of the point-of-sale (POS) processing and POS terminal used in the offline credit card payment procedures. The remaining details of the steps of the offline transaction payment method are omitted for the sake of brevity.

In the previous embodiments, authentication of a user and an issuing bank involve checking an attached identification or name and comparing it with those with the stored user data 1006l and the issuing bank data 1006n, of the database 1006k of the central controller 1006. Although this procedure works well in a low security environment, it can be significantly improved through the use of cryptographic protocols. These protocols not only enhance the ability to authenticate a sender of a message, but also serve to verify the integrity of a message itself, verifying that the message has not been altered by an unauthorized party. Using such cryptographic protocols, an unauthorized party is prevented and unable to impersonate a user.

Encryption can also prevent eavesdroppers from learning the contents of a message. Thus using such cryptographic protocols, an unauthorized party can be prevented from intercepting messages, for example, sent to/from the central controller 1006, the user interface 1002, the issuing bank interface 1010, the acquiring bank interface 1012, etc. Such techniques shall be referred to generally as cryptographic assurance methods and include the use of both symmetric and asymmetric keys as well as digital signatures and hash algorithms that are known in the cryptographic art(s). The practice of using cryptographic protocols to ensure the authenticity of senders as well as the integrity of messages is well known in the art and will not be described in detail herein for the sake of brevity.

Figure 21:
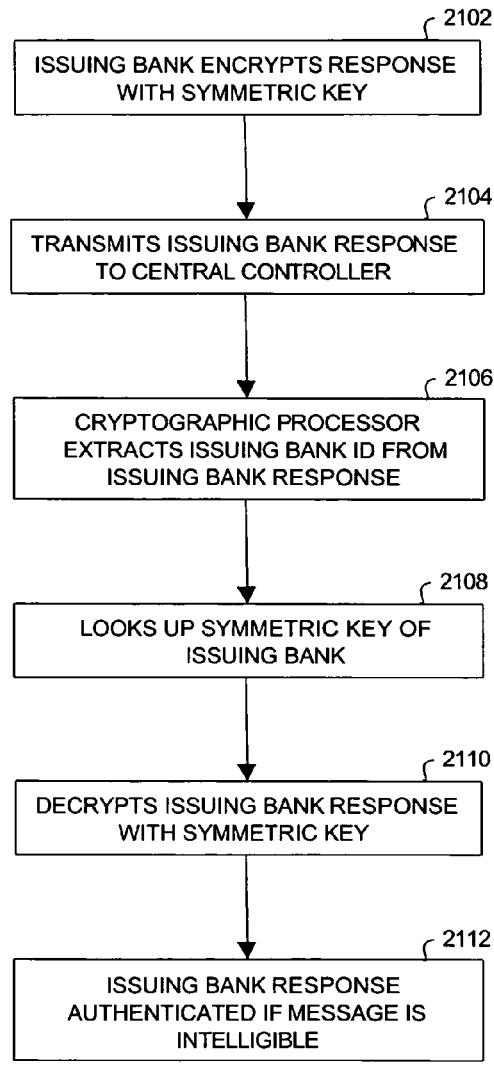
FIGS. 21-24 are flow charts illustrating various encryption techniques used by an issuing bank of FIG. 10, according to the present invention.

FIG. 21 is a flow chart for describing a symmetric key cryptographic method in which the central controller 1006 and issuing bank interface 1010 share a key. Thus, both encryption and decryption of the issuing bank response 1024 are done with the same key. This encryption may be implemented with any known encryption algorithms, such as DES (U.S. Government Standard), IDEA, Blowfish, RC2, RC4, SAFER, etc. In FIG. 21, the issuing bank interface 1010 encrypts the issuing bank response 1024 with the assigned symmetric key at step 2102, using cryptographic processor 1010g of issuing bank interface 1010. The key is stored, for example, as the cryptographic key data 1010n of the issuing bank interface 1010. The encrypted response 1024 is then transmitted by the issuing bank network interface 1008 to the cryptographic processor 1006c of central controller 1006 at step 2104. The cryptographic processor 1006c extracts the issuing bank ID from issuing bank response 1024 at step 2106 and looks up the symmetric key of the issuing bank via the cryptographic key data 1006q at step 2108, and decrypts the issuing bank response 1024 with this key at step 2110. The cryptographic key data 1010n and 1006q contain algorithms and keys for encrypting, decrypting and/or authenticating messages. At step 2112, if the resulting message is intelligible, then the same key must have encrypted the message, authenticating that the issuing bank interface 1010 must have indeed been the author of the issuing bank response 1024.

The above procedure makes it significantly more difficult for an unauthorized issuing bank, or user to represent a legitimate issuing bank. Without cryptographic procedures, an unauthorized issuing bank that obtained a sample issuing bank response 1024 from a legitimate issuing bank would be able to extract the issuing bank identification (ID) number and then attach this ID number to unauthorized issuing bank responses. When issuing bank response 1024 has been encrypted with a symmetric key, however, an unauthorized issuing bank obtaining a sample issuing bank response 1024 only discovers the issuing bank's ID number, not the symmetric key. Without this key, the unauthorized issuing bank cannot create an issuing bank response that will not be discovered by the central controller 1006, since he cannot encrypt his message in the same way that an authorized issuing bank could. The symmetric key protocol also ensures that the issuing bank response 1024 has not been tampered with during transmission, since alteration of the message requires knowledge of the symmetric key. An encrypted issuing bank response 1024 also provides the issuing bank with more anonymity.

Figure 22:
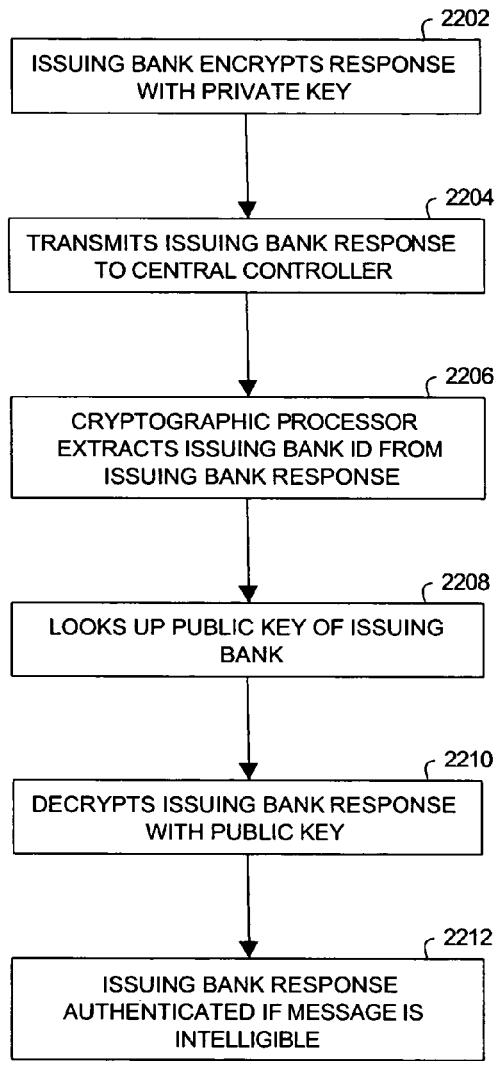

Referring now to FIG. 22, there is shown a flow chart for an asymmetric key protocol method in which the issuing bank response 1024 is encrypted with a private key and decrypted with a public key. Two such algorithms for this procedure are, for example, RSA and Digital Signature Algorithm (DSA). In FIG. 22, the issuing bank interface 1010 encrypts the issuing bank response 1024 with a private key at step 2202, using cryptographic processor 1010c of the issuing bank interface 1010. The encrypted issuing bank response 1024 is then transmitted to the cryptographic processor 1006c of the central controller 1006 at step 2204. The cryptographic processor 1006c extracts the issuing bank ID from the issuing bank response 1024 at step 2206 and looks up the issuing bank's associated public key stored as the cryptographic key data 1006q at step 2208, and decrypts the issuing bank response 1024 with this public key at step 2210. As before, if the issuing bank response 1024 is intelligible then the central controller 1006 has authenticated the issuing bank response at step 2112. Again, an unauthorized party obtaining the issuing bank response 1024 before it is received by central controller 1006 is not able to undetectably alter the issuing bank response 1024, since the unauthorized party typically does not know the private key of the issuing bank. The unauthorized party would, however, be able to read the issuing bank response 1024, if the unauthorized party managed to obtain the public key of the issuing bank. Message secrecy is maintained, however, if the issuing bank interface 1010 encrypts the issuing bank response 1024 with a public key, requiring the attacker to know the issuing banks private key to view the issuing bank response 1024.

Figures 23, 24:
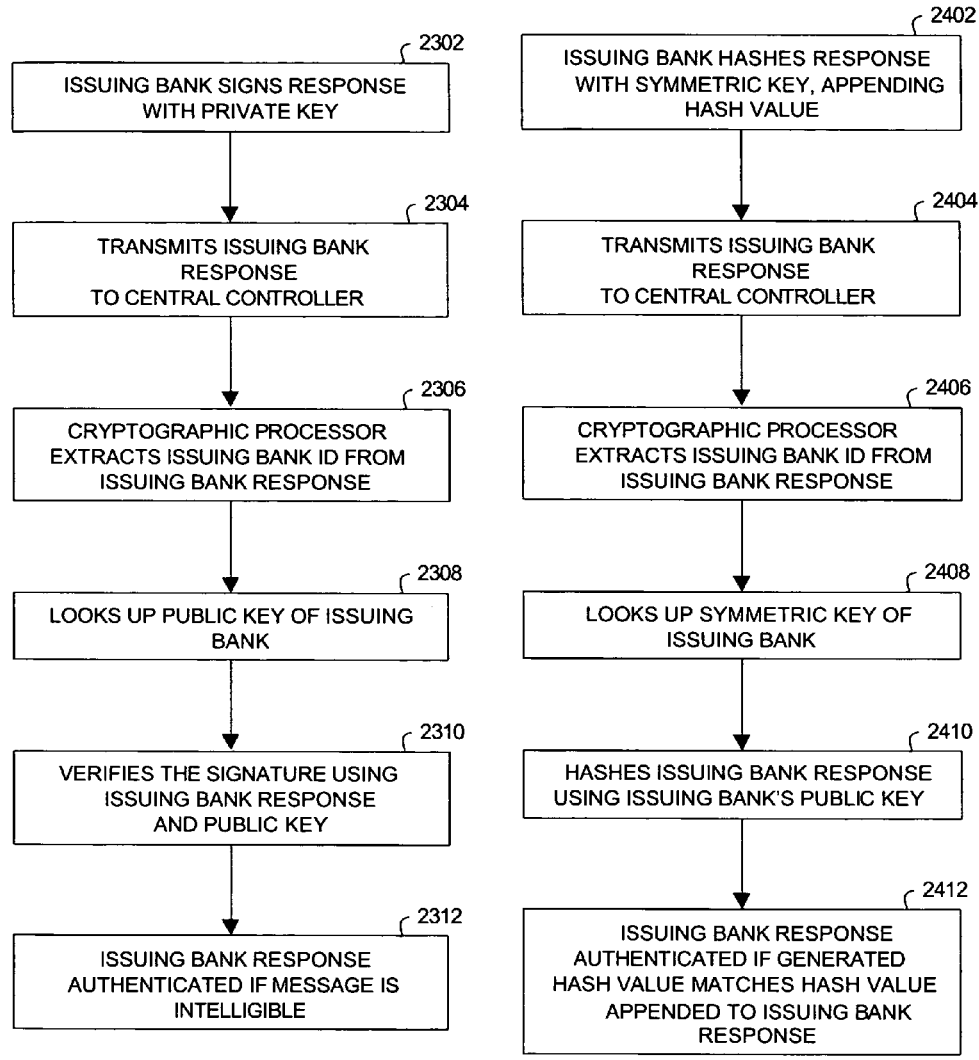

FIG. 23 is a flow chart for illustrating a cryptographic technique using digital signatures to provide authentication and message integrity. One such algorithm is, for example, DSA, the U.S. Government standard specified in FIPS PUB 186. As in the asymmetrical protocol described above, each issuing bank has an associated public and private key. In FIG. 23, the issuing bank interface 1010 signs the issuing bank response 1024 with a private key at step 2302 via the cryptographic processor 1010c, and transmits the signed issuing bank response 1024 to the central controller 1006 at step 2304. The central controller 1006 cryptographic processor 1006c extracts the issuing bank ID at step 2306 and looks up the issuing bank's associated public key stored as the cryptographic key data 1006q at step 2308, verifying the signature using the issuing bank response 1024 and the public key of the issuing bank at step 2310. If the issuing bank response 1024 is intelligible, then the central controller 1006 accepts the issuing bank response 1024 as authenticated at step 2312.

FIG. 24 is a flow chart for describing a cryptographic technique using a hash protocol method for verifying the authenticity and integrity of the issuing bank interface 1010 response 1024. In the hash protocol method, the issuing bank interface 1010 and the central controller 1006 share a symmetric key, which the issuing bank interface 1010 includes in a hash of the issuing bank response 1024 at step 2402. In the hash protocol, a one-way function is applied to a digital representation of the issuing bank response 1024, generating a code that acts very much like a fingerprint of the issuing bank response 1024. Any known hashing algorithm, such as a MAC-based algorithms, etc. (e.g., RIPE-MAC, IBC-Hash, CBC-MAC, etc.), may be applied in the present method. After the issuing bank response 1024 is transmitted to the central controller 1006 at step 2404, the cryptographic processor 1006c extracts the issuing bank ID from issuing bank response 1024 at step 2406. Then, at step 2408, the cryptographic processor 1006c looks up the issuing bank's symmetric key stored as the cryptographic key data 1006q, hashes the issuing bank response 1024 with the symmetric key at step 2410, and compares the resulting hash value with the hash value attached to the issuing bank response 1024 at step 2412. If the values match, the integrity of the issuing bank response 1024 is verified along with the authenticity of the issuing bank.

Although the above cryptographic methods describe the authentication and validation of the issuing bank response 1024, such methods may be equally applied to the authentication and validation of confirmation messages, error messages or any other messages and communications from/to the user interface 1002, the central controller 1006, the issuing bank interface 1010, the acquiring bank interface 1010, etc. (e.g., signals 1018, 1020, 1022, 1026, etc.), as will be appreciated by those skilled in the relevant art(s).

Although cryptographic techniques can provide greater confidence in the authenticity of messages between nodes of the SCCS, such techniques are useless if the cryptographic keys are compromised. If the cryptographic keys are compromised, there is no way to verify if an authorized user was the true author of a message, or if the message was transmitted by an authorized party having using compromised cryptographic keys. One way to solve this problem is to use biometric devices, such as a fingerprint readers, voice recognition systems, retinal scanners, etc., to further verify a user's true identity. These devices incorporate a physical attribute of the user into their message, which is then compared with the value stored in a database, for example, located at the central controller 1006. In the present invention, such devices may be attached to the user interface 1002. Fingerprint verification, for example, may be executed before the creation of the CMDR 1018, in response to prompts from the central controller 1006, or at some other predetermined or random time. Each live-scan fingerprint, for example, is compared to a previously stored template, stored in the data storage device 1002k of the user interface 1002, and if the prints do not match, the CMDR 1018 would be denied.

In a voice verification embodiment, the user's voice is used to verify the user's true identity. This embodiment has the advantage of not requiring the use of any specialized hardware since it can be implemented over a standard phone connection. The user's identity is verified at the central controller 1006. The process of obtaining a voice-print and subsequently using it to verify a person's identity is a well-known in the art and will need not be described in detail herein for the sake of brevity. Any CMDR 1018 received without an appropriate voice match would be denied.

Although the above-described biometric methods describe the authentication and validation of the CMDR 1018, such methods may be equally applied to the authentication and validation of confirmation messages, error messages or any other messages and communications from/to the user interface 1002, the central controller 1006, the issuing bank interface 1010, the acquiring bank interface 1010, etc. (e.g., signals 1018, 1020, 1022, 1026, etc.), as will be appreciated by those skilled in the relevant art(s).

As previously mentioned, the present invention provides for the anonymity of both a user and an issuing bank. Such anonymity is accomplished by eliminating all references to the actual names of the involved parties for all transactions. A user, for example, would include his ID in the CMDR 1018 instead of his name, preventing attackers from discovering the user's true identity. In a similar manner, issuing banks may also want to keep their identity a secret. Although using ID numbers can provide anonymity, there are a number of potential weaknesses. First, if the database of ID numbers, stored a user the data 1006*l* or the issuing bank data 1006*n* is compromised, anonymity is destroyed since the message sender can be looked up in via the user data 1006*l* or the issuing bank data 1006*n*. To prevent this, all data is encrypted with a public key of the central controller 1006 so that even if such data is stolen it is useless without a private key. In a similar manner, all data stored by the user interface 1002, the issuing bank interface 1010 and the acquiring bank interface 1012 may be similarly encrypted before storage.

General Features of the Exemplary Embodiments

The above-described system will provide the a user the "power" over precisely when and how much of the user's finances will be active on the Internet and will provide parents with control over their children's online and offline transactions. The central web site online credit/debit card account number typically can only be used for online purchases at e-commerce sites and at credit card service web sites, and typically will have no other real-world application. This is to prevent the use of these new online credit/debit card account numbers in all types of fraud. If the online credit/debit card account numbers are ever stolen, they are essentially useless, since the thief will never really know when the online credit/debit card accounts are ever "active" and/or how much money is available therein.

With the online credit/debit card account system, the user will have an acceptable level of risk during e-commerce transactions. The ability to protect a user's privacy and limit financial risk exposure during e-commerce transactions will result in the growth of e-commerce due to the increased security afforded by the present invention. Accordingly, the online credit/debit card account system according to the present invention will generate more new credit card accounts for the financial institution(s), which will support the online credit/debit card account system, due to the new sense of security provided to the end user.

Since no actual credit/debit "cards" typically need to be manufactured according to some embodiments of the present invention, the money saved from eliminating the need to manufacture cards can be used to help pay for the development costs involved to coordinate the central web site's "update file" with each financial institution's own database table of accounts.

If a user does not already have an online credit/debit card account at the central web site, then the user has to create such an account in order to take advantage of the central web site's service and credit/debit card account protection benefits. After the online credit/debit card account is created, the user will not have to write down, register or re-register this new online credit/debit card account number at new e-commerce, credit card, and auction sites or the user's preferred web sites. The central web site's database and service software solve those problems for all users, by means of the user "template" registration feature, as described with respect to FIGS. 1 and 2.

If the user already does have a personal web page at the central web site, then the balance information and account number of the user's new online credit/debit card account is cross-referenced and coded with the user's personal web page in the database 122. By using these online credit/debit card account numbers in place of a user's actual credit/debit card number(s), the central web site is able to complete its services by registering the user at web sites that require credit card information, without sacrificing the security of the user's true personal financial credit/debit card information.

The central web site typically will not retain users' actual credit/debit card account information necessary to register users at web sites that require such information in order to log in and use their services (e.g., e-commerce and online auction sites). The central web site will, however, typically create links with the users' names and passwords that such users have already created at these types of sites. The central web site typically chooses not to hold users' actual credit card number information as part of a service policy, since the central web site typically cannot guarantee the safety of such information which has been provided to the web sites users have selected. The online credit/debit card account is created to allow users the power of having the same spending abilities and capabilities online that a credit/debit card provides, without having to sacrifice the security of their personal financial information at the same time.

The central web site typically will have the exclusive maintenance of and be the sole proprietor for the balance information for the users' online credit/debit pre-paid charge card accounts and for screens or windows provided in the users' personal web pages. Accordingly, since the users' actual personal credit/debit card information is already held at the financial institution(s) which issue the credit/debit cards, there is no need for any other institution to have that data, especially web sites. With the online credit/debit card account system according to the present invention, no one (other than a user) will know the user's actual credit/debit card information, other than the user's own bank or financial institution.

The online credit/debit card account number typically can only be used for online purchases at web sites and at credit/debit card service web sites and typically will have no other real-world application. This feature will prevent the use of these new online credit/debit card account numbers in major types of fraud, such as mail order catalog fraud and credit card fraud. The central web site will also encourage users to only apply to the online credit/debit pre-paid charge card account as much money as they are going to spend at each online e-commerce destination. This feature will greatly minimize the amount of money exposed to risk during online e-commerce transactions. In addition, should the online credit/debit or pre-paid charge card account numbers ever get stolen, the thief typically would never know exactly when there would be money in the online credit/debit card account to spend or when the online credit/debit or pre-paid charge card account will be active to accept charges.

There are very positive public relations benefits to supporting the online credit/debit card account system according to the present invention that will enable a user to be secure while spending money online. Minimal development time is needed to launch the online credit/debit card account system according to the present invention, because the service will be connected an existing architecture that has already been developed by the financial institutions which will support the online credit/debit card account system. In addition, the online credit/debit card account system according to the present invention will function with existing technology which e-commerce web sites use to process credit/debit card transactions online.

The "parsing" of various data and files (e.g., update files 410, 414 and 608, destination web site registration forms, etc.) in the credit/debit card account system according to the present invention is further described as follow. For example, the form management system (FMS), running on computer, establishes a TCP/IP connection with a destination web site, running on a second computer. The FMS makes an HTTP request to web site and receives an HTML page back from web site as a text string. This text string that is the HTML page is then parsed. The parsing code automatically extracts HTML form specific tags from the text string by applying, for example, rule-based methods as per the WWW HTML standard. The parsing code then stores the form tag data into a collection of data known as an array. The data in this array is then entered into the database 122 by database specific code that applies rule based methods to ensure that data is stored in the proper database table.

Parsing is a methodology in which a program iterates through text, character by character, to extract certain text strings (words), as specified by programmed rules. The central web site's HTML parser is kept up to date, so that the rules consistently adhere to the W3 consortium HTML standard as it continues to evolve. That is, as new tags are added or tags are modified, the rules of the web site's parser are updated to reflect such changes.

For example, given a page string:

```
<html>
<head>
<title>NY Times on the Web</title>
</head>
<body>
<form action=/cgi-bin/program.cgi name=register>
.....
<input type=textfield size=20 maxlength=50 nnme=username>
.....
</form>
</body>
</html>
``` by parsing the text field "<input type=textfield size=20 maxlength=50 name=username>" is extracted. This text field is now parsed for "type", "size", "maxlength", "value" and if the field is not found in the tag it is entered as null. In this case value=null. So in this way the central web site has form data to enter. In other words, the central web site has obtained a form URL, which is required to get the corresponding HTML data from a web site.

The central web site has parses the "action" field of the form. In this case, action="/cgi-bin/program.cgi". Accordingly, the central web site now has unique identifiers for all forms by using the form URL-form name-form-action relationship. Forms are given a unique form identification number (e.g., 33) based on this tri-party relationship. Then all form elements are stored in the database 122. For each kind of element, there is a corresponding database table. So for the above text field, the central web site inserts this data into the corresponding text field table of the database 122 with a SQL statement, such as "INSERT INTO TEXTFIELDS (NAME, SIZE, MAXLENGTH, VALUE, FORM_ID, SPECIAL) VALUES ('usemrname', 20, 50, NULL, 33, 'login')". In this example, "Special" is the central web site's corresponding field identifier, which is selected from a list of possible values. In this case, a "username" would represent a login name, so "login" would be associated with this form element.

Targeted Advertising Based on User Information

In another embodiment, the central web site may also use a targeted advertising strategy to deliver relevant advertisements to its users and will typically only employ the information provided to the central web site in the membership form templates to target such advertisements. For example, if an advertising client (e.g., Barnes & Noble) of the central web site would like all of the central web site's male members over the age of 50 to view an advertisement (e.g., for books), the central web site can deliver such a targeted advertisement based on the user information (e.g., contained in the database 122) fitting such targeting criteria. In such a situation, the central web site creates a database (e.g., in the database 122) of a user's identification numbers based on the user's demographic information, as it was provided to the central web site during the users' initial registration. Accordingly, user demographics, such as gender, region, age, time zone, etc., can be collected and can be used to attract advertisers. The central web site will then use the created database to change the advertisements according to these traits and targeting criteria. In order to assure the privacy of the central web site's users, the central web site, through its privacy policy, will guarantee not to track the destinations of its users to target advertising.

Accordingly, the central web site according to the present invention provides an online/offline service that: (i) eliminates the need for users to re-enter the same personal information at every new site that the user wants to be registered at, (ii) alleviates users from needing to re-type the same recurring user names and passwords to get through the gateways of most web sites and e-mail accounts, (iii) delivers a targeted advertisement system to serve relevant advertisements to its users based on demographics, but typically not based on web site visiting habits (i.e., web surfing habits) of the users and (iv) resolves users' concerns over the security of their credit/debit card number's on the Internet, while still delivering the ability to shop, bid at auctions, make charitable donations and pledges, and otherwise use credit/debit card service web sites.

The central web site may be implemented as a multi-language international web site with local/global domains for each language. The services provided by the central web site are most useful to new Internet users who have yet to encounter the usual delays and problems previously described. There are far more people outside the United States who have still not ventured onto the Internet. The ease and efficiency of the central web site according to the present invention will help induce more people to begin to use the Internet.

The central web site may also include a restricted version of the site's services to be advantageously used in school systems. This restricted "educational" version only allows the students to navigate to those destinations on the web that school officials pre-approve, such as research sites, educational sites, etc., and other such destinations.

The central web site also may include a calendar with programmable reminders for events and special occasions and the central web site could include an advertisement on such reminders, which can be sold to e-commerce sites to suggest gift ideas.

The central web site also may include a browser plug-in for providing the central web site's services previously described, as will be appreciated by those skilled in the relevant art(s). In this way, a user of the central web could use such a plug-in to send the URL that the user are viewing to the central web site as a request for the central web site to generate a link for the URL in a personal web page with a click of a button.

The central web site could also be developed as a platform for the central web site's software to allow the central web site's users' account information to be accessible on wireless devices, such as PDAs, cellular phones, etc., to support a wireless web, as will be appreciated by those skilled in the relevant art(s).

Figure 25:
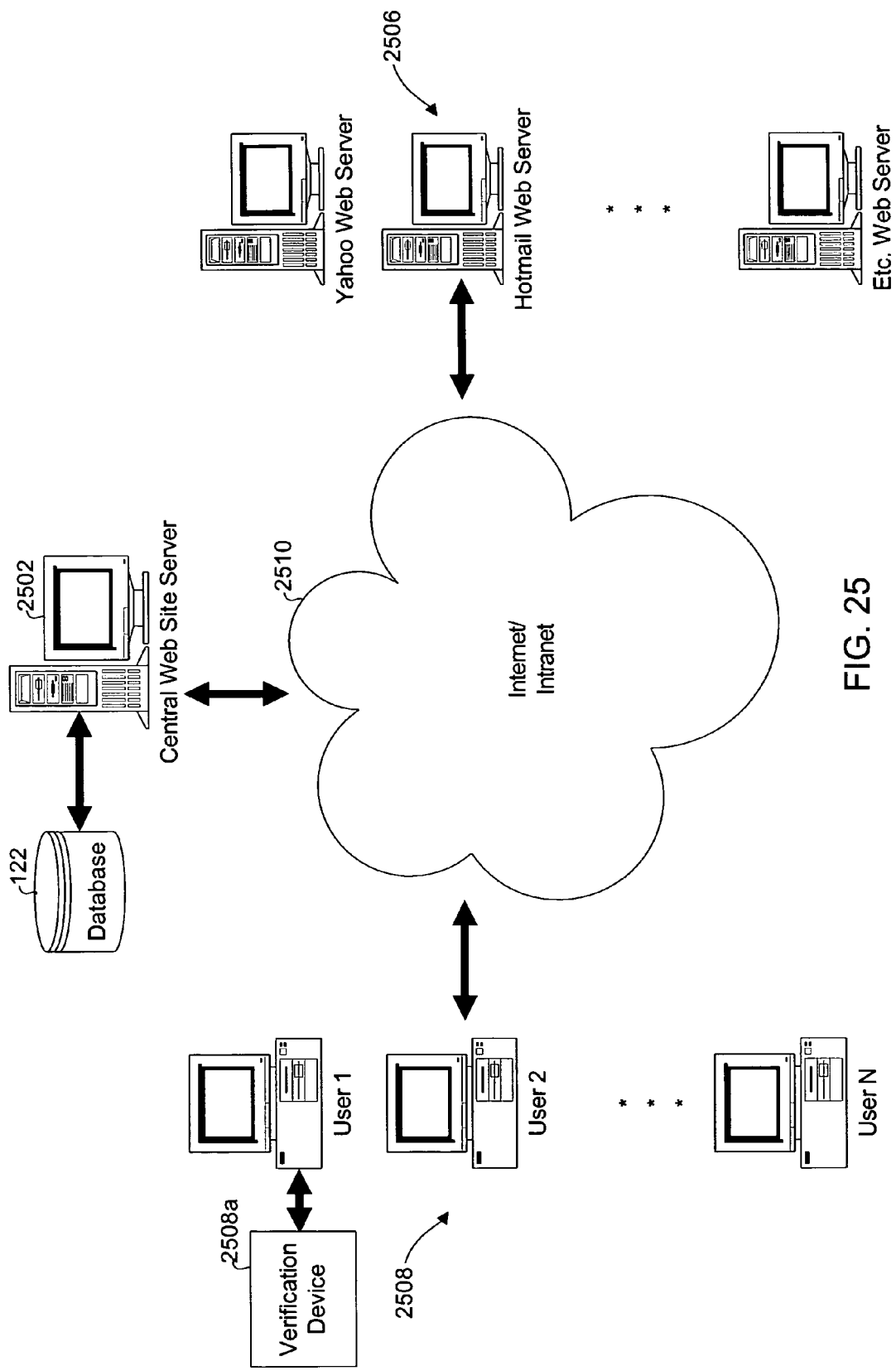
FIG. 25 is a top level system block diagram for implementing the systems and processes of FIGS. 1-3, according to the present invention.

FIG. 25 is a top level system block diagram for implementing the systems and processes of FIGS. 1-3, according to the present invention. In FIG. 25, the central web site's server 2502 is coupled to a database 122, which may be hosted on server 2502 or another computer (e.g., for security purposes). The users via computers 2508 and optional verification device 2508a can access the central web site server 2502 via the Internet or Intranet 2510. Once a user, via the computers 2508, is logged into the central web site's server 2502, the above described processes with respect to FIGS. 1-3 can be used to communicate information to servers 2506 of other web sites, as previously described.

Figure 26:
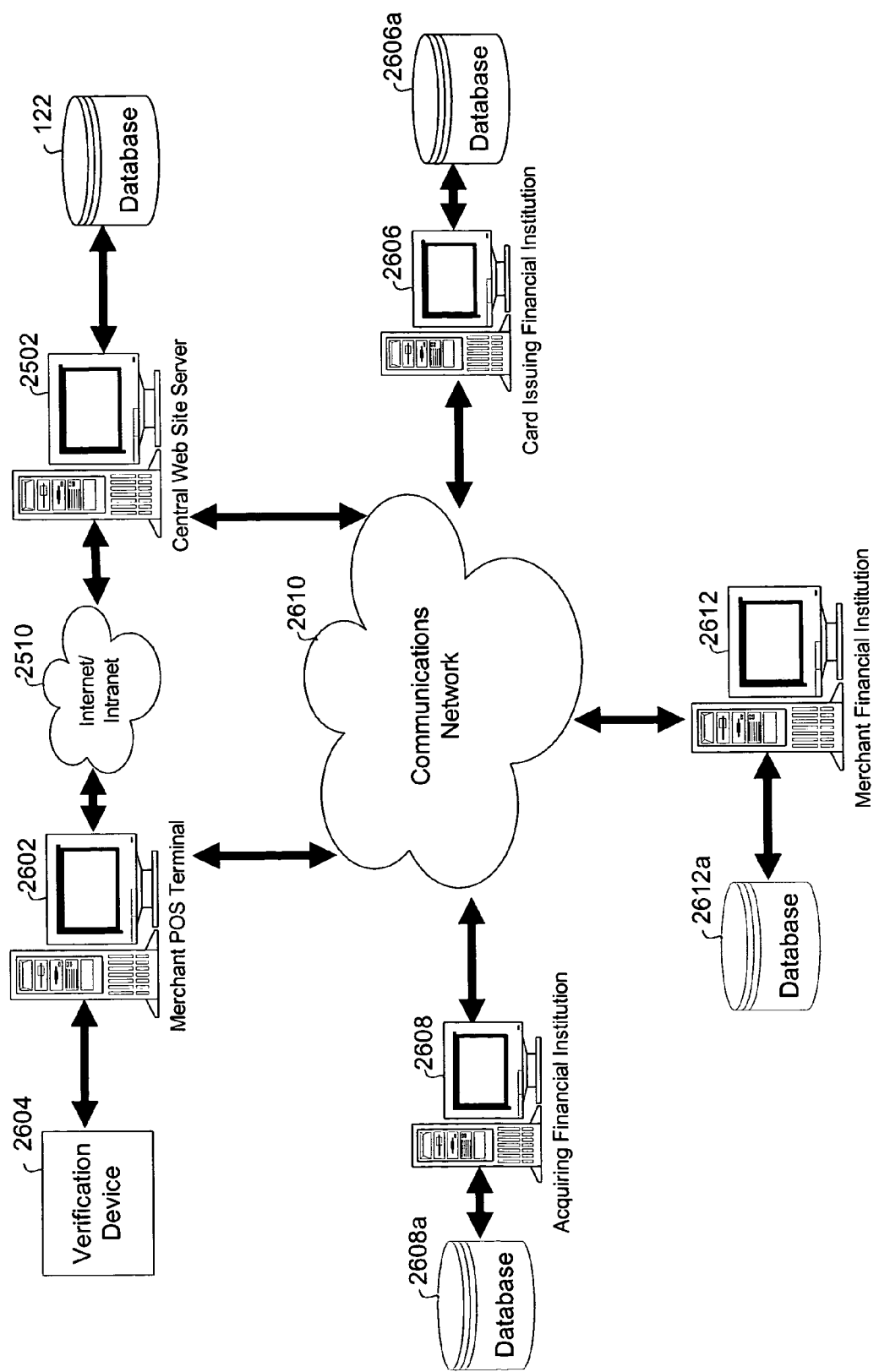
FIG. 26 is a top level system block diagram for implementing the systems and processes of FIGS. 4-24, according to the present invention.

FIG. 26 is a top level system block diagram for implementing the systems and processes of FIGS. 4-24, according to the present invention. In FIG. 26, a verification device 2604 is coupled to a retail store point-of-sale terminal or web site 2602 and can be used to implement the user identification/authorization and biometric processes previously described. The retail store or web site 2602 is coupled to the central web site 2502 via the Internet or an Intranet 2510. The central web site 2502 includes the database 122 for storing user account information, destination web site form information, etc. The retail store or web site 2602 and the central web site 2502 are coupled to communication network 2610, which is used for processing online and offline credit card transactions. The network 2610 may be the same network as the network 2510. Also coupled to the network 2610, are one or more acquiring financial institutions 2608, card issuing financial institutions 2606 and merchant (e.g., online or offline retailers) financial institutions 2612, including respective databases 2608a, 2606a and 2612a thereof. Accordingly, the processes as described with respect to FIGS. 4-24 can be implemented via the system of FIG. 26.

Web Services Processing

Figure 27:
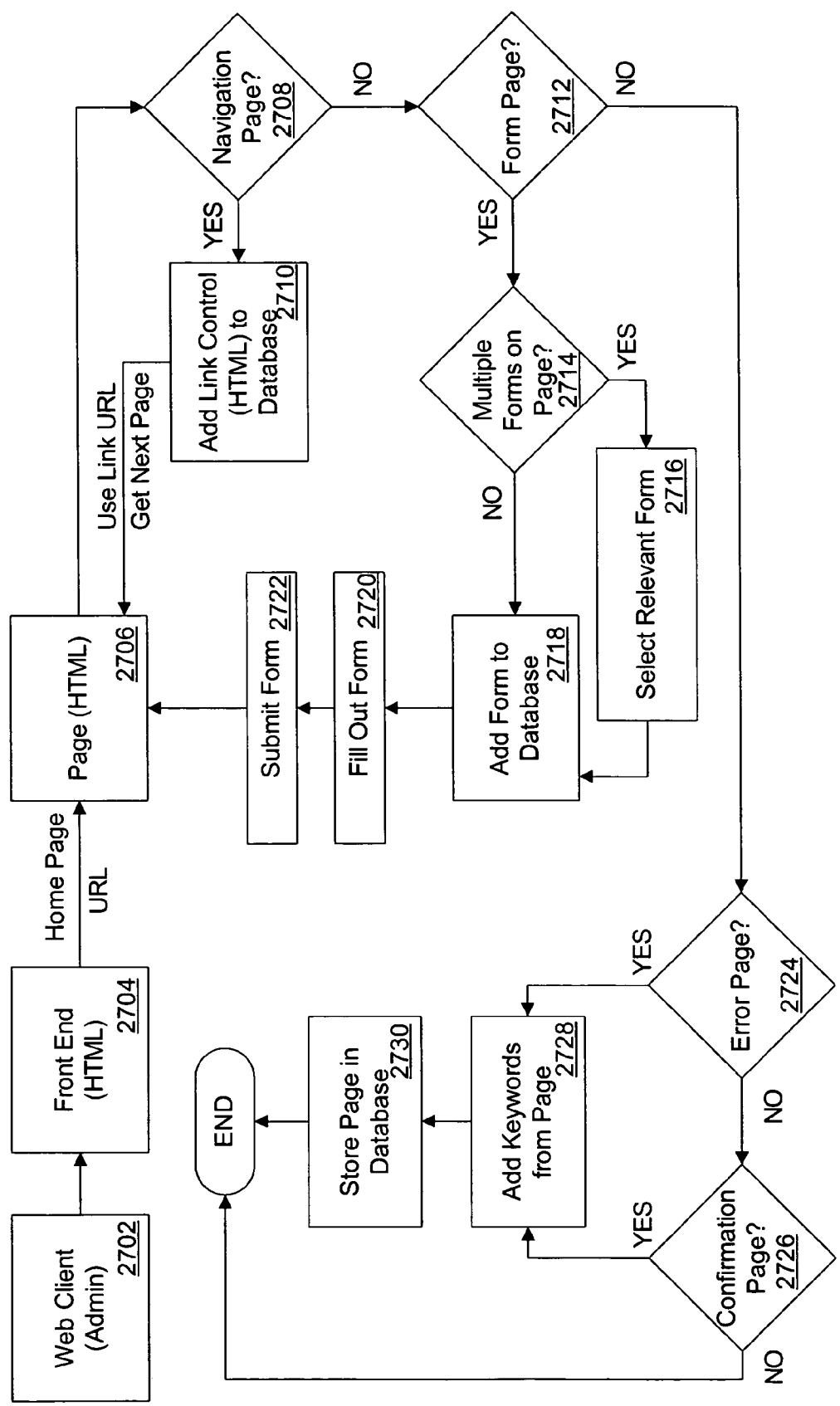
FIG. 27 illustrates exemplary form management system processing corresponding to the embodiments of FIGS. 1-3, according to a further embodiment of the present invention.
Figure 28:
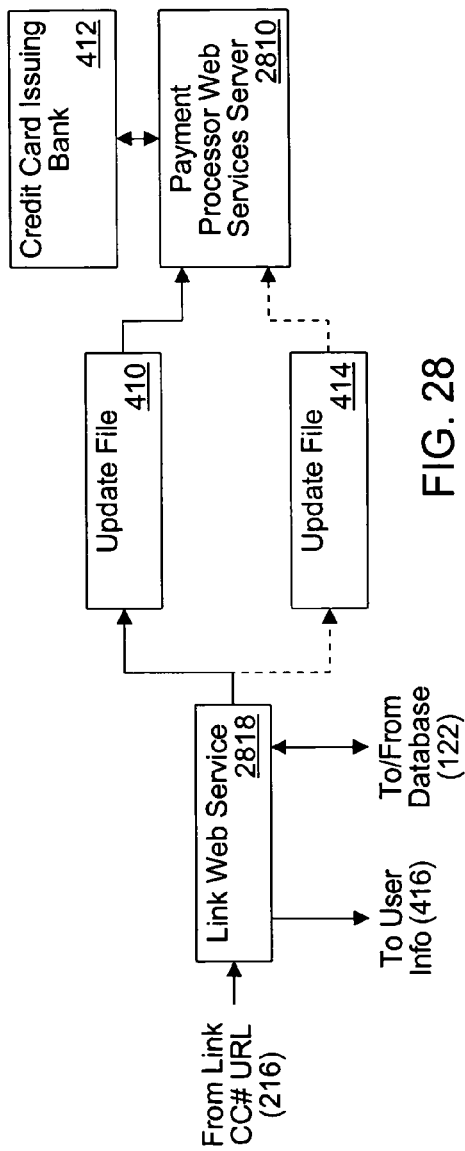
FIGS. 28-31 illustrate exemplary web services processing corresponding to the embodiments of FIGS. 4-7, according to further embodiments of the present invention.
Figure 29:
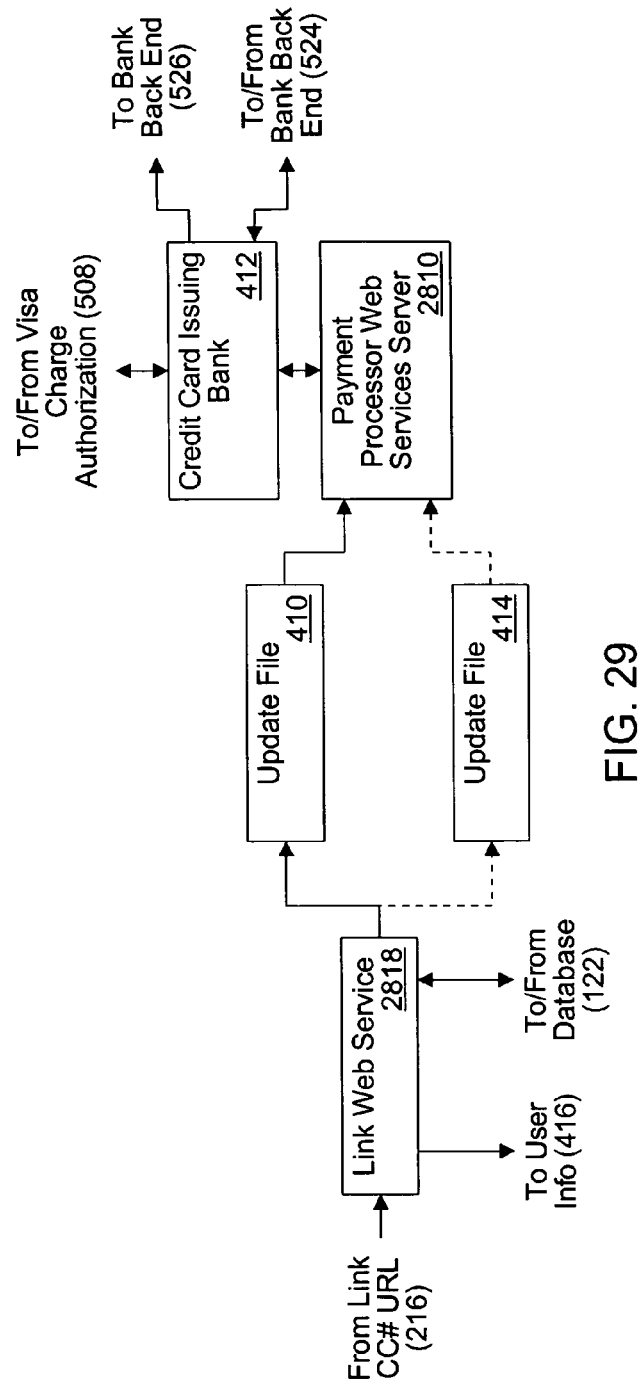
Figures 30, 31:
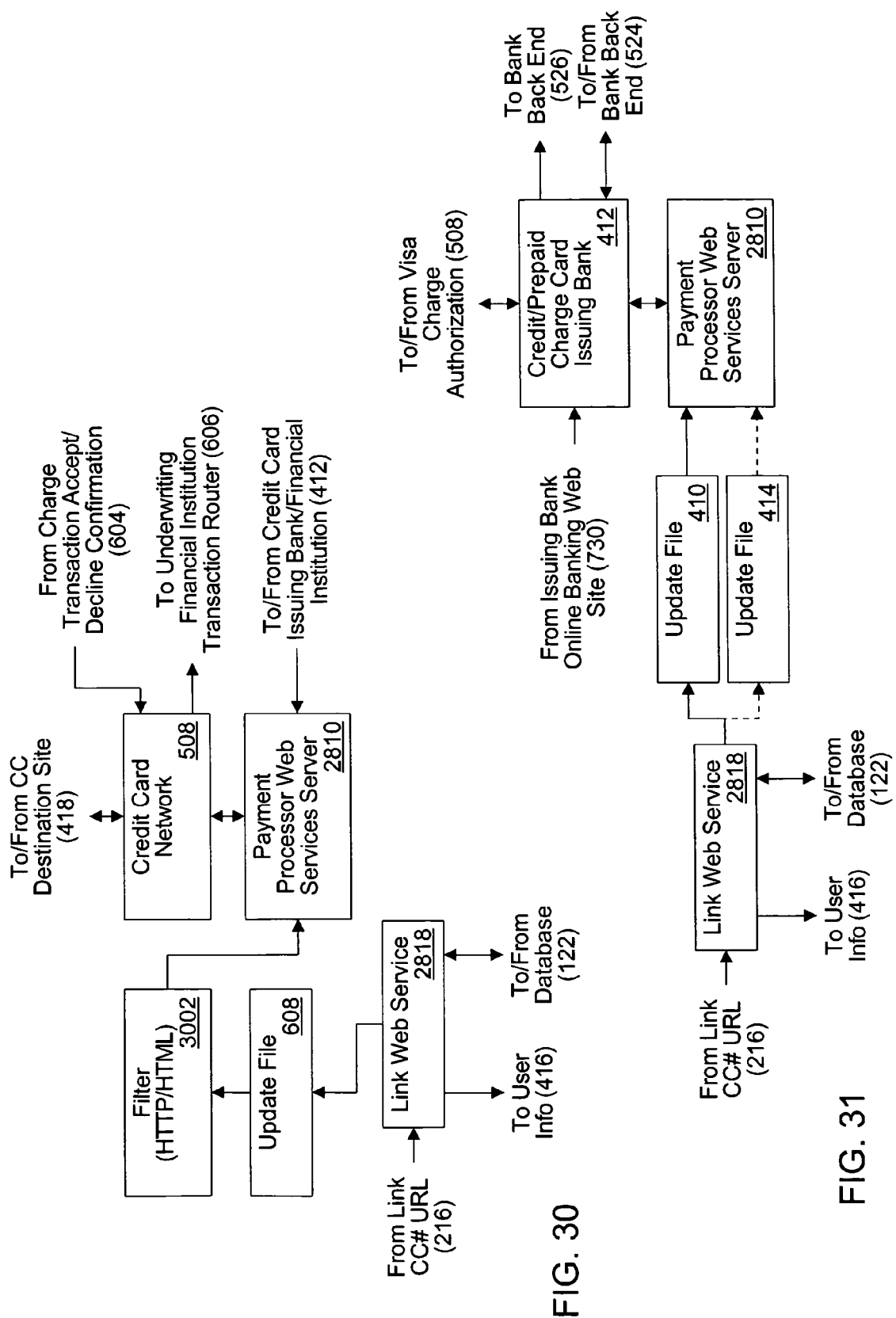

FIG. 27 illustrates further exemplary form management system processing corresponding to the embodiments of FIGS. 1-3. In FIG. 27, a web client (e.g., an administrator, a bot, an automated process, etc.) interfaces with a form management system (FMS) front end (e.g., HTML-based) to manage forms of a web site (e.g., entertainment web site, merchant web site, etc.) home page (steps 2702-2706). From the home page, the web client can navigate to forms of the web site (steps 2708, and 2712), while the form management system catalogs each navigation link control (step 2710) and form in a database (steps 2714-2718), fills out and submits forms in order to get to the next navigation page (steps 2720-2722), and catalogs confirmation and error pages, including adding keywords therefrom, in the database (steps 2724-2730).

Once the form management system has processed corresponding web site forms, the exemplary embodiments, for example, can be employed to register a user at the central web site, add existing web sites (e.g., merchant sites) where a user is already registered, register a user at new web sites, log a user into the central web site, transfer a user to a registered web site after automatically logging the user in, and the like.

In an exemplary embodiment, the form management system can be configured as a web services-based implementation and accordingly can employ any suitable user interface. In an exemplary embodiment, the form management system need not employ web services and, for example, can employ a web browser user interface.

In further exemplary embodiments, however, various web services can be employed, for example, instead of using the servlets, such as the Java servlets, and the like, of the exemplary embodiments. To understand the web services implementations of the exemplary embodiments, it is helpful to note that HTTP is the transport protocol of the World Wide Web and that there are different types of HTTP packets, for example, including a GET packet, a POST packet, and the like. Similarly, HTML is the markup language that is used as the base standard and web browsers receive HTML and render graphics accordingly in a web page. Computer web browsers also support various forms of XML (e.g., Mozilla/Netscape supports XUL, Internet Explorer supports MSXML, etc.) and mobile device web browsers support different protocols (e.g., cHTML for i-Mode devices, WML for WAP devices, etc.).

Accordingly, if a page in a browser is requested, for example, by typing in an address in an address field, by clicking on a hyperlink, by clicking on an image, and the like, an HTTP GET request to a corresponding web server is generated. Similarly, if a form is filled out, a check box is clicked, input is entered, etc., and a corresponding submit button is then clicked, a corresponding HTTP POST request is generated. Thus, a web server (e.g., Apache, Sun, Microsoft IIS, etc.) on a server computer waits for requests. For example, if the server receives a GET request for a web page, then the server serves back (e.g., sends an HTTP response) the requested HTML page to the browser. If the server receives a POST request, then the server processes the corresponding input data, and serves back an appropriate response, such as a confirmation page, an error page, and the like.

A Java servlet allows the web server to send back dynamic data (e.g., the time of day) from a GET request, process user input data (e.g., a user name and password) from a POST request, and the like. A servlet usually employs an extension, such as *.shtml or *.jsp (Java Server Page). For example, with conventional Microsoft implementations a servlet/JSP includes an ASP page and has an extension *.asp, and with Microsoft .NET technology includes an ASP.NET page and has an extension *.aspx. Accordingly, a servlet typically processes requests and responds via coupled transactions, wherein the request is in a markup language (e.g., HTML) to be rendered in a browser. Such servlet processing can be considered human to program communications, for example, unless an HTML screen scraper program is employed, which has its own pitfalls and usually is employed out of necessity.

By contrast, a web service can include a program to program communications mechanism. For simplicity, a web service can be looked as a type of a Remote Procedure Call (RPC), but in actuality it is much more than that. Accordingly, a program that makes a request to a web service on a web server (e.g., named LoginUser) can be employed to pass to the web service a user name and password, wherein the web service returns a corresponding response (e.g., returns "OK" along with a userID, if authentication is successful or if authentication fails, returns "Error" with an error message or an error code). Then the program can decide what to do next, such as call another set of web services using the returned userID, render the web service response in any suitable user interface, such as a web page, a mobile device, a word processor document (e.g., a "you are logged in" message), render a page in a spreadsheet document, and the like. Advantageously, with web services, the user interface can be decoupled from the data processing. By contrast, using Java servlets, JSPs, and the like, the user interface and the data processing are coupled together.

Advantageously, web services can employ standard protocols (e.g., XML, SOAP, WSDL, etc.), ensuring web services interoperability with various implementations. Accordingly, when a program employs a web service, the program need not know if the web service is built by an Open Source tool, by a Sun tool, by a Microsoft tool, etc. In addition to decoupling the application logic from the user interface, web services need not employ HTTP as a transport protocol. Accordingly, although existing tools and the SOAP standard currently can be defined using HTTP, for example, as the transport protocol, SMTP, instant messenger protocols, such as Microsoft IM, Open Source Jabber, AOL AIM, and the like, also can be employed.

Thus, the various servlets and other functions employed in the exemplary embodiments can be configured as web services, for example, to register a user at the central web site, add existing web sites (e.g., merchant sites) where a user is already registered, register a user at new web sites, log a user into the central web site, transfer a user to a registered web site after automatically logging the user in, and the like. In addition, the functionality, for example, that modifies or deletes registration or login data, and the like, can be configured via corresponding web services.

For example, with the servlet implementations of the exemplary embodiments, the HTML output is defined, whereas with a web services implementation the elements 306 and 322 of FIG. 3 can be configured as a registration web service, with a web service request transmitted between elements 308 and 306, and with a web service response transmitted between elements 322 and 328. Advantageously, at elements 308 and 328, instead of requiring HTML output when a servlet is employed, with web services, the web services output can be employed by a Yahoo HTML page, an MSN HTML page, a mobile device page, by a calling program, and the like. Thus, by employing web services, advantageously, the user interface can be decoupled from the data processing. In addition, since web services are built on industry standards, a Java interface need be employed and the programming language used is irrelevant.

FIGS. 28-31 illustrate exemplary web services processing corresponding to the embodiments of FIGS. 4-7. For example, in FIGS. 28-31, the link servlet 218 of FIGS. 4-7 can be replaced with a link web service 2818 for generating the update files 410, 414 and 608. In addition, in FIGS. 28, 29, and 30, the update files 410, and 414 of FIGS. 4, 5 and 7 can be processed by a payment processor web services server 2810, and in FIG. 30, the update file 608 of FIG. 6 can be processed by the payment processor web services server 2810 after being filtered via filter 3002 (e.g., an HTML filter).

In an exemplary embodiment, the payment processor web services server 2810 can be employed to receive the update files 410, and 414, and the filtered update file 608, store the files, process the files, delete the files, access the database, send the appropriate output, and the like. In an exemplary embodiment, the payment processor web services server 2810 can be offered to transaction processors (e.g., Visa, a bank, etc.) as pre-built web services by tools of leading vendors, such as IBM Websphere, BEA Workbench, Microsoft .NET, Open Source Eclipse, Sun NetBeans, and the like. In an exemplary embodiment, current transaction processors can be appropriately configured according to the exemplary embodiments, for example, to include the payment processor web services server 2810, with security settings appropriately adjusted, with database connection strings appropriately configured, to include one or more procedures configured to access a database of the payment processor, and the like, advantageously, without a need modify the source code of the transaction processor.

Wireless Web Services Processing

Advantageously, the exemplary embodiments can include dormant payment card account activation, for example, via wireless technologies, such as the wireless web, mobile Internet, and the like. Accordingly, by employing the mobile Internet, the exemplary embodiments can provide secure e-commerce transactions via a user device, such a cell phone, PDA device, and the like. For example, a user device configured as a PDA or cell phone can be configured to access e-commerce web site destinations, for example, via the central web site, using WAP or any other suitable communications protocol to perform secure e-commerce transactions based on the dormant payment card account. However, presently, most users simply use their cell phone or PDA devices to check for movie times, find restaurant locations, and the like, as the mobile Internet is yet to be fully integrated with existing financial transaction processing and distribution systems employed by merchants, and the like.

In addition, navigation to various mobile-enabled web sites, typically, has been difficult, for example, due to the difficulties in typing URL addresses via a user interface of a cell phone or PDA device. Accordingly, the single sign on, auto registration features, and the like, of the exemplary embodiments, advantageously, allow quicker and easier navigation on the mobile Internet, processing of dormant payment card account information, and the like, as well as simplifying secure payment transactions at mobile Internet-enabled merchant web sites, brick and mortar stores and merchants, and the like.

Accordingly, via the dormant payment card processing of the exemplary embodiments, dormant payment card user account information can be transmitted from a cell phone or PDA device to a mobile web merchant via the central web site over the wireless Internet for performing secure e-commerce transactions in the same manner as on a home PC over the wired Internet. For example, a user with a cell phone or PDA device can use the central web site of the exemplary embodiments to navigate to a particular e-commerce merchant and activate the dormant payment card for secure online purchases with user authentication, for example, via user login authentication at the central web site, personal identification number (PIN) or biometric authentication on the user device and/or the central web site, and the like.

In further exemplary embodiments, however, web services, and the like, also can be employed for secure transactions with the physical or digital (e.g., virtual) dormant payment card of the exemplary embodiments. As previously discussed, web services typically include small units of code built to handle a limited set of tasks and can employ standard web protocols, such as Hypertext Transfer Protocol (HTTP), extensible Markup Language (XML), Simple Object Access Protocol (SOAP), Web Services Description Language (WSDL), Universal Description, Discovery and Integration (UDDI), and the like. Advantageously, web services can be independent of operating systems, programming languages, and can be used to connect people, systems, and devices. For example, a web service can be a small program designed to supply other applications with the latest stock exchange prices, to handle credit card payments, and the like.

Since web services can use XML-based protocols to communicate with other systems, web services are independent of both operating systems and programming languages. For example, an application calling a web service can send service requests and receive service answers via XML. Advantageously, the calling application need not be concerned about the operating system or the programming language running on the web services computer or server. Thus, web services, advantageously, provide various benefits, such as ease of communications between applications, ease of reuse existing services, ease of distribution of information to consumers, and the like.

Web services also provide rapid application development by making it easier to communicate between different applications and by making it possible for developers to reuse existing web services instead of writing new ones. Thus, advantageously, web services can be employed with the exemplary embodiments to provide an easy way to process the various transactions of the exemplary embodiments for a large number of users.

Figure 32:
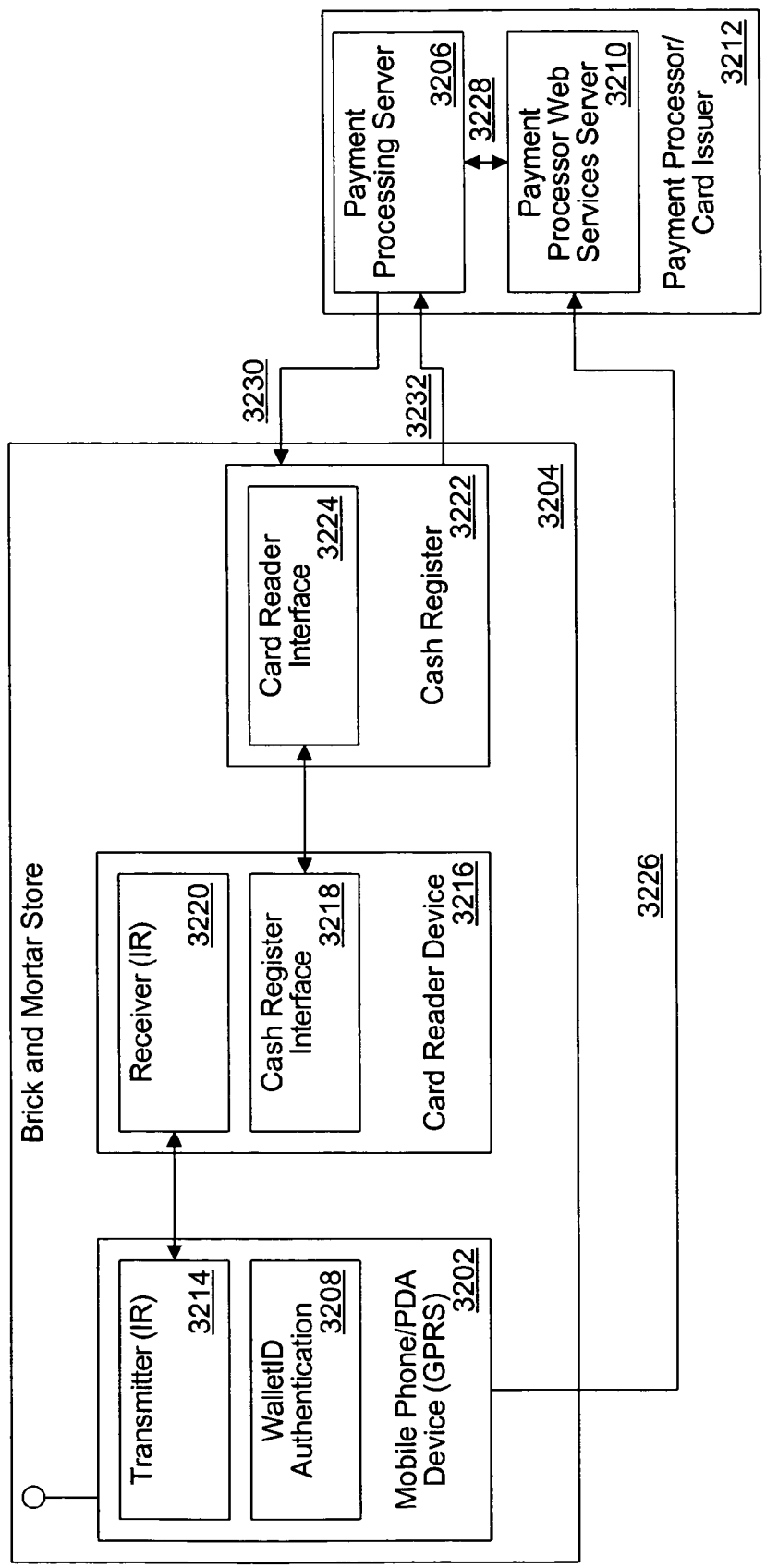
FIG. 32 illustrates an exemplary web services system for digital dormant payment card account activation with a device configured to access web services, according to the present invention.

FIG. 32 illustrates an exemplary web services system for digital dormant payment card account activation with a device configured to access web services, according to the present invention. In FIG. 32, the exemplary web services system can include a user device 3202, for example, that can be employed in a brick and mortar store 3204 to perform secure wireless payment transactions with a payment processor/card issuer 3212 based on the digital dormant payment card account activation of the exemplary embodiments. The digital dormant payment card account can be accessed on the user device 3202 (e.g., GPRS-enabled, etc.) via a secure authentication mechanism 3208 (e.g., wallet ID authentication, etc.). The user device 3202 can include a transmitter device 3214 (e.g., IR-based, RF-based, Bluetooth-based, etc.) for transmitting the digital dormant payment card account information to a corresponding receiver device 3220 of a card device 3216 at the point-of-sale of the merchant 3204.

The card reader device 3216 can include a cash register interface 3218 for communicating the payment transaction information to a card reader interface 3224 of a cash register 3222 at the point-of-sale. For example, once the user is authenticated on the user device 3202, the dormant payment card account information can be transmitted to the card reader device 3216 and the update file or signal 3226 can be generated and sent from the user device 3202 to a payment processor web services server 3210 of a payment processor/card issuer 3212, and the like. The cash register device 3222 communicates with the payment processor/card issuer 3212, for example, via a payment processing server 3206 which communicate with the payment processor web services server 3210 for activating and deactivating the dormant payment card account.

Accordingly, the digital dormant payment card account can be used in the brick and mortar store 3204 via the mobile web services enabled phone or PDA device 3202 (e.g., GPRS-enabled, etc.), for example, with activation of the digital dormant payment card account prior to each purchase and before transmission of the account information to the point-of-purchase or point-of-sale cash register terminal 3222. In an exemplary embodiment, the built-in wallet ID authentication component 3208 of the user device 3202 can be configured to directly activate the digital dormant payment card account with the payment processor web services server 3210. Accordingly, the update file or signal 3226 of the exemplary embodiments can be used to perform a secured payment transaction with the payment processor web services server 3210 based on the digital dormant payment card account information, for example, after authentication of the user is verified at the user device 3202.

In an exemplary embodiment, the payment processor web services server 3210, after processing the update file or signal 3226 to activate the digital dormant payment card account, via verification signals 3228, can authorize the payment processing server 3206 to process the corresponding transaction based on the corresponding digital dormant payment card account. Accordingly, the card reader device 3216 can employ the receiver 3220 to receive digital dormant payment card account information from the user device 3202 and then synchronize the information with the cash register 3222. The cash register 3222 then can transmit a payment transaction request signal 3232 to the payment processing server 3206 of the payment processor/card issuer 3212 for processing of the corresponding transaction.

In an exemplary embodiment, if the transaction request signal 3232 from the merchant 3204 can be validated by the payment processor web services server 3210 based on the updated file or signal 3226 to activate the dormant payment card account, the corresponding transaction can be processed for payment, based on available funds or credits associated with the dormant payment card account. Accordingly, a payment approval or denial signal 3230 can be transmitted from the payment processing server 3206 to the cash register 3222, and the dormant credit card account can be deactivated by the payment processor web services server 3210, completing the secure transaction.

In an exemplary embodiment, authentication (e.g., PIN, signature, biometric, etc.) of the user can be performed on the user device 3202, which can take advantage of various payment mechanisms (e.g., wallet ID, etc.), services (e.g., Go Virtual, etc.), and the like, built into or enabled on various devices, such as cell phones (e.g., NOKIA), and the like. Accordingly, the authentication mechanism or component 3208 on the user device 3202, for example, can employ a mobile ISP connection (e.g., GPRS-based, etc.) to transmit the update file or signal 3226 to the payment processor web services server 3210, for example, via a secure communications transmission, and the like.

Figure 33:
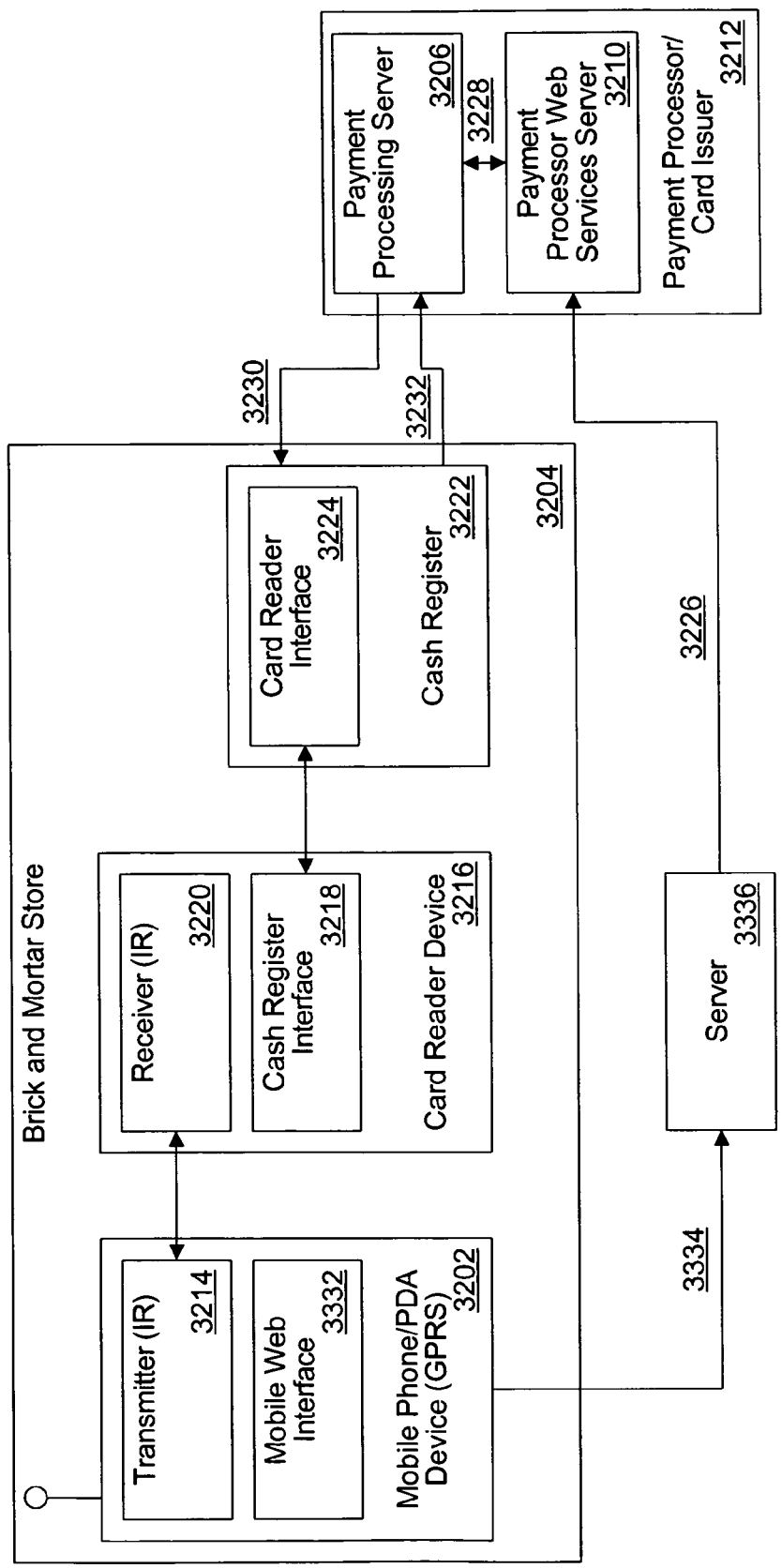
FIG. 33 illustrates an exemplary web services system for digital dormant payment card account activation with a device not configured to access web services, according to the present invention.

FIG. 33 illustrates an exemplary web services system for digital dormant payment card account activation with a device not configured to access web services, according to the present invention. In FIG. 33, the exemplary web services system functions in a similar manner as that of FIG. 32, except that the user device 3202 includes a mobile web interface 3332 for communicating authentication information (e.g., PIN, signature, biometric, etc.) 3334 to a server 3336, such as the central web site configured to access web services, a communications server or any suitable communications device, and the like, which can authenticate the user based on the authentication information and then generate the update file or signal 3226.

In an exemplary embodiment, the mobile Internet, and the like, can be used to send the user authentication information to the web service server 3336. After the authentication information is verified by the web service server 3336, the web service server 3336 can generate and send the update file or signal 3226 to the payment processor web services server 3210 to authenticate and activate the pending transaction request from the merchant 3204.

In an exemplary embodiment, the user authentication information is validated by the web service server 3336, before the web service server 3336 generates and sends the update file or signal 3226 to the payment processor web service server 3210 to activate the digital dormant payment card account for the pending transaction at the merchant 3204. In an exemplary embodiment, the authentication information can be transmitted in the form of a secured SMS text message, a secure e-mail or any other suitable secure data communication, and the like, from the user device 3202 to the web service server 3336.

Figure 34:
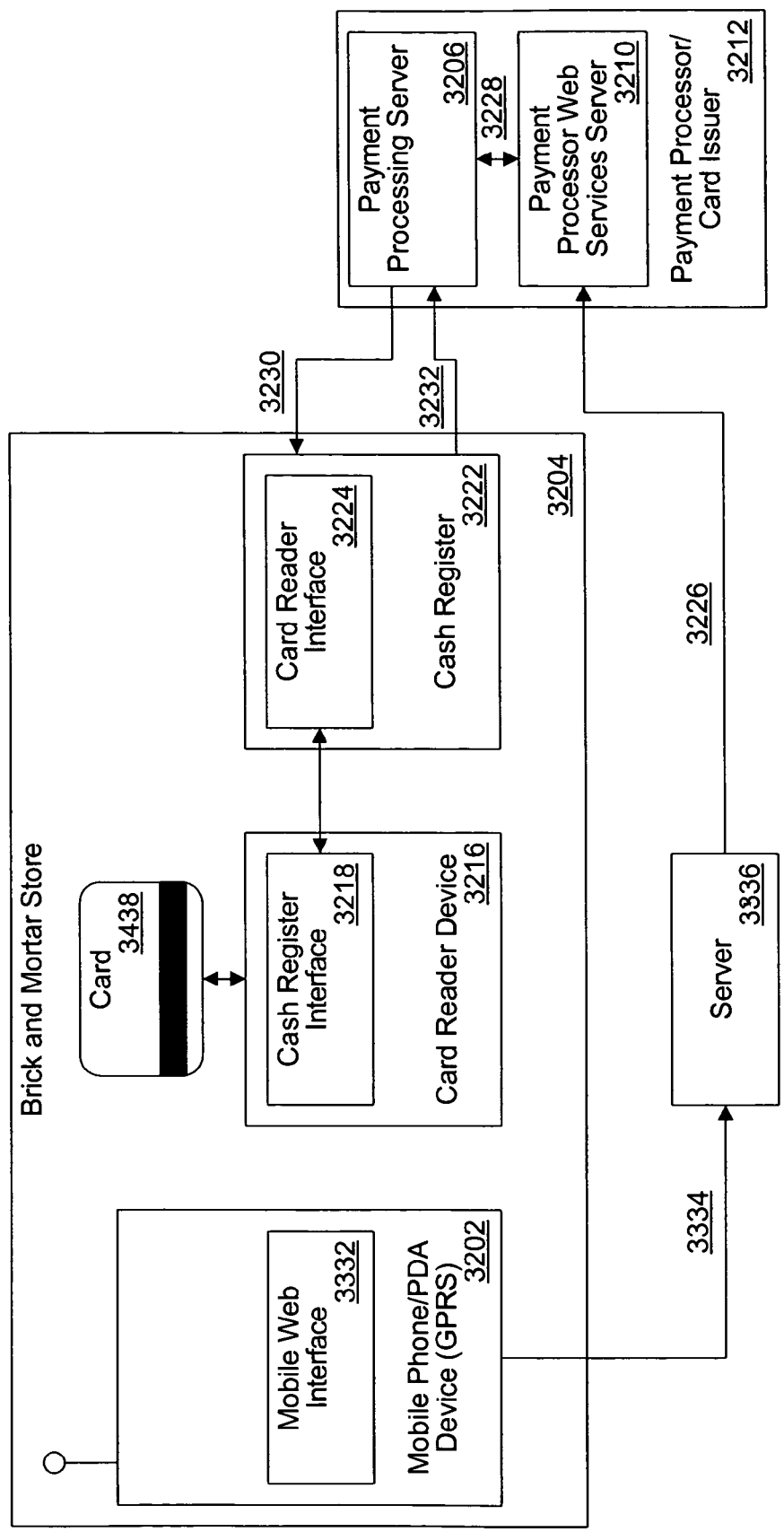
FIG. 34 illustrates an exemplary web services system for physical dormant payment card account activation with a device not configured to access web services, according to the present invention.

FIG. 34 illustrates an exemplary web services system for physical dormant payment card account activation with a device not configured to access web services, according to the present invention. In FIG. 34, the exemplary web services system functions in a similar manner as that of FIG. 33, except that a physical dormant payment card 3438 is employed to transmit the dormant payment card account information to the card reader device 3216, for example, by swiping of a magnetic strip on the physical dormant payment card 3438 encoded with the dormant payment card account information at the card reader device 3216, by manually or automatically keying in the dormant payment card account information, and the like. Accordingly, the physical dormant payment card 3438, which is inactive in its natural state, can be activated by the web service server 3336 and used for processing payments after the user is authenticated. Advantageously, the exemplary embodiment of FIG. 34 can be implemented with existing technologies in use with the current prevailing wireless infrastructure (e.g., 2.5 G, etc.), obviating a need for technology evolution at the point-of-purchase.

In an exemplary embodiment, after the user authentication information is verified by the web service server 3336, information associated with the user or the device 3202 (e.g., a cell phone number, username and password, account number, etc.) can be cross-referenced by the web service server 3336 with the dormant payment card account number of the user stored in a user profile on a database of the web service server 3336 for generating and transmitting the corresponding update file or signal 3226 for activating the dormant payment card account at the payment processor/card issuer 3212. Then, when the physical dormant payment card 3438 is swiped at the card reader device 3216, the corresponding transaction can be processed. At the conclusion of the purchase, the dormant payment card account is once again de-activated, until further user authentication is performed for further transactions at the merchant 3204 or at a different store or merchant.

Figure 35:
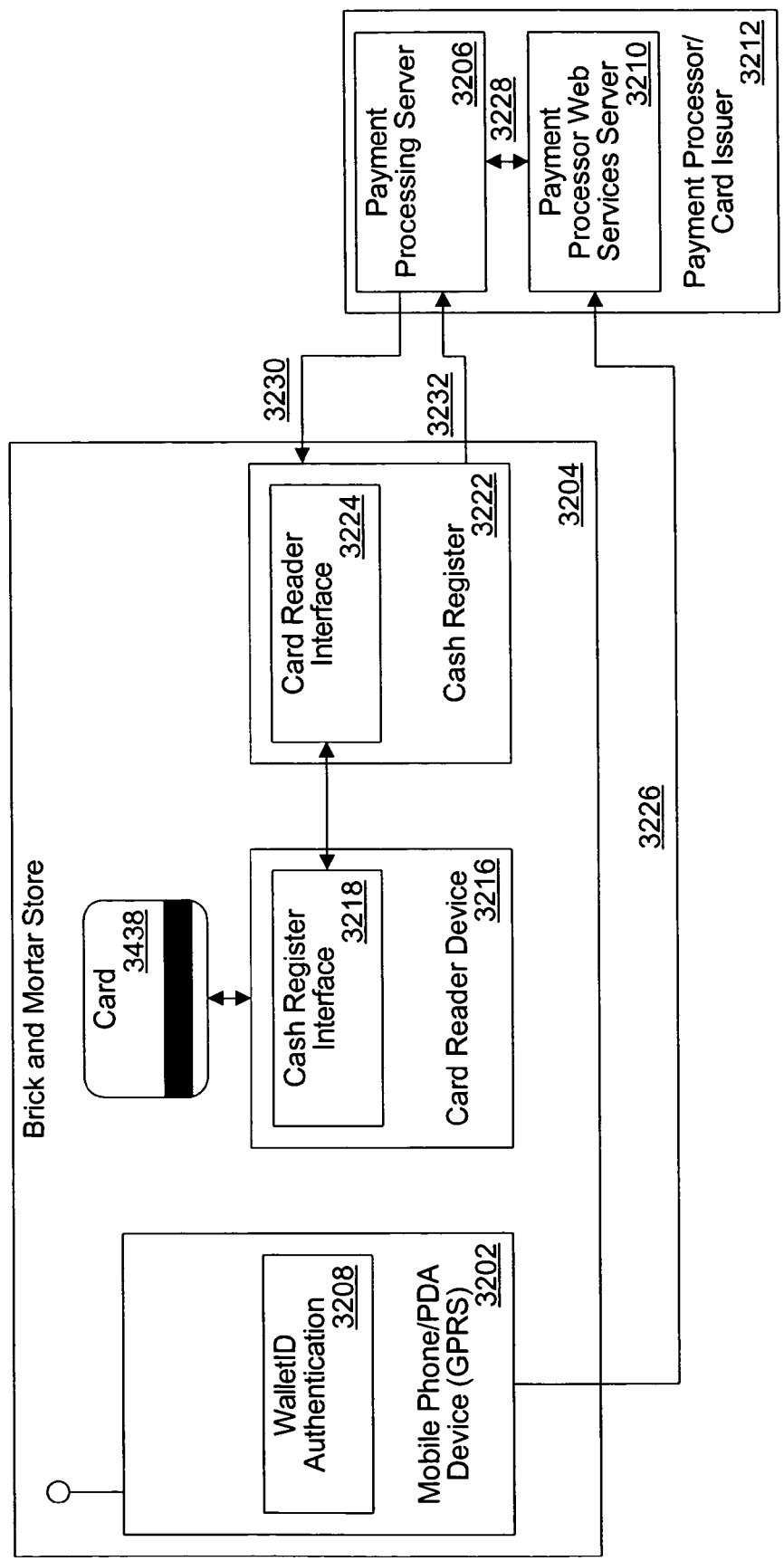
FIG. 35 illustrates an exemplary web services system for physical dormant payment card account activation with a device configured to access web services, according to the present invention.

FIG. 35 illustrates an exemplary web services system for physical dormant payment card account activation with a device configured to access web services, according to the present invention. In FIG. 35, the exemplary web services system functions in a similar manner as that of FIG. 32, except that the physical dormant payment card 3438 is employed to transmit the dormant payment card account information to the card reader device 3216 as with the system of FIG. 34.

In an exemplary embodiment, the card reader device 3216 and the cash register 3222 can be separate devices that work together, work independently, etc., depending on the application. For example, for the store 3204, including a small or local store, the card reader device 3216 can be connected to a communications network of the payment processor/card issuer 3212, and the cash register 3222 can be configured merely for collecting cash. For a department store, the card reader device 3216 and the cash register 3222 may be integrated.

In an exemplary embodiment, the transmitter 3214 and receiver 3220 can be configured for wireless communications with each other (e.g. infrared (IR), radio frequency (RF), BlueTooth, cellular, and the like). However, in further exemplary embodiments, any suitable form of wired or wireless communications can be employed, as will be appreciated by those skilled in the relevant art(s).

In the exemplary embodiments, the user device 3202, such as a mobile phone, smart phone, PDA device, and the like (e.g., GPRS enabled, etc.), can be configured to access the Internet to make purchases. This may be especially true for a user that may have a smart phone, but no PC to connect to the Internet.

In an exemplary embodiment, the user device 3202 can communicate the update file or activation signal 3226 to the payment processor/card issuer 3212 and can access and send the dormant payment card account information, via the authentication component 3208, to the card reader device 3216 in any suitable manner (e.g., via wired or wireless communications, etc.).

In an exemplary embodiment, purchase transactions with the dormant payment card account can be configured to be merchant independent or merchant specific. For example, the dormant payment card account can be configured to be activated via the user device 3202 regardless of the merchant or the user can specify a specific merchant via the user device 3202.

In an exemplary embodiment, the authentication information signal 3334 can include the PIN, biometric information, signature, and the like, of the user and can be sent to the web services server 3336 for verification, for example, via Short Message Service (SMS), Instant Messaging (IM), and the like.

The exemplary embodiments can employ any suitable services and technologies, such as Nets, Nets Vcard, Blink, eNETS Mobile Wallet, eNETS Credit, eNETS Debit, eNETS PDA, Go Virtual, and the like, that allow consumers to pay for purchases using the user device 3202, such as a handheld phone (e.g., including a chip which carries the stored-value electronic wallet 3208 from which finds can be deducted). Accordingly, the user device 3202 can communicate with the card reader device 3216 at a point-of-sale terminal, such as the cash register 3222. Thus, the user device 3202 can employ the built-in mobile wallet component or mechanism 3208 for storing the dormant payment card account information and which can be password protected, simplifying the shopping process by eliminating the need for repetitive keying in of information.

Thus, the exemplary embodiments, advantageously, allow mobile dormant payment card transactions using the dormant payment card account with and without a physical card. For example, the dormant payment card account information stored on the user device 3202 can be employed instead of the physical card for a quick run to a convenience store with only cell phone or PDA device in tow. Accordingly, the cash register 3222 can be configured to communicate with the user device 3202, for example, via wireless communications, such IR, RF, Bluetooth, secure wireless LAN (e.g., employing 256 bit encryption) or any other suitable prevailing form of digital data transmission (e.g., software-based, hardware-based, USB flash drive-based, etc.), and the like.

In an exemplary embodiment, any suitable prevailing protocol can be employed to transmit the dormant payment card account information (user name, account number, expiration date, etc.) to the point-of-sale cash register 3222 in the brick and mortar store 3204. For example, a PDA device of a salesperson can be configured to receive the dormant payment card account information from the user device 3202 and then synch up (e.g., via IR communications) with the cash register 3222 in the store 3204 to process the secure purchase transaction. In an exemplary embodiment, PIN (e.g., via cell phone or PDA), signature (e.g., stylus and PDA), biometric (e.g., via voice, iris or finger print), and the like, authentication can be employed on the user device 3202, for example, prior to the generation of the update file or signal 3226 or the transmission of the dormant payment card account information to the point-of-sale cash register 3222. Accordingly, the PIN, signature, biometric, and the like, authentication can be performed via hardware and/or software local to the user device 3202 or in further exemplary embodiments can be performed via web authentication over mobile communications (e.g., ISP-based) between the user device 3202 and the web services server 3336.

The exemplary embodiments can employ various services, such a NETS, eNETS Debit, eNETS Credit, and the like, along with the corresponding secure wallet services (e.g., wallet ID, etc.), and the like. In further exemplary embodiments, the above or any other suitable form of payment vehicles or services (e.g., PayPal, etc.) can be configured to be dormant and can be used in conjunction with the web services server 3336 or a web service-enabled user device to activate, validate, and the like, each dormant transaction, irrespective of the virtual or physical venue employed. Advantageously, a user need not worry what happens with an account number after performing a secure payment transaction, due to the activation/de-activation features of the exemplary embodiments.

In further exemplary embodiments, wired devices on a wired LAN, and the like, also can be employed to communicate the dormant payment card account information to the cash register 3222, as will be appreciated by those skilled in the relevant art(s). In still further exemplary embodiments, the dormant payment card account can be configured as a subordinate card account of the exemplary embodiments, for example, including merchant, transaction amount, merchandise type, temporal, and the like, limitations on the corresponding transactions. Accordingly, the digital or physical dormant payment card can be configured to be merchant or non-merchant specific. Advantageously, by employing the physical dormant payment card 3438, there may be no need to define an authorized merchant, since the physical card 3438 can be swiped at the point-of-sale terminal to complete a purchase transaction. Thus, a criminal would not only have to be able to duplicate the physical dormant payment card 3438, but would also have to defeat the user authentication for the dormant payment card account activation of the exemplary embodiments.

Split Shipment and Recurring Transactions Processing

Most transactions occur in real-time, for example, while a consumer is initiating an online or offline purchase. However, there may be scenarios that employ special handling for use with the dormant online or offline payment account and/or card of the exemplary embodiments. For example, such scenarios can include split shipment transactions (e.g., for processing transactions for back-ordered items) and recurring transactions (e.g., for processing transactions that occur periodically). In an exemplary embodiment, corresponding icons can be provided (e.g., underneath) each single sign on (SSO) web site merchant link of the exemplary embodiments, for example, on a My Profile favorites page, and the like.

In an exemplary embodiment, split shipment Transactions, for example, can occur when certain items from a placed order are not currently in stock and are available on back order. The online merchant can make the consumer aware of such status, for example, during the checkout process. Once the consumer is alerted to the back ordered item(s) in the purchase order, the consumer can click on the split shipment transactions icon located under the SSO link for the corresponding merchant, for example, on a My Profile favorites page, and the like. The consumer can be prompted to enter the dollar figure for the remaining split shipment item(s) that are pending. The SSO system can make sure that the consumer account is active to process the split shipment transaction(s) at whatever later date that the transactions occur.

In an exemplary embodiment, recurring transactions, for example, can be requested by a consumer for recurring payments for particular items, services, and the like. The consumer can let the SSO system know at what frequency and with what other parameters the recurring transactions will occur, so that the corresponding payments can be processed, even if the consumer is not online at the time of the recurring transaction processing. By clicking on the recurring transaction icon, for example, located under the SSO link for a given merchant on a My Profile favorites page, and the like, a form can pop up for the consumer to enter the frequency and other parameters for the recurring transaction at the corresponding merchant. The SSO system can make sure that the account of the consumer is active to process the recurring transaction(s) at whatever later date the transactions occur.

FIG. 36 illustrates an exemplary process for dormant payment card transaction authorization screening/activation. In FIG. 36, in a payment processing server 3606 at a processing facility 3604, transaction data can be checked against data in the dormant payment card account update file or activation signal 3612 stored in a payment processor web services server 3610. Accordingly, the transaction can be accepted 3608 to create an approval code 3616 or denied 3614. In an exemplary embodiment, the consumer device 3602 can initiate an online transaction, for example, after auto login is performed and the dormant payment card update file 3612 is sent from the single sign on host. The payment authorization can be accepted and processed to create the approval code 3616.

FIG. 37 illustrates exemplary dormant payment card transaction authorization logic. In FIG. 37, prior to payment authorization, transaction data 3702 is authenticated with the data in the corresponding update file 3712. Once authenticated (e.g., the card number and merchant ID number are validated as matching those values in the update file 3712), the dormant payment card is active for the transaction and the authorization code 3616 is processed and sent to merchant to allow posting of payment for the transaction amount. Accordingly, the transaction data 3702, for example, can include a transaction amount 3704 (e.g., in dollars) requested by the merchant for the items that were in stock, a dormant payment card number 3706, a merchant ID number 3708 for the transaction initiating merchant, and the like. The update file data 3712, for example, can include a field 3714 corresponding to the transaction amount for the entire purchase transaction requested by the merchant, a corresponding dormant payment card number 3716, a corresponding merchant ID number 3718 for the transaction initiating merchant, and the like. In an exemplary embodiment, constraints 3710 can be provided and used to specify that the transaction data 3702 matches the update file data 3712, the transaction amount 3704 is less than or equal to the update file transaction amount 3714, in the case of split or recurring shipments, and the like.

FIG. 38 illustrates an exemplary dormant payment card split shipment notification form 3804. In FIG. 38, for the case of split shipments, for example, during the checkout process, a consumer is notified that of their initial $400 purchase, $229.97 of the goods were in stock, while the remaining $170.03 (e.g., corresponding to a split shipment differential)

is on back order. Accordingly, the consumer can inform the single sign on (SSO) service host that the purchase is a split shipment (e.g., by updating the SSO service of the split shipment differential) to ensure that the dormant payment card number has a secondary update file 3812 cached on the payment processor web services server 3610 for future use by the initiating split shipment merchant for the subsequent shipment(s)/payment(s).

In an exemplary embodiment, next to each merchant web site SSO link (e.g., in this case the SSO link for the split shipment initiating merchant), an icon can be provided, which the consumer can click on, and that can open the form 3804 where the consumer can let the SSO service know via the field 3806 what the total remaining amount (e.g., the split shipment differential) is for the subsequent split shipment(s). The split shipment differential value input by the consumer in the field 3806 can be used as a maximum transaction amount for a secondary update file of the subsequent split shipment(s). The secondary update file can be created and stored in the payment processor web services server 3610 to allow the split shipment initiating merchant to obtain a secondary authorization code 3616 when the merchant is prepared to complete the split shipment at a future time.

In an exemplary embodiment, to ensure that the split shipment secondary update file for the subsequent split shipment(s) does not cause interference with normal dormant payment card transactions that might occur at that merchant while the customer is still waiting for their back ordered items, a logic check can be employed by the payment processor web services server 3610 to determine how many update files are pending for the payment requesting merchant and for the dormant payment card account in question. For example, if there is more than one update file for the same requesting merchant, then there is a real time update file and a secondary update file for a split shipment pending for the requesting merchant. When this scenario occurs, then the payment processor web services server 3610 can process the real time update file first (e.g., giving it higher priority) and leave the secondary update file cached for the later completion of the back ordered split shipment(s).

FIG. 39 illustrates exemplary dormant payment card secondary update file constraints processing. In FIG. 39, a secondary update file 3912 was already created and stored in the payment processor web services server 3610, as described with respect to FIG. 38. In an exemplary embodiment, a transaction value field 3914 can be set to a maximum amount 3914 equal to the split shipment differential value 3806 input into the SSO service by the consumer, as described with respect to FIG. 38. In further exemplary embodiments, the split shipment differential value 3806 can be input by the merchant initiating the split shipment transaction. The previous merchant initiating the split shipment and identified by a merchant ID number field 3918 can be authorized to obtain further authorization code 3616 for the remaining split shipment(s), and a dormant payment card number 3916 that created the secondary update file 3912 can be processed for the secondary shipment.

In an exemplary embodiment, the second shipment transaction data 3902 corresponding to a split shipment transaction, for example, can include a second shipment transaction amount 3904, a dormant payment card number 3906, a merchant ID number 3908 for the split shipment initiating merchant, and the like. The secondary update file 3912, for example, can include a maximum transaction amount 3914, a corresponding dormant payment card number 3916, a corresponding merchant ID number 3918 for the split shipment initiating merchant, and the like. In an exemplary embodiment, secondary authorization code constraints 3910 can be provided, for example, specifying that the second shipment transaction amount 3904 is less than or equal to the maximum transaction amount 3914, and that the dormant payment card numbers 3906 and 3916, and the merchant ID numbers 3908 and 3918 for the split shipment initiating merchant match.

In an exemplary embodiment, if the second shipment transaction amount 3904 is less than the cached maximum transaction amount 3914, then the secondary authorization screening process can create and cache further update file(s) with corresponding constraints based upon the calculated remaining split shipment differentials, as further described with respect to FIG. 40, until the split shipments are completed (e.g., until the split shipment differential=0). Accordingly, FIG. 40 is used to illustrate such an exemplary secondary authorization screening process including a third update file. In FIG. 40, during the secondary authorization screening process, as long as the calculated split shipment differential is >0 (e.g., $50.00 in this example), then update file(s) 4012 ($3^{rd}$, $4^{th}$, etc.) can continue to be generated and cached on the payment processor web services server 3610, as described with respect to FIG. 38, until the split shipments are complete.

FIG. 41 illustrates an exemplary dormant payment card recurring transaction notification form. In FIG. 41, for the case of recurring transactions, for example, the consumer can click on a recurring transaction notification form icon, link, and the like, associated with a merchant web site link, and which launches the recurring transaction notification form 4102 for notifying the SSO service host that a recurring transaction can be bound to the corresponding merchant. In the recurring transaction notification form 4102, parameters/constraints 4106-4110 for the recurring transactions can be input and used to create corresponding update files 4112, which can be cached on the payment processor web services server 3610 for the recurring transactions. For example, next to each SSO merchant web site link (e.g., in this case the SSO link for a recurring transaction merchant), an icon, link, and the like, can be provided for a consumer to click on and that opens the form 4102 so that the consumer can let the SSO service know what the recurring transaction constraints are for the subsequent transactions. In an exemplary embodiment, a recurring transaction amount field 4106 can be used to set a maximum transaction amount for the recurring transaction update file(s) 4112 employed for the recurring transactions, buttons or fields 4108 can be used to specify the frequency of the recurring transactions (e.g., daily, monthly, yearly, etc.), a final payment date field 4110 can be used to specify the date of a final payment, and the like.

In an exemplary embodiment, for example, to ensure that the recurring transaction update file(s) 4112 for the subsequent recurring transaction(s) do not cause interference with any normal dormant payment card transactions that might occur at a corresponding merchant in between the scheduled occasions for the recurring transactions to occur, the recurring transaction update file(s) 4112 can be created and stored on the payment processor web services server 3610, prior to the scheduled recurring transaction time. Then, on a day when there is a scheduled recurring transaction, a logic check can be performed, for example, by the payment processor web services server 3610, to determine how many update files 4112 are pending for the payment requesting merchant and for the corresponding dormant payment card account. Accordingly, if there is more than one update file 4112 for the same requesting merchant, then there is a real time update file 3712 and another recurring transaction update file 4112 for a pending scheduled transaction. When this scenario occurs, the payment processor web services server 3610 can process the real time update file 3712 first (e.g., with higher priority), and leave the recurring transaction update file 4112 cached on the payment processor web services server 3610 for the later processing of the pending recurring transaction on the day in question.

The above-described devices and subsystems of the exemplary embodiments of FIGS. 1-41 can include, for example, any suitable servers, workstations, PCs, laptop computers, PDAs, Internet appliances, handheld devices, cellular telephones, wireless devices, other devices, etc., capable of performing the processes of the described embodiments. The devices and subsystems can communicate with each other using any suitable protocol and can be implemented using the computer system 4200 of FIG. 42, for example.

One or more interface mechanisms can be used in the exemplary embodiments of FIGS. 1-41, including, for example, Internet access, telecommunications in any form (e.g., voice, modem, etc.), wireless communications media, etc. Accordingly, the communications network(s) employed in the exemplary embodiments of FIGS. 1-41 can include, for example, one or more wireless communications networks, cellular communications networks, G3 communications networks, Public Switched Telephone Network (PSTNs), Packet Data Networks (PDNs), the Internet, intranets, and/or combination thereof, etc.

It is to be understood that the exemplary embodiments of FIGS. 1-41 are for exemplary purposes, as many variations of the specific hardware used to implement the described embodiments are possible, as will be appreciated by those skilled in the relevant art(s). For example, the functionality of the devices and the subsystems of the exemplary embodiments of FIGS. 1-41 can be implemented via one or more programmed computer systems or devices.

To implement such variations as well as other variations, a single computer system (e.g., the computer system 4200 of FIG. 42) can be programmed to perform the special purpose functions of one or more of the devices and subsystems of the exemplary embodiments of FIGS. 1-41. On the other hand, two or more programmed computer systems or devices can be substituted for any one of the devices and subsystems of the exemplary embodiments of FIGS. 1-41. Accordingly, principles and advantages of distributed processing, such as redundancy, replication, etc., also can be implemented, as desired, to increase the robustness and performance of the exemplary embodiments of FIGS. 1-41, for example.

The exemplary embodiments of FIGS. 1-41 can store information relating to various processes described herein. This information can be stored in one or more memories, such as a hard disk, optical disk, magneto-optical disk, RAM, etc., of the devices of the exemplary embodiments of FIGS. 1-41. One or more databases of the devices and subsystems of the exemplary embodiments of FIGS. 1-41 can store the information used to implement the embodiments of the present invention. The databases can be organized using data structures (e.g., records, tables, arrays, fields, graphs, trees, and/or lists) included in one or more memories, such as the memories listed above or any of the storage devices listed below in the discussion of FIG. 42, for example.

The previously described processes can include appropriate data structures for storing data collected and/or generated by the processes of the exemplary embodiments of FIGS. 1-41 in one or more databases thereof. Such data structures accordingly can include fields for storing such collected and/or generated data. In a database management system, data can be stored in one or more data containers, each container including records, and the data within each record can be organized into one or more fields. In relational database systems, the data containers can be referred to as tables, the records can be referred to as rows, and the fields can be referred to as columns. In object-oriented databases, the data containers can be referred to as object classes, the records can be referred to as objects, and the fields can be referred to as attributes. Other database architectures can be employed and use other terminology. Systems that implement the embodiments of the present invention are not limited to any particular type of data container or database architecture.

All or a portion of the exemplary embodiments of FIGS. 1-41 can be conveniently implemented using one or more conventional general purpose computer systems, microprocessors, digital signal processors, micro-controllers, etc., programmed according to the teachings of the embodiments of the present invention (e.g., using the computer system of FIG. 42), as will be appreciated by those skilled in the computer and software art(s). Appropriate software can be readily prepared by programmers of ordinary skill based on the teachings of the present disclosure, as will be appreciated by those skilled in the software art. Further, the exemplary embodiments of FIGS. 1-41 can be implemented on the World Wide Web (e.g., using one or more of the computer systems of FIG. 42). In addition, the exemplary embodiments of FIGS. 1-41 can be implemented by the preparation of application-specific integrated circuits or by interconnecting an appropriate network of conventional component circuits, as will be appreciated by those skilled in the electrical art(s).

Figure 42:
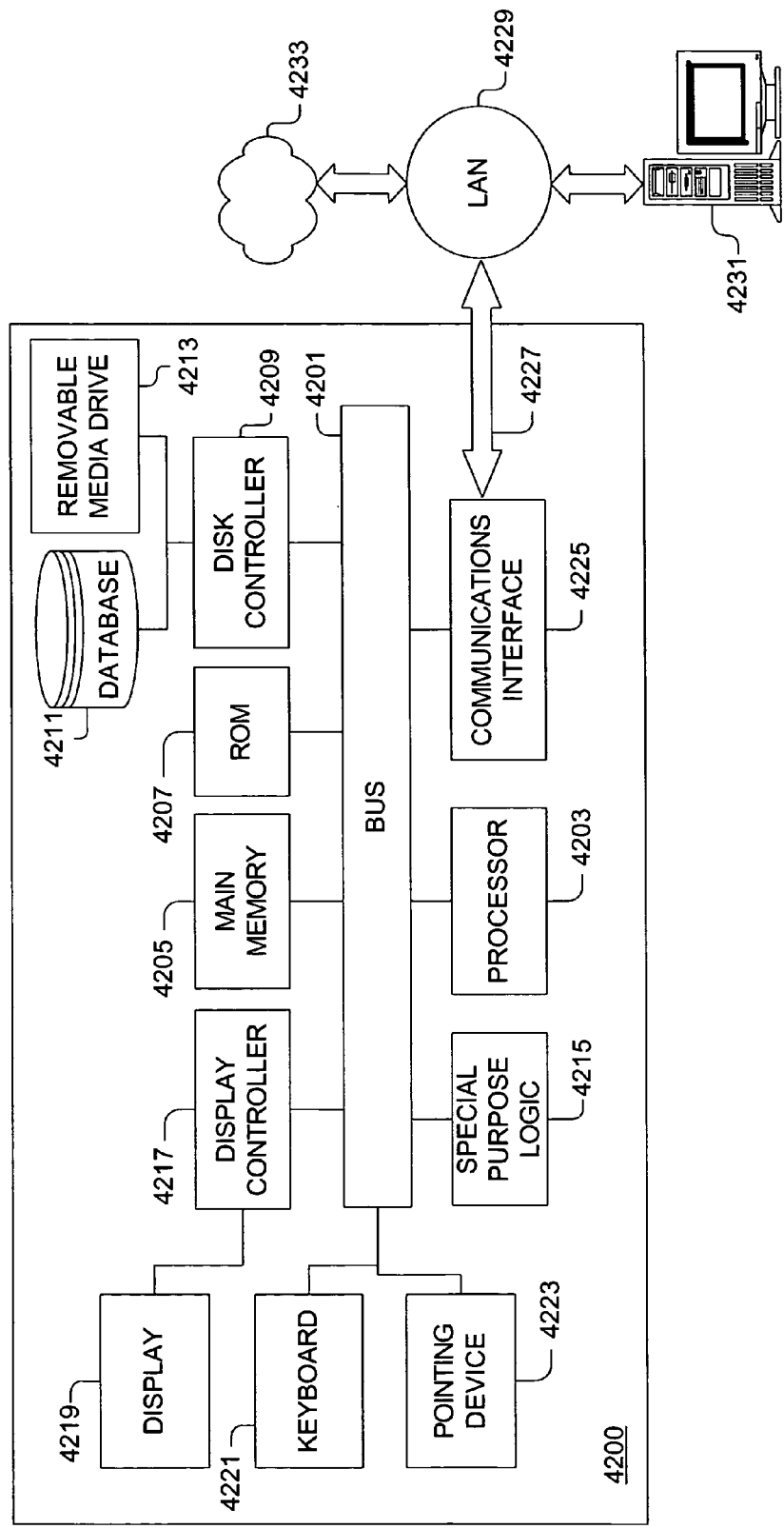
FIG. 42 is a diagram illustrating a general purpose computer that can be programmed according to the teachings of the present invention.

FIG. 42 illustrates a computer system 4200 upon which the described embodiments (e.g., the devices and subsystems of the exemplary embodiments of FIGS. 1-41) can be implemented. The various embodiments can be implemented on a single such computer system, or a collection of multiple such computer systems. The computer system 4200 can include a bus 4201 or other communication mechanism for communicating information, and a processor 4203 coupled to the bus 4201 for processing the information. The computer system 4200 also can include a main memory 4205, such as a random access memory (RAM), other dynamic storage device (e.g., dynamic RAM (DRAM), static RAM (SRAM), synchronous DRAM (SDRAM)), etc., coupled to the bus 4201 for storing information and instructions to be executed by the processor 4203.

In addition, the main memory 4205 also can be used for storing temporary variables or other intermediate information during the execution of instructions by the processor 4203. The computer system 4200 further can include a ROM 4207 or other static storage device (e.g., programmable ROM (PROM), erasable PROM (EPROM), electrically erasable PROM (EEPROM), etc.) coupled to the bus 4201 for storing static information and instructions.

The computer system 4200 also can include a disk controller 4209 coupled to the bus 4201 to control one or more storage devices for storing information and instructions, such as a magnetic hard disk 4211, and a removable media drive 4213 (e.g., floppy disk drive, read-only compact disc drive, read/write compact disc drive, compact disc jukebox, tape drive, and removable magneto-optical drive). The storage devices can be added to the computer system 4200 using an appropriate device interface (e.g., small computer system interface (SCSI), integrated device electronics (IDE), enhanced-IDE (E-IDE), direct memory access (DMA), or ultra-DMA).

The computer system 4200 also can include special purpose logic devices 4215, such as application specific integrated circuits (ASICs), full custom chips, configurable logic devices (e.g., simple programmable logic devices (SPLDs), complex programmable logic devices (CPLDs), field programmable gate arrays (FPGAs), etc.), etc., for performing special processing functions, such as sound processing, image processing, signal processing, speech processing, voice recognition processing, neural network processing, fingerprint recognition processing, retinal recognition processing, automated classification, communications functions, modem/DSL/ADSL/ISDN communications processing, web site server processing, Internet communication processing, web services processing, split-shipment processing, etc.

The computer system 4200 also can include a display controller 4217 coupled to the bus 4201 to control a display 4219, such as a cathode ray tube (CRT), liquid crystal display (LCD), active matrix display, plasma display, touch display, etc., for displaying or conveying information to a computer user. The computer system can include input devices, such as a keyboard 4221 including alphanumeric and other keys and a pointing device 4223, for interacting with a computer user and providing information to the processor 4203. The pointing device 4223 can include, for example, a mouse, a trackball, a pointing stick, etc., or voice recognition processor, etc., for communicating direction information and command selections to the processor 4203 and for controlling cursor movement on the display 4219. In addition, a printer can provide printed listings of the data structures/information of the exemplary embodiments of FIGS. 1-41 or any other data stored and/or generated by the computer system 4200.

The computer system 4200 can perform a portion or all of the processing steps of the invention in response to the processor 4203 executing one or more sequences of one or more instructions contained in a memory, such as the main memory 4205. Such instructions can be read into the main memory 4205 from another computer readable medium, such as the hard disk 4211 or the removable media drive 4213. Execution of the arrangement of instructions contained in the main memory 4205 causes the processor 4203 to perform the process steps described herein. One or more processors in a multi-processing arrangement also can be employed to execute the sequences of instructions contained in the main memory 4205. In alternative embodiments, hard-wired circuitry can be used in place of or in combination with software instructions. Thus, embodiments are not limited to any specific combination of hardware circuitry and/or software.

Stored on any one or on a combination of computer readable media, the embodiments of the present invention can include software for controlling the computer system 4200, for driving a device or devices for implementing the invention, and for enabling the computer system 4200 to interact with a human user (e.g., users of the exemplary embodiments of FIGS. 1-41, etc.). Such software can include, but is not limited to, device drivers, firmware, operating systems, development tools, applications software, etc. Such computer readable media further can include a computer program product of an embodiment of the present invention for performing all or a portion (if processing is distributed) of the processing performed in implementing the invention. Computer code devices of the embodiments of the present invention can include any interpretable or executable code mechanism, including but not limited to scripts, interpretable programs, dynamic link libraries (DLLs), Java classes and applets, complete executable programs, Common Object Request Broker Architecture (CORBA) objects, etc. Moreover, parts of the processing of the embodiments of the present invention can be distributed for better performance, reliability, and/or cost.

The computer system 4200 also can include a communication interface 4225 coupled to the bus 4201. The communication interface 4225 can provide a two-way data communication coupling to a network link 4227 that is connected to, for example, a local area network (LAN) 4229, or to another communications network 4233 (e.g. a wide area network (WAN), a global packet data communication network, such as the Internet, etc.). For example, the communication interface 4225 can include a digital subscriber line (DSL) card or modem, an integrated services digital network (ISDN) card, a cable modem, a telephone modem, etc., to provide a data communication connection to a corresponding type of telephone line. As another example, the communication interface 4225 can include a local area network (LAN) card (e.g., for Ethernet™, an Asynchronous Transfer Model (ATM) network, etc.), etc., to provide a data communication connection to a compatible LAN. Wireless links can also be implemented. In any such implementation, the communication interface 4225 can send and receive electrical, electromagnetic, or optical signals that carry digital data streams representing various types of information. Further, the communication interface 4225 can include peripheral interface devices, such as a Universal Serial Bus (USB) interface, a PCMCIA (Personal Computer Memory Card International Association) interface, etc.

The network link 4227 typically can provide data communication through one or more networks to other data devices. For example, the network link 4227 can provide a connection through the LAN 4229 to a host computer 4231, which has connectivity to the network 4233 or to data equipment operated by a service provider. The LAN 4229 and the network 4233 both can employ electrical, electromagnetic, or optical signals to convey information and instructions. The signals through the various networks and the signals on the network link 4227 and through the communication interface 4225, which communicate digital data with computer system 4200, are exemplary forms of carrier waves bearing the information and instructions.

The computer system 4200 can send messages and receive data, including program code, through the network 4229 and/or 4233, the network link 4227, and the communication interface 4225. In the Internet example, a server can transmit requested code belonging to an application program for implementing an embodiment of the present invention through the network 4233, the LAN 4229 and the communication interface 4225. The processor 4203 can execute the transmitted code while being received and/or store the code in the storage devices 4211 or 4213 or other non-volatile storage for later execution. In this manner, the computer system 4200 can obtain application code in the form of a carrier wave. With the system of FIG. 42, the embodiments of the present invention can be implemented on the Internet as a web server 4200 performing one or more of the processes according to the embodiments of the present invention for one or more computers coupled to the web server 4200 through the network 4233 coupled to the network link 4227.

The term "computer readable medium" as used herein can refer to any medium that participates in providing instructions to the processor 4203 for execution. Such a medium can take many forms, including but not limited to, non-volatile media, volatile media, transmission media, etc. Non-volatile media can include, for example, optical or magnetic disks, magneto-optical disks, etc., such as the hard disk 4211 or the removable media drive 4213. Volatile media can include dynamic memory, etc., such as the main memory 4205. Transmission media can include coaxial cables, copper wire and fiber optics, including the wires that make up the bus 4201. Transmission media can also take the form of acoustic, optical, or electromagnetic waves, such as those generated during radio frequency (RF) and infrared (IR) data communications.

As stated above, the computer system 4200 can include at least one computer readable medium or memory for holding instructions programmed according to the teachings of the invention and for containing data structures, tables, records, or other data described herein. Common forms of computer-readable media can include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media can be involved in providing instructions to a processor for execution. For example, the instructions for carrying out at least part of the embodiments of the present invention can initially be borne on a magnetic disk of a remote computer connected to either of the networks 4229 and 4233. In such a scenario, the remote computer can load the instructions into main memory and send the instructions, for example, over a telephone line using a modem. A modem of a local computer system can receive the data on the telephone line and use an infrared transmitter to convert the data to an infrared signal and transmit the infrared signal to a portable computing device, such as a PDA, a laptop, an Internet appliance, etc. An infrared detector on the portable computing device can receive the information and instructions borne by the infrared signal and place the data on a bus. The bus can convey the data to main memory, from which a processor retrieves and executes the instructions. The instructions received by main memory can optionally be stored on storage device either before or after execution by processor.

Although the present invention is described in terms of practicing the method over the Internet or an Intranet, the present invention can be implemented for other means of communication, such wireless, satellite, etc. communication, as will be appreciated by those skilled in the relevant art(s).

Although the present invention is described in terms of processing web site registration forms, the present invention can be implemented for processing all types of web site forms, as will be appreciated by those skilled in the relevant art(s).

Although the present invention is described in terms of the central web site transmitting the dormant payment card account update files or activation signals, the present invention can be implemented with a destination web site transmitting the update files or signals and/or with the financial institutions/credit card networks performing the credit card activation processes, as will be appreciated by those skilled in the relevant art(s).

Although the present invention is described in terms of the central web site transmitting the dormant payment card account update files or activation signals, the present invention can be implemented with a destination web site transmitting the update files or signals, including the transaction information contained therein, as will be appreciated by those skilled in the relevant art(s).

Although the present invention is described in terms of the central web site using a predetermined amount of time (e.g., 15-30 minutes) for deactivation of an online transaction based on the dormant payment card account, the present invention can be implemented using other predetermined amounts of time (e.g., 1 hour, 1 day, 1 week, etc.), as will be appreciated by those skilled in the relevant art(s).

Although the present invention is described in terms of the update file verification device 602 being located between the servlet 218 and the credit card issuing bank/financial institution 412, the device 602 may be located in other areas of the system, such as between the credit card network 508 and the underwriting financial institution 606, between the credit card issuing bank/financial institution 412 and the underwriting financial institution 606, etc., as will be appreciated by those skilled in the relevant art(s).

Although the present invention is described in terms of providing for a user an online/offline credit/debit card secure transaction service, the present invention may include a preliminary online/offline credit/debit card issuance/approval service, as will be appreciated by those skilled in the relevant art(s).

Although the present invention is described in terms of providing for a user an online/offline credit/debit card secure transaction service, the present invention may include a preliminary activation feature for the online/offline credit/debit card account via an activation code input by the user and matched against a corresponding activation code stored at the central web site, as will be appreciated by those skilled in the relevant art(s).

Although the present invention is described in terms of using servlets (e.g., implemented using Java programming language), other applications and programming languages may be used, such as CORBA objects, Active X applications, PEARL scripts, etc., as will be appreciated by those skilled in the relevant art(s).

Although the present invention is described in terms of using HTML, other Internet programming languages may be used, such as XML, EXML, etc., as will be appreciated by those skilled in the relevant art(s).

Although the present invention is described in terms of a user logging into the central web site using a personal computer, other devices, such as personal data assistants (PDAs), Internet-ready cellular phones, using the TCP/IP, WAP, 3G, protocols, etc., can be used to log into the central web site, as will be appreciated by those skilled in the relevant art(s).

Although the present invention is described in terms of activating the online credit/debit card during e-commerce transactions from a central web site location, the present invention can be implemented with the central web site acting as an e-commerce web site, wherein the online credit/debit card is activated by the central web site acting as an e-commerce web site when a user visits the e-commerce web site and is de-activated at the conclusion of the user's checkout process, as will be appreciated by those skilled in the relevant art(s).

Although the present invention is described in terms of activating the online credit/debit card during e-commerce transactions from a central web site location, the present invention can be implemented with the central web site acting as an Internet Service Provider (ISP) web site, wherein the online credit/debit card is activated by the central web site acting as an ISP web site, when a user logs in or when a user visits an e-commerce web site and is de-activated at log out or after a time out, as will be appreciated by those skilled in the relevant art(s).

Although the present invention is described in terms of activating the online credit/debit card during e-commerce transactions from a central web site location, the present invention can be implemented with the central web site acting as an auction web site, wherein the online credit/debit card is activated by the central web site acting as an auction web site, when a user's bid is accepted and is de-activated after the bid charge is processed, as will be appreciated by those skilled in the relevant art(s).

Although the present invention is described in terms of activating the online credit/debit card during e-commerce transactions from a central web site location, the present invention can be implemented with the central web site acting as a name your own price web site, wherein the online credit/debit card is activated by the central web site acting as a name your own price web site, when a user's bid is accepted and is de-activated after the bid/order is processed, as will be appreciated by those skilled in the relevant art(s).

Although the present invention is described in terms of activating the online credit/debit card during e-commerce transactions from a central web site location, the present invention can be implemented with the central web site acting as a travel agency web site, wherein the online credit/debit card is activated by the central web site acting as a travel agency web site, when a user's order is accepted and is de-activated after the order is processed, as will be appreciated by those skilled in the relevant art(s).

Although the present invention is described in terms of activating the online credit/debit card during e-commerce transactions from a central web site location, the present invention can be implemented with the central web site acting as an online delivery web site, wherein the online credit/debit card is activated by the central web site acting as an online delivery web site, when a user's order is accepted and is de-activated after the order is processed, as will be appreciated by those skilled in the relevant art(s).

Although the present invention is described in terms of activating the online credit/debit card during e-commerce transactions from a central web site location, the present invention can be implemented with the central web site acting as an online bookmark web site, wherein the online credit/debit card is activated by the central web site acting as an online bookmark web site, when a user visits a book marked e-commerce web site and is de-activated after a predetermined time-out period, as will be appreciated by those skilled in the relevant art(s).

Although the present invention is described in terms of activating the online credit/debit card during e-commerce transactions from a central web site location, the present invention can be implemented with the central web site acting as an online bank/financial institution web site (or traditional bank site), wherein the online credit/debit card is activated and de-activated by an e-commerce site, which notifies the central web site acting as an online bank/financial institution web site (or traditional bank site) of the activation and de-activation, as will be appreciated by those skilled in the relevant art(s).

Although the present invention is described in terms of activating the online credit/debit card during e-commerce transactions from a central web site location, the present invention can be implemented with the central web site acting as an online bill payment web site, wherein the online credit/debit card is activated by the central web site acting as an online bill payment web site, when a user's order to pay a bill is accepted and is de-activated after the transaction is processed, as will be appreciated by those skilled in the relevant art(s).

Although the present invention is described in terms of activating the online credit/debit card during e-commerce transactions from a central web site location, the present invention can be implemented with the central web site acting as an online monetary system web site, wherein the online credit/debit card is activated by the central web site acting as an online monetary system web site, when a user wants to purchase online money for shopping at participating retailers and is de-activated after the transaction is processed, as will be appreciated by those skilled in the relevant art(s).

Although the present invention is described in terms of activating the online credit/debit card during e-commerce transactions, the present invention can be implemented for offline transaction by only activating a "real world" credit/debit card while in use by a consumer, for example, using a personal identification number entered at credit card readers in "real world" merchant shops to temporarily activate the credit/debit card during the offline transaction, as will be appreciated by those skilled in the relevant art(s).

Numerous modifications and variations of the present invention are possible in light of the above teachings. It is therefore to be understood that within the scope of the appended claims, the invention may be practiced otherwise than as specifically described herein.

Glossary

In the context of the present invention:

"acquiring bank" or "merchant bank" refers to a bank that has a business relationship with a merchant and receives all credit card transactions from that merchant.

"authorization" refers to approval of a credit card transaction for a merchant by a card-issuing bank.

"asymmetric encryption" refers to a cryptographic system that uses two keys—a public key known to everyone and a private or secret key known only to the recipient of the message. When John wants to send a secure message to Jane, he uses Jane's public key to encrypt the message. Jane then uses her private key to decrypt it. An important element to the public key system is that the public and private keys are related in such a way that only the public key can be used to encrypt messages and only the corresponding private key can be used the decrypt them. Mover, it is virtually impossible to deduce the private key if you know the public key.

"authorization code" refers to a code assigned by a card issuing bank to a credit card sale to show that the transaction is authorized.

"bank card" refers to a credit card issued by a bank (e.g., Visa and MasterCard are bank cards and American Express and Discover are not).

"browser" refers to a program that accesses and displays files available on the World Wide Web.

"chargeback" refers to a credit card transaction that is billed back to a merchant who made the sale.

"client" refers to a computer or program that can download files for manipulation from a server.

"cookie" refers to information that a web site puts on a user's hard disk so that the web site can remember something about the user at a later time (more technically, a cookie is information for future use that is stored by the server on the client side of a client/server communication.

"cryptography" refers to the art of protecting information by transforming it (encrypting it) into an unreadable format, called cipher text. Only those who possess a secret key can decipher (or decrypt) the message into plain text. Encrypted messages can sometimes be broken by cryptanalysis, also called code breaking, although modern cryptography techniques are virtually unbreakable.

"e-commerce" (also referred to as "electronic commerce" or "EC") refers to the buying and/or selling of goods and/or services on the Internet, especially the World Wide Web.

"URL" refers to a statement that specifies a transmission protocol and an Internet identifying number, used chiefly for moving from site to site on the World Wide Web.

"electronic data capture" refers to entering and processing sales drafts by electronic means (in online payment schemes, capture is used to denote the electronic deposit of the sales draft with the acquiring bank).

"e-mail" refers to messages sent and received electronically via telecommunication links, as between microcomputers or terminals.

"encryption" refers to the translation of data into a secret code. Encryption is the most effective way to achieve data security. To read an encrypted file, you must have access to a secret key or password that enables you to decrypt it. Unencrypted data is called plain text; encrypted data is referred to as cipher text. There two main types of encryption: asymmetric encryption and symmetric encryption.

"hardware" refers to a computer and the associated physical equipment directly involved in the performance of data-processing or communications functions.

"home page" refers to the file available for access at a World Wide Web site intended chiefly to greet visitors, provide information about the web site, and direct them to other web sites with more related information.

"HTML" (Hypertext Markup Language) is the set of "markup" symbols or codes inserted in a file intended for display on a World Wide Web browser. HTML is the authoring language used to create documents on the World Wide Web. HTML is similar to SGML, although it is not a strict subset. HTML defines the structure and layout of a web document by using a variety of tags and attributes.

"HTML forms" refers to a formatted HTML document containing fields that users can fill in with data. The forms appears on the user's display screen and the user fills it in by selecting options with a pointing device or typing in text from the computer keyboard. The HTML language has built-in codes for displaying form elements such as text fields and check boxes. Typically the data entered into a web-based form is processed by a CGI program.

"HTTP" (HyperText Transfer Protocol) refers to the underlying protocol used by the World Wide Web. HTTP defines how messages are formatted and transmitted, and what actions web servers and browsers should take in response to various commands. For example, when you enter a URL in your browser, this actually sends an HTTP command to the web server directing it to fetch and transmit the requested web pages.

"hypertext" refers to a computer-based text retrieval system that enables the user to provide access to or gain information related to a particular text; a "link" "hyperlink" or "hypertext link" refers to a selectable connection from one word, picture, or information object to another.

"independent sales organization" (ISO) refers to organizations that act as a third party between the merchant and the acquiring bank (e.g., if a business is unable to obtain merchant status through an acquiring bank because the bank views them as too large a risk they may need to go through an ISO to obtain merchant status.

"interchange" refers to a transaction that takes place between the acquiring bank and a credit card-issuing bank.

"interchange fee" refers to a fee an acquiring bank pays to a credit card-issuing bank in order to process a credit card transaction involving a card holder's account.

"Internet" refers to a matrix of computer networks that connects computers around the world.

"Intranet" refers to a network of computers or a network of computer networks that is contained within an enterprise.

"login name" refers to an identification string, distinct from a password, and which is required for logging on to a multi-user system, bulletin board system, local area network (LAN) or online service and is also referred to as a "user name" or "User ID".

"logon" or "login" refers to the procedure used to get access to an operating system or application and requires that the user have a user ID and a password.

"merchant discount" refers to a percentage of a retail sale a merchant pays as a fee to an acquiring bank for processing a credit card transaction.

"merchant status" refers to a business having authorization from an acquiring bank, ISO, or other financial institution to accept credit cards.

"modem" refers to a device or program that enables a computer to transmit data over telephone lines. Computer information is stored digitally, whereas information transmitted over telephone lines is transmitted in the form of analog waves. A modem converts between these two forms.

"online" refers to connected to or accessible by means of a computer or computer network.

"parse" or "parsing" refers to breaking a string of characters into groups of smaller strings using a specific set of rules.

"password" refers to a sequence of characters required to gain access to a computer system.

"personal web page" refers to the file available for access at a World Wide Web site intended chiefly to greet a specific user, provide personalized information to the user and/or direct the user to user specified web sites.

"plug-in" refers to programs that can easily be installed and used as part of a user's web browser.

"program" refers to a procedure for solving a problem that involves collection of data, processing, and presentation of results with such a procedure coded for a computer or an instruction sequence in programmed instruction.

"sales draft" refers to an instrument showing an obligation on a cardholder's part to pay money, (i.e. the sale amount), to a card issuer (e.g., this is the piece of paper that you sign when making a purchase with your credit card. Sales draft data can be "captured" electronically and sent to be processed over financial networks.

"screen" or "window" refers to data or file(s) presented to a user via a web browser.

"secure" refers to data that is encoded using encryption or other means so as to ensure the integrity of the data.

"server" refers to a computer or program that controls a central repository of data that can be downloaded and manipulated in some manner by a client.

"servlet" refers to a small program that runs on a server.

"session object" refers to a series of related interaction between a single user and the web server which takes place over a series of time. This session could be a series of transactions, or requests. The session may consist of multiple requests to the same servlet, or of requests to a variety of different resources on the same web site.

"S-HTTP" refers to an extension of the HTTP to support sending data securely over the World Wide Web. Not all web browsers and servers support S-HTTP.

"software" refers to programs, routines, and symbolic languages that control the functioning of the hardware and direct its operation.

"SSL" (Secure Sockets Layer) refers to a technology for transmitting secure communications over the World Wide Web. SSL is a protocol developed by Netscape for transmitting private documents via the Internet. SSL works by providing a private key to encrypt data that's transferred over the SSL connection. Both Netscape Navigator and Internet Explorer support SSL, and many web sites use the protocol to obtain confidential user information, such as credit card numbers. Buy convention, web pages that require an SSL connection start with https: instead of http.

"SQL" (Structured Query Language) refers to a standard interactive and programming language for getting information from and updating a database.

"start page" refers to a file available for access at a World Wide Web site intended for a unique user after the user has logged in/on the web site.

"symmetric encryption" refers to a type of encryption where with same key is used to encrypt and decrypt the message.

"virtual", in general, means the quality of effecting something without actually being that something.

"web site" refers to a collection of web files on a particular subject that includes a beginning file called a home page.

"World Wide Web" refers to an information server on the Internet composed of interconnected sites and files, accessible with a browser.

What is claimed is:

1. A method for managing a financial transaction of a user at both online and offline merchants, comprising:
    providing via a server a merchant identification signal including an identification of both online and offline merchants for selection by a user;
    authenticating the user at the server via an authentication signal of a device of the user while the user is at an online or offline site of a merchant selected based on the merchant identification signal, and for an online merchant logging in the user by the server via a login signal sent to the online merchant selected based on the merchant identification signal;
    transmitting via the user device directly to a financial institution an activation signal for activating a reusable, pre-existing, unaltered and permanent credit or debit card account number of the user from the user device to the financial institution for processing financial transactions, while the user is authenticated and based on the selection of the merchant by the user based on the merchant identification signal from the server;
    submitting a payment request including the reusable, pre-existing, unaltered and permanent credit or debit card account number to the financial institution from the merchant, while the reusable, pre-existing, unaltered and permanent credit or debit card account number is activated; and
    de-activating by the user device via a de-activation signal sent by the user device to the financial institution the reusable, pre-existing, unaltered and permanent credit or debit card account number after the payment request is processed and accepted by the financial institution, wherein the financial institution only accepts and processes payment requests received from merchants while the reusable, pre-existing, unaltered and permanent credit or debit card account number is activated, and the financial institution declines payment requests while the reusable, pre-existing, unaltered and permanent credit or debit card account number is de-activated,
    wherein when the payment request comprises a recurring payment request or a partial payment request and the method further comprises processing the partial payment request including generating one or more subsequent activation signals by the server and generating deactivation information based on the selection of the merchant by the user for processing remaining payments or processing the recurring payment request including generating one or more subsequent activation signals by the server and generating deactivation information based on the selection of the merchant by the user for processing recurring payments, and
    the generation of the subsequent activation signals by the server do not require further authenticating of the user by the server.

2. The method of claim 1, further comprising authenticating the user with the user device.

3. The method of claim 1, wherein the activation signal is automatically transmitted to the financial institution when the user logs into the server.

4. The method of claim 1, wherein the result of the processing of the financial transaction is transmitted to the user via the server.

5. The method of claim 1, wherein the activation signal is transmitted as one of a secure signal, an encrypted e-mail message, a secure facsimile message, a secure wireless communications message, a secure telephone communications message, a secure SMS message, and a secure web services message.

6. The method of claim 1, further comprising:
    creating a unique user name and password for the user at the server; and
    using the unique user name and password in the authenticating step.

7. The method of claim 1, further comprising de-activating the reusable, pre-existing, unaltered and permanent credit or debit card account number (i) a predetermined amount of time after the user is authenticated or (ii) after the user goes offline from the server.

8. The method of claim 1, further comprising:
    creating a unique credit or debit card with a limited available balance based on the reusable, pre-existing, unaltered and permanent credit or debit card account number of the user; and
    allowing the user to execute financial transactions subject to the available balance using the unique credit or debit card in place of the reusable, pre-existing, unaltered and permanent credit or debit card account number.

9. The method of claim 8, further comprising:
    authenticating the user at the server; and
    transmitting from the server the activation signal to the financial institution for processing of the payment request, wherein the financial institution processes online and offline payment requests received from merchants while the unique credit or debit card is activated and declines payment requests while the unique credit or debit card is de-activated.

10. The method of claim 9, wherein the payment requests comprises partial payment requests and the method further comprises processing the partial payment requests including generating subsequent activation signals for processing remaining payments.

11. The method of claim 9, wherein the payment requests comprises recurring payment requests and the method further comprises processing the recurring payment requests including generating subsequent activation signals for processing the recurring payments.

12. The method of claim 1, wherein the user authentication includes at least one of authentication of the user based on a user name and password of the user, authentication of the user based on biometric information of the user, and authentication of the user based on personal identification number information of the user.

13. The method of claim 1, wherein the de-activating of the reusable, pre-existing, unaltered and permanent credit or debit card account number is performed at the financial institution after the processing of the payment request.

14. The method of claim 1, wherein the financial institution includes web services for processing the activation signal and the user device is enabled to access the web services of the financial institution for transmitting the activation signal.

15. The method of claim 1, further comprising transmitting the reusable, pre-existing, unaltered and permanent credit or debit card account number from the user device to a device of the merchant for processing the payment request.

16. The method of claim 15, further comprising storing the reusable, pre-existing, unaltered and permanent credit or debit card account number on the user device via a secure mechanism.

17. The method of claim 1, further comprising reading the reusable, pre-existing, unaltered and permanent credit or debit card account number from a card via a card reader device of the merchant for processing the payment request.

18. A computer program product for managing a financial transaction of a user at both online and offline merchants, including one or more computer readable instructions embedded on a computer readable medium and configured to cause one or more computer processors to perform the steps of:
providing via a server a merchant identification signal including an identification of both online and offline merchants for selection by a user;
authenticating the user at the server via an authentication signal of a device of the user while the user is at an online or offline site of a merchant selected based on the merchant identification signal, and for an online merchant logging in the user by the server via a login signal sent to the online merchant selected based on the merchant identification signal;
transmitting via the user device directly to a financial institution an activation signal for activating a reusable, pre-existing, unaltered and permanent credit or debit card account number of the user from the user device to the financial institution for processing financial transactions, while the user is authenticated and based on the selection of the merchant by the user based on the merchant identification signal from the server;
submitting a payment request including the reusable, pre-existing, unaltered and permanent credit or debit card account number to the financial institution from the merchant, while the reusable, pre-existing, unaltered and permanent credit or debit card account number is activated; and
de-activating by the user device via a de-activation signal sent by the user device to the financial institution the reusable, pre-existing, unaltered and permanent credit or debit card account number after the payment request is processed and accepted by the financial institution, wherein the financial institution only accepts and processes payment requests received from merchants while the reusable, pre-existing, unaltered and permanent credit or debit card account number is activated, and the financial institution declines payment requests while the reusable, pre-existing, unaltered and permanent credit or debit card account number is de-activated,
wherein when the payment request comprises a recurring payment request or a partial payment request and the method further comprises processing the partial payment request including generating one or more subsequent activation signals by the server and generating deactivation information based on the selection of the merchant by the user for processing remaining payments or processing the recurring payment request including generating one or more subsequent activation signals by the server and generating deactivation information based on the selection of the merchant by the user for processing recurring payments, and the generation of the subsequent activation signals by the server do not require further authenticating of the user by the server.

19. A system for managing a financial transaction of a user at both online and offline merchants, the system comprising:
a server configured to provide a merchant identification signal including an identification of both online and offline merchants for selection by a user; and
a user device connected to the server over a communications network;
wherein the server is configured to authenticate the user via an authentication signal of the device of the user while the user is at an online or offline site of a merchant selected based on the merchant identification signal, and for an online merchant log in the user via a login signal sent to the online merchant selected based on the merchant identification signal;
wherein the user device is configured to transmit directly to a financial institution an activation signal for activating a reusable, pre-existing, unaltered and permanent credit or debit card account number of the user from the user device to the financial institution for processing financial transactions, while the user is authenticated and based on the selection of the merchant by the user based on the merchant identification signal from the server;
wherein the merchant submits a payment request including the reusable, pre-existing, unaltered and permanent credit or debit card account number to the financial institution, while the reusable, pre-existing, unaltered and permanent credit or debit card account number is activated;
wherein the reusable, pre-existing, unaltered and permanent credit or debit card account number is de-activated by the user device via a de-activation signal sent by the user device to the financial institution after the payment request is processed and accepted by the financial institution, wherein the financial institution only accepts and processes payment requests received from merchants while the reusable, pre-existing, unaltered and permanent credit or debit card account number is activated, and the financial institution declines payment requests while the reusable, pre-existing, unaltered and permanent credit or debit card account number is de-activated;
wherein when the payment request comprises a recurring payment request or a partial payment request and the system is configured to process the partial payment request by generating one or more subsequent activation signals by the server and generating deactivation information based on the selection of the merchant by the user for processing remaining payments or processing the recurring payment request including generating one or more subsequent activation by the server and generating deactivation information based on the selection of the merchant by the user for processing recurring payments; and
wherein the generation of the subsequent activation signals by the server do not require further authenticating of the user by the server.

20. The computer program product of claim 18, further comprising authenticating the user with the user device.

21. The computer program product of claim 18, wherein the activation signal is automatically transmitted to the financial institution when the user logs into the server.

22. The computer program product of claim 18, wherein the result of the processing of the financial transaction is transmitted to the user via the server.

23. The computer program product of claim 18, wherein the activation signal is transmitted as one of a secure signal, an encrypted e-mail message, a secure facsimile message, a secure wireless communications message, a secure telephone communications message, a secure SMS message, and a secure web services message.

24. The computer program product of claim 18, further comprising:
creating a unique user name and password for the user at the server; and
using the unique user name and password in the authenticating step.

25. The computer program product of claim 18, further comprising de-activating the reusable, pre-existing, unaltered and permanent credit or debit card account number (i) a predetermined amount of time after the user is authenticated or (ii) after the user goes offline from the server.

26. The computer program product of claim 18, further comprising:
creating a unique credit or debit card with a limited available balance based on the reusable, pre-existing, unaltered and permanent credit or debit card account number of the user; and
allowing the user to execute financial transactions subject to the available balance using the unique credit or debit card in place of the reusable, pre-existing, unaltered and permanent credit or debit card account number.

27. The computer program product of claim 26, further comprising:
authenticating the user at the server; and
transmitting from the server the activation signal to the financial institution for processing of the payment request, wherein the financial institution processes online and offline payment requests received from merchants while the unique credit or debit card is activated and declines payment requests while the unique credit or debit card is de-activated.

28. The computer program product of claim 27, wherein the payment requests comprises partial payment requests and further comprising processing the partial payment requests including generating subsequent activation signals for processing remaining payments.

29. The computer program product of claim 27, wherein the payment requests comprises recurring payment requests and further comprising processing the recurring payment requests including generating subsequent activation signals for processing the recurring payments.

30. The computer program product of claim 18, wherein the user authentication includes at least one of authentication of the user based on a user name and password of the user, authentication of the user based on biometric information of the user, and authentication of the user based on personal identification number information of the user.

31. The computer program product of claim 18, wherein the de-activating of the reusable, pre-existing, unaltered and permanent credit or debit card account number is performed at the financial institution after the processing of the payment request.

32. The computer program product of claim 18, wherein the financial institution includes web services for processing the activation signal and the user device is enabled to access the web services of the financial institution for transmitting the activation signal.

33. The computer program product of claim 18, further comprising transmitting the reusable, pre-existing, unaltered and permanent credit or debit card account number from the user device to a device of the merchant for processing the payment request.

34. The computer program product of claim 33, further comprising storing the reusable, pre-existing, unaltered and permanent credit or debit card account number on the user device via a secure mechanism.

35. The computer program product of claim 18, further comprising reading the reusable, pre-existing, unaltered and permanent credit or debit card account number from a card via a card reader device of the merchant for processing the payment request.

36. The system of claim 19, further comprising authenticating the user with the user device.

37. The system of claim 19, wherein the activation signal is automatically transmitted to the financial institution when the user logs into the server.

38. The system of claim 19, wherein the result of the processing of the financial transaction is transmitted to the user via the server.

39. The system of claim 19, wherein the activation signal is transmitted as one of a secure signal, an encrypted e-mail message, a secure facsimile message, a secure wireless communications message, a secure telephone communications message, a secure SMS message, and a secure web services message.

40. The system of claim 19, further comprising:
creating a unique user name and password for the user at the server; and
using the unique user name and password in the authenticating of the user.

41. The system of claim 19, wherein the system is configured for de-activating the reusable, pre-existing, unaltered and permanent credit or debit card account number (i) a predetermined amount of time after the user is authenticated or (ii) after the user goes offline from the server.

42. The system of claim 19, further comprising a unique credit or debit card with a limited available balance created based on the reusable, pre-existing, unaltered and permanent credit or debit card account number of the user,
wherein the system is configured for allowing the user to execute financial transactions subject to the available balance using the unique credit or debit card in place of the reusable, pre-existing, unaltered and permanent credit or debit card account number.

43. The system of claim 42, further comprising:
authenticating the user at the server; and
transmitting from the server the activation signal to the financial institution for processing of the payment request, wherein the financial institution processes online and offline payment requests received from merchants while the unique credit or debit card is activated and declines payment requests while the unique credit or debit card is de-activated.

44. The system of claim 43, wherein the payment requests comprises partial payment requests and further comprising processing the partial payment requests including generating subsequent activation signals for processing remaining payments.

45. The system of claim 43, wherein the payment requests comprises recurring payment requests and further comprising processing the recurring payment requests including generating subsequent activation signals for processing the recurring payments.

46. The system of claim 19, wherein the user authentication includes at least one of authentication of the user based on a user name and password of the user, authentication of the user based on biometric information of the user, and authentication of the user based on personal identification number information of the user.

47. The system of claim 19, wherein the de-activating of the reusable, pre-existing, unaltered and permanent credit or debit card account number is performed at the financial institution after the processing of the payment request.

48. The system of claim 19, wherein the financial institution includes web services for processing the activation signal and the user device is enabled to access the web services of the financial institution for transmitting the activation signal.

49. The system of claim 19, further comprising transmitting the reusable, pre-existing, unaltered and permanent credit or debit card account number from the user device to a device of the merchant for processing the payment request.

50. The system of claim 49, further comprising storing the reusable, pre-existing, unaltered and permanent credit or debit card account number on the user device via a secure mechanism.

51. The system of claim 19, further comprising reading the reusable, pre-existing, unaltered and permanent credit or debit card account number from a card via a card reader device of the merchant for processing the payment request.

* * * * *

UNITED STATES PATENT AND TRADEMARK OFFICE
CERTIFICATE OF CORRECTION

| | | |
|---|---|---|
| PATENT NO. | : 7,865,414 B2 | |
| APPLICATION NO. | : 10/786596 | |
| DATED | : January 4, 2011 | |
| INVENTOR(S) | : Daniel Y. Fung et al. | |

It is certified that error appears in the above-identified patent and that said Letters Patent is hereby corrected as shown below:

On the Title page, Item (63), line 3, delete "continuation" and insert -- division --.

In column 1, line 13, under CROSS REFERENCE TO RELATED DOCUMENTS, delete "Continuation" and insert -- Division --.

Signed and Sealed this
Tenth Day of January, 2012

David J. Kappos
*Director of the United States Patent and Trademark Office*